United States Patent Office 3,060,210
Patented Oct. 23, 1962

3,060,210
POLYAMINOMETHYL PHENOLS
Melvin De Groote, St. Louis, and Kwan-ting Shen, Brentwood, Mo., assignors to Petrolite Corporation, a corporation of Delaware
No Drawing. Original application May 12, 1960, Ser. No. 28,514. Divided and this application Apr. 10, 1961, Ser. No. 101,627
20 Claims. (Cl. 260—404.5)

This application is a division of our copending application Serial No. 28,514, filed May 12, 1960, which latter application is a continuation-in-part of our copending application Serial No. 730,510, filed April 24, 1958. See also our copending application Serial No. 797,829, filed March 9, 1959 now abandoned, which is a division of Serial No. 730,510. This invention relates to (1) oxyalkylated, (2) acylated, (3) oxyalkylated then acylated, (4) acylated then oxyalkylated, and (5) acylated, then oxyalkylated and then acylated, monomeric polyaminomethyl phenols. This invention also relates to a process of producing these substituted phenols which is characterized by reacting a preformed methylol phenol (i.e. formed prior to the addition of the polyamine) with at least one mole of a secondary polyamine per equivalent of methylol group on the phenol, in the absence of an extraneous catalyst (in the case of an aqueous reaction mixture, the pH of the reaction mixture being determined solely by the methylol phenol and the secondary polyamine), until about one mole of water per equivalent of methylol group is removed; and then reacting this product with (1) an oxyalkylating agent, (2) an acylating agent, (3) an oxyalkylating agent then an acylating agent, (4) an acylating agent then an oxyalkylating agent or (5) an acylating agent then an oxyalkylating agent and then an acylating agent.

This invention also relates to methods of using these products, which have an unexpectedly broad spectrum of uses, for example, as demulsifiers for water-in-oil emulsions; as demulsifiers for oil-in-water emulsions; as corrosion inhibitors; as fuel oil additives for gasoline, diesel fuel, jet fuel, and the like; as lubricating oil additives; as scale preventatives; as chelating agents or to form chelates which are themselves useful, for example, as anti-oxidants, fungicides; etc.; as flotation agents, for example, as flotation collection agents; as asphalt additives or anti-stripping agents for asphalt-mineral aggregate compositions; as additives for compositions useful in acidizing calcareous strata of oil wells; as additives for treating water used in the secondary recovery of oil and in disposal wells; as additives used in treating oil-well strata in primary oil recovery to enhance the flow of oil; as emulsifiers for both oil-in-water and water-in-oil emulsions; as additives for slushing oils; as additives for cutting oils; as additives for oil to prevent emulsification during transport; as additives for drilling muds; as agents useful in removing mud sheaths from newly drilled wells; as dehazing or "fog-inhibiting" agents for fuels; as additives for preparing sand or mineral slurries useful in treating oil wells to enhance the recovery of oil; as agents for producing polymeric emulsions useful in preparing water-vapor impermeable paper board; as agents in paraffin solvents; as agents in preparing thickened silica aerogel lubricants; as gasoline anti-oxidant additives; as deicing agents for fuels; as antiseptic, preservative, bactericidal, bacteriostatic, germicidal, fungicidal agents; as agents for the textile industry, for example, as mercerizing assistants, as wetting agents, as rewetting agents, as dispersing agents, as detergents, as penetrating agents, as softening agents, as dyeing assistants, as anti-static agents, and the like; as additives for rubber latices; as entraining agents for concrete and cements; as anti-static agents for rugs, floors, upholstery, plastic and wax polishes, textiles, etc.; as detergents useful in metal cleaners, in floor oils, in dry cleaning, in general cleaning, and the like; as agents useful in leather processes such as in flat liquoring, pickling, acid degreasing, dye fixing, and the like; as agents in metal pickling; as additives in paints for improved adhesion of primers, in preventing water-spotting in lacquer; as anti-skinners for pigment flushing, grinding and dispersing, as anti-feathering agents in ink; as agents in the preparation of wood pulp and pulp slurries, as emulsifiers for insecticidal compositions and agricultural sprays such as DDT, 24-D (Toxaphene), chlordane, nicotine sulfate, hexachloracyclohexane, and the like; as agents useful in building materials, for example, in the water repellent treatment of plaster, concrete, cement, roofing materials, floor sealers; as additives in bonding agents for various insulating building materials; and the like.

The reasons for the unexpected monomeric form and properties of the polyaminomethyl phenol are not understood. However, we have discovered that when (1) A preformed methylolphenol (i.e. formed prior to the addition of the polyamine) employed as a starting material is reacted with
(2) A polyamine which contains at least one secondary amino group
(3) In amounts of at least one mole of secondary polyamine per equivalent of methylol group on the phenol,
(4) In the absence of an extraneous catalyst, until
(5) About one mole of water per equivalent of methylol group is removed, then a monomeric polyaminomethyl phenol is produced which is capable of being oxyalkylated, acylated, oxyalkylated then acylated, or acylated then oxyalkylated, or acylated, then oxyalkylated and then acylated to provide the superior products of this invention which have the broad spectrum of uses disclosed above. All of the above five conditions are critical for the production of these monomeric polyaminomethyl phenols.

In contrast, if the methylol phenol is not preformed but is formed in the presence of the polyamine, or the preformed methylol phenol is condensed with the polyamine in the presence of an extraneous catalyst, either acidic or basic, for example, basic or alkaline materials such as NaOH, Ca(OH)$_2$, Na$_2$CO$_3$, sodium methylate, etc., a polymeric product is formed. Thus, if an alkali metal phenate is employed in place of the free phenol, or even if a lesser quantity of alkali metal is present than is required to form the phenate, a polymeric product is formed. Where a polyamine containing only primary amino groups and no secondary amino groups is reacted with a methylol phenol, a polymeric product is also produced. Similarly, where less than one mole of secondary amine is reacted per equivalent of methylol group, a polymeric product is also formed.

In general, the monomeric polyaminomethyl phenols are prepared by condensing the methylol phenol with the secondary amine as disclosed above, said condensation being conducted at a temperature sufficiently high to eliminate water but below the pyrolytic point of the reactants and product, for example, at 80° to 200° C., but preferably at 100° to 150° C. During the course of the condensation water can be removed by any suitable means, for example, by use of an azetroping agent, reduced pressure, combinations thereof, etc. Measuring the water given off during the reaction is a convenient method of judging completion of the reaction.

The classes of methylol phenols employed in the condensation are as follows:

*Monophenols.*—A phenol containing 1, 2 or 3 methylol groups in the ortho or para position (i.e. the 2, 4, 6 positions), the remaining positions on the ring containing hydrogen or groups which do not interfere with the polyamine-methylol group condensation, for example, alkyl, alkenyl, cycloalkyl, phenyl, halogen, and alkoxy, etc., groups, and having but one nuclear linked hydroxyl group.

*Diphenols.*—One type is a diphenol containing two hydroxybenzene radicals directly joined together through the ortho or para (i.e. 2, 4, or 6) position with a bond joining the carbon of one ring with the carbon of the other ring, each hydroxybenzene radical containing 1 to 2 methylol groups in the 2, 4 or 6 positions, the remaining positions on each ring containing hydrogen or groups which do not interfere with the polyamine-methylol group condensation, for example, alkyl, alkenyl, cycloalkyl, phenyl, halogen, alkoxy, etc., groups, and having but two nuclear linked hydroxyl groups.

A second type is a diphenol containing two hydroxybenzene radicals joined together through the ortho or para (i.e. 2, 4, or 6 position) with a bridge joining the carbon of one ring to a carbon of the other ring, said bridge being, for example, alkylene, alkylidene, oxygen, carbonyl, sulfur, sulfoxide and sulfone, etc., each hydroxybenzene radical containing 1 to 2 methylol groups in the 2, 4, or 6 positions, the remaining positions on each ring containing hydrogen or groups which do not interfere with the polyaminomethylol group condensation, for example, alkyl, alkenyl, cycloalkyl, phenyl, halogen, alkoxy, etc., groups, and having but two nuclear linked hydroxyl groups.

The secondary polyamines employed in producing the condensate are illustrated by the following general formula:

$$HN\begin{matrix}R\\ \\R\end{matrix}$$

where at least one of the R's contains an amino group and the R's contain alkyl, alkoxy, cycloalkyl, aryl, aralkyl, alkaryl radicals, and the corresponding radicals containing heterocyclic radicals, hydroxy radicals, etc. The R's may also be joined together to form heterocyclic polyamines. The preferred classes of polyamines are the alkylene polyamines, the hydroxylated alkylene polyamines, branched polyamines containing at least three primary amino groups, and polyamines containing cyclic amidine groups. The only limitation is that there shall be present in the polyamine at least one secondary amino group which is not bonded directly to a negative radical which reduces the basicity of the amine, such as a phenyl group.

An unusual feature of the present invention is the discovery that methylol phenols react more readily under the herein specified conditions with secondary amino groups than with primary amino groups. Thus, where both primary and secondary amino groups are present in the same molecule, reaction ocurs more readily with the secondary amino group. However, where the polyamine contains only primary amino groups, the product formed under reaction conditions as mentioned above is an insoluble resin. In contrast, where the same number of primary amino groups are present on the amine in addition to at least one secondary amino group, reaction occurs predominantly with the secondary amino group to form non-resinous derivatives. Thus, where trimethylol phenol is reacted with ethylene diamine, an insoluble resinous composition is produced. However, where diethylene triamine, a compound having just as many primary amino groups as ethylene diamine, is reacted, according to this invention a non-resinous product is unexpectedly formed.

The term "monomeric" as employed in the specification and claims refers to a polyaminomethylphenol containing within the molecular unit one aromatic unit corresponding to the aromatic unit derived from the starting methylol phenol and one polyamine unit for each methylol group originally in the phenol. This is in contrast to a polymeric or resinous polyaminomethyl phenol containing within the molecular unit more than one aromatic unit and/or more than one polyamino unit for each methylol group.

The monomeric products produced by the condensation of the methylol phenol and the secondary amine may be illustrated by the following "idealized" formula:

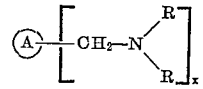

where A is the aromatic unit corresponding to that of the methylol reactant, and the remainder of the molecule is the polyaminomethyl radical, one for each of the original methylol groups.

This condensation reaction may be followed by oxyalkylation in the conventional manner, for example, by means of an alpha-beta alkylene oxide such as ethylene oxide, propylene oxide, butylene oxide, octylene oxide, a higher alkylene oxide, styrene oxide, glycide, methylglycide, etc., or combinations thereof. Depending on the particular application desired, one may combine a large proportion of alkylene oxide, particularly ethylene oxide, propylene oxide, a combination or alternate additions or propylene oxide and ethylene oxide, or smaller proportions thereof in relation to the methylol phenol-amine condensation product. Thus, the molar ratio of alkylene oxide to amine condensate can range within wide limits, for example, from a 1:1 mole ratio to a ratio of 1000:1, or higher, but preferably 1 to 200. For example, in demulsification extremely high alkylene oxide ratios are advantageously employed such as 200–300 or more pounds of alkylene oxide per pound of amine condensate. On the other hand, for certain applications such as corrosion prevention and use as fuel oil additives, lower ratios of alkylene oxides are advantageously employed, i.e. 1–50 moles of alkylene oxide per mole of amine condensate. By proper control, desired hydrophilic or hydrophobic properties are imparted to the composition. As is well known, oxyalkylation reactions are conducted under a wide variety of conditions, at low or high pressures, at low or high temperatures, in the presence or absence of catalyst, solvent, etc. For instance oxyalkylation reactions can be carried out at temperatures of from 80–200° C., and pressures of from 10 to 200 p.s.i., and times of from 15 min. to several days. Preferably oxyalkylation reactions are carried out at 80 to 120° C. and 10 to 30 p.s.i. For conditions of oxyalkylation reactions see U.S. Patent 2,792,369 and other patents mentioned therein.

As in the amine condensation, acylation is conducted at a temperature sufficiently high to eliminate water and below the pyrolytic point of the reactants and the reaction products. In general, the reaction is carried out at a temperature of from 140° to 280° C., but preferably at 140° to 200° C. In acylating, one should control the reaction so that the phenolic hydroxyls are not acylated. Because acyl halides and anhydrides are capable of reacting with phenolic hydroxyls, this type of acylation should be avoided. It should be realized that either oxyalkylation or acylation can be employed alone or each alternately, either one preceding the other. In addition, the amine condensate can be acylated, then oxyalkylated and then reacylated. The amount of acylation agent reacted will depend on reactive groups or the compounds and properties desired in the final product, for example, the molar ratios of acylation agent to amine condensate can range from 1 to 15, or higher, but preferably 1 to 4.

Where the above amine condensates are treated with alkylene oxides, the product formed will depend on many factors, for example, whether the amine employed is hydroxylated, etc. Where the amines employed are non-hydroxylated, the amine condensate is at least suscepti- ble to oxyalkylation through the phenolic hydroxyl radical. Although the polyamine is non-hydroxylated, it may have one or more primary or secondary amino groups which may be oxyalkylated, for example, in the case of tetraethylene pentamine. Such groups may or may not be susceptible to oxyalkylation for reasons which are obscure. Where the non-hydroxylated amine contains a plurality of secondary amino groups, wherein one or more is susceptible to oxyalkylation, or primary amino groups, oxyalkylation may occur in those positions. Thus, in the case of the nonhydroxylated polyamines oxyalkylation may take place not only at the phenolic hydroxyl group but also at one or more of the available amino groups. Where the amine condensate is hydroxyalkylated, this latter group furnishes an additional position of oxyalkylation susceptibility.

The product formed in acylation will vary with the particular polyaminomethyl phenol employed. It may be an ester or an amide depending on the available reactive groups. If, however, after forming the amide at a temperature between 140°–250° C., but usually not above 200° C., one heats such products at a higher range, approximately 250–280° C., or higher, possibly up to 300° C. for a suitable period of time, for example, 1–2 hours or longer, one can in many cases recover a second mole of water for each mole of carboxylic acid employed, the first mole of water being evolved during amidification. The product formed in such cases is believed to contain a cyclic amidine ring such as an imidazoline or a tetrahydropyrimidine ring.

Ordinarily the methods employed for the production of amino imidazolines result in the formation of substantial amounts of other products such as amido imidazolines. However, certain procedures are well known by which the yield of amino imidazolines is comparatively high as, for example, by the use of a polyamine in which one of the terminal hydrogen atoms has been replaced by a low molal alkyl group or an hydroxyalkyl group, and by the use of salts in which the polyamine has been converted into a monosalt such as combination with hydrochloric acid or paratoluene sulfonic acid. Other procedures involve reaction with a hydroxyalkyl ethylene diamine and further treatment of such imidazoline having a hydroxyalkyl substituent with two or more moles of ethylene imine. Other well known procedures may be employed to give comparatively high yields.

Other very useful derivatives of the composition of this invention comprise acid salts and quaternary salts, derived therefrom. Since the compositions of this invention contain basic nitrogen groups, they are capable of reacting with inorganic acids, for example hydrohalogens (HCl, HBr, HI, sulfuric acid, phosphoric acid, etc., aliphatic acids, acetic, proprionic, glycolic, diglycolic, etc.) aromatic acids, (benzoic, salicylic, phthalic, etc.) and organic compounds capable of forming salts, for example, those having the general formula RX wherein R is an organic group, such as an alkyl group (e.g. methyl, ethyl, propyl, butyl, octyl, nonyl, decyl, undecyl, dodecyl, undecyl, tridecyl, pentadecyl, oleyl, octadecyl, etc.), cycloalkyl (e.g. cyclopentyl, cyclohexyl, etc.), aralkyl (e.g. benzyl, etc.), aralkyl (e.g. benzyl, etc.), and the like, and X is a radical capable of forming a salt such as those derived from acids (e.g. halide, sulfate, phosphate, sulfonate, etc., radicals). The preparation of these salts and quartternary compounds is well known to the chemical art. For example, they may be prepared by adding suitable acids (for example, any of those mentioned herein as acylating agent) to solutions of the basic composition or by heating such compounds as alkyl halides with these compositions. Diacid and quaternary salts can also be formed by reacting alkylene dihalides, polyacids, etc. The number of moles of acid and quaternary compounds that may react with the composition of this invention will, of course, depend on the number of basic nitrogen groups in the molecule. These salts may be represented by the general formula N+X−, wherein N comprises the part of the compound containing the nitrogen group which has been rendered positively charged by the H or R of the alkylating compound and X represents the anion derived from the alkylating compound.

THE METHYLOL PHENOL

As previously stated, the methylol phenols include monophenols and diphenols. The methylol groups on the phenol are either in one or two ortho positions or in the para position of the phenolic rings. The remaining phenolic ring positions are either unsubstituted or substituted with groups not interfering with the amine methylol condensation. Thus, the monophenols have 1, 2 or 3 methylol groups and the diphenols contain 1, 2, 3 or 4 methylol groups.

The following is the monophenol most advantageously employed:

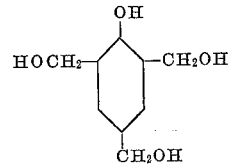

This compound, 2,4,6 trimethylol phenol (TMP) is available commercially in 70% aqueous solutions. The designation TMP is sometimes used to designate trimethylol propane. Apparently no confusion is involved, in light of the obvious differences.

A second monophenol which can be advantageously employed is:

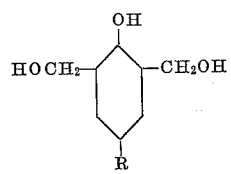

where R is an aliphatic saturated or unsaturated hydrocarbon having, for example, 1–30 carbon atoms, for example, methyl, ethyl, propyl, butyl, sec-butyl, tert-butyl, amyl, tert-amyl, hexyl, tert-hexyl, octyl, nonyl, decyl, dodecyl, octo-decyl, etc., the corresponding unsaturated groups, etc.

The third monophenol advantageously employed is:

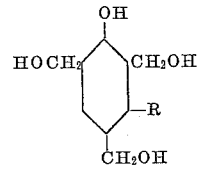

where R comprises an aliphatic saturated or unsaturated hydrocarbon as stated above in the second monophenol, for example, that derived from cardanol or hydrocardanol.

The following are diphenol species advantageously employed:

One species is

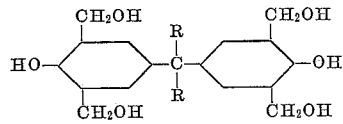

where R is hydrogen or a lower alkyl, preferably methyl.

A second species is

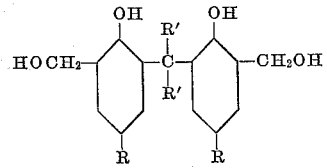

where R has the same meaning as that of the second species of the monophenols and R' is hydrogen or a lower alkyl, preferably methyl.

We can employ a wide variety of methylol phenols in the reaction, and the reaction appears to be generally applicable to the classes of phenols heretofore specified. Examples of suitable methylol phenols includes.

Monophenols:
    2-methylol phenol
    2,6-dimethylol, 4-methyl phenol
    2,4,6-trimethylol phenol
    2,6-dimethylol, 4-cyclohexyl phenol
    2,6-dimethylol-4-phenyl phenol
    2,6-dimethylol-4-methoxyphenol
    2,6-dimethylol-4-chlorophenol
    2,6-dimethylol-3-methylphenol
    2,6-dimethylol-4-sec-butylphenol
    2,6-dimethylol-3,5-dimethyl-4-chlorophenol
    2,4,6-trimethylol,3-pentadecyl phenol
    2,4,6-trimethylol,3-pentadecadienyl phenol Diphenols:

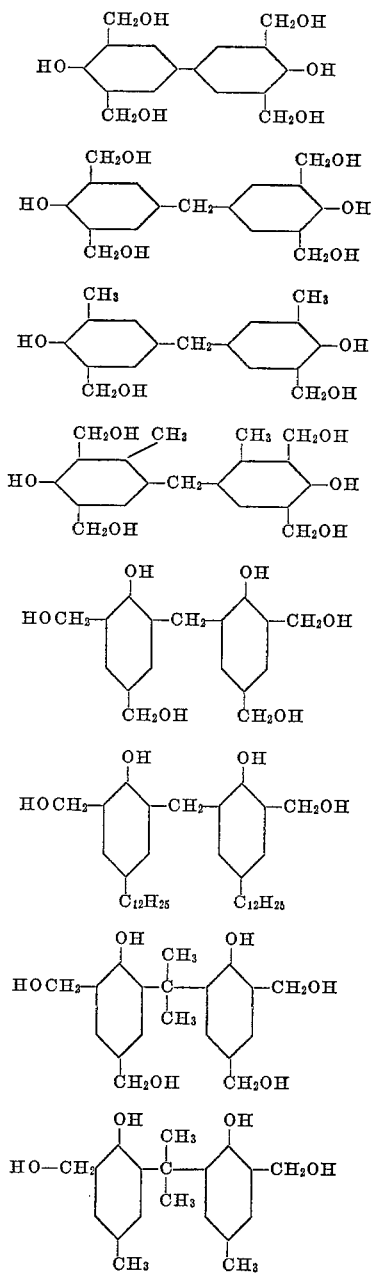
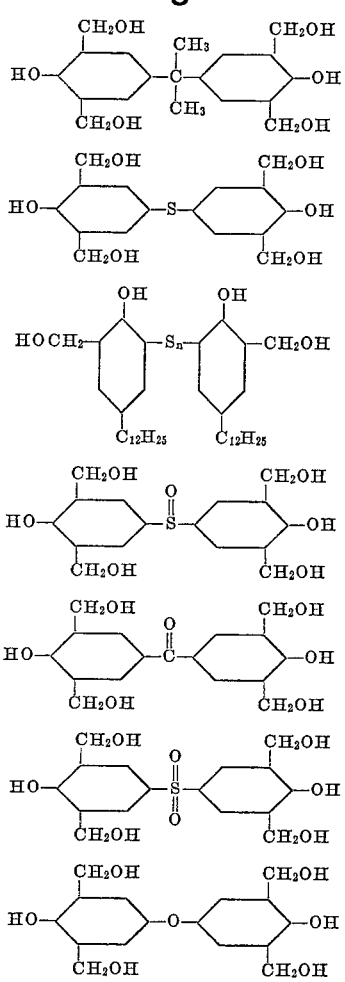

Examples of additional methylol phenols which can be employed to give the useful products of this invention are described in "The Chemistry of Phenolic Resins," by Robert W. Martin, Tables V and VI, pp. 32–39 (Wiley, 1956).

THE POLYAMINE

As noted previously, the general formula for the polyamine is

This indicates that a wide variety of reactive secondary polyamines can be employed, including aliphatic polyamines, cycloaliphatic polyamines, aromatic polyamines (provided the aromatic polyamine has at least one secondary amine which has no negative group, such as a phenyl group directly bonded thereto) heterocyclic polyamines and polyamines containing mixtures of the above groups. Thus, the term "polyamine" includes compounds having one amino group on one kind of radical, for example, an aliphatic radical, and another amino group on the heterocyclic radical as in the case of the following formula:

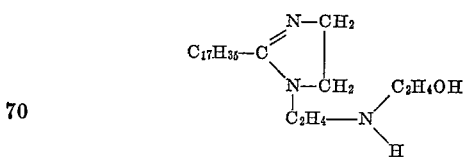

provided, of course, the polyamine has at least one secondary amino group capable of condensing with the methylol group. It also includes compounds which are totally heterocyclic, having a similarly reactive secondary amino group. It also includes polyamines having other elements besides carbon, hydrogen and nitrogen, for example, those also containing oxygen, sulfur, etc. As previously stated, the preferred embodiments of the present invention are the alkylene polyamines, the hydroxylated alkylene polyamines and the amino cyclic amidines.

Polyamines are available commercially and can be prepared by well-known methods. It is well known that olefin dichlorides, particularly those containing from 2 to 10 carbon atoms, can be reacted with ammonia or amines to give alkylene polyamines. If, instead of using ethylene dichloride, the corresponding propylene, butylene, amylene or higher molecular weight dichlorides are used, one then obtains the comparable homologues. One can use alpha-omega dialkyl ethers such as $ClCH_2OCH_2Cl$; $ClCH_2CH_2OCH_2CH_2Cl$, and the like. Such polyamines can be alkylated in the manner commonly employed for alkylating monoamines. Such alkylation results in products which are symmetrically or non-symmetrically alkylated. The symmetrically alkylated polyamines are most readily obtainable. For instance, alkylated products can be derived by reaction between alkyl chloride, such as propyl chloride, butyl chloride, amyl chloride, cetyl chloride, and the like and a polyamine having one or more primary amino groups. Such reactions result in the formation of hydrochloric acid, and hence the resultant product is an amine hydrochloride. The conventional method for conversion into the base is to treat with dilute caustic solution. Alkylation is not limited to the introduction of an alkyl group, but as a matter of fact, the radical introduced can be characterized by a carbon atom chain interrupted at least once by an oxygen atom. In other words, alkylation is accomplished by compounds which are essentially alkyoxyalkyl chlorides, as, for example, the following:

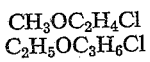    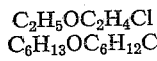
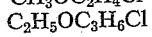    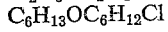

The reaction involving the alkylene dichlorides is not limited to ammonia, but also involves amines, such as ethylamine, propylamine, butylamine, octylamine, decylamine, cetylamine, dodecylamine, etc. Cycloaliphatic and aromatic amines are also reactive. Similarly, the reaction also involves the comparable secondary amines, in which various alkyl radicals previously mentioned appear twice and are types in which two dissimilar radicals appear, for instance, amyl butylamine, hexyl octylamine, etc. Furthermore, compounds derived by reactions involving alkylene dichlorides and a mixture of ammonia and amines, or a mixture of two different amines are useful. However, one need not employ a polyamine having an alkyl radical. For instance, any suitable polyalkylene polyamine, such as an ethylene polyamide, a propylene polyamine, etc., treated with ethylene oxide or similar oxyalkylating agent are useful. Furthermore, various hydroxylated amines, such as monoethanolamine, monopropanolamine, and the like, are also treated with a suitable alkylene dichloride, such as ethylene dichloride, propylene dichloride, etc.

As to the introduction of a hydroxylated group, one can use any one of a number of well-known procedures such as alkylation, involving a chlorhydrin, such as ethylene chlorhydrin, glycerol chlorhydrin, or the like. Such reaction are entirely comparable to the alkylation reaction involving alkyl chlorides previously described. Other reactions involve the use of an alkylene oxide, such as ethylene oxide, propylene oxide, butylene oxide, octylene oxide, styrene oxide or the like. Glycide is advantageously employed. The type of reaction just referred to is well known and results in the introduction of a hydroxylated or polyhydroxylated radical in an amino hydrogen position. It is also possible to introduce a hydroxylated oxyhydrocarbon atom; for instance, instead of using the chlorhydrin corresponding to ethylene glycol, one employs the chlorhydrin corresponding to diethylene glycol. Similarly, instead of using the chlorhydrin corresponding to glycerol, one employs the chlorhydrin corresponding to diglycerol.

From the above description it can be seen that many of the above polyamines can be characterized by the general formula

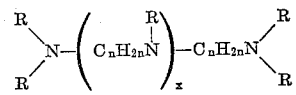

where the R's, which are the same or different, comprise hydrogen, alkyl, cycloalkyl, aryl, alkyloxyalkyl, hydroxylated alkyl, hydroxylated alkyloxyalkyl, etc., radicals, $x$ is zero or a whole number of at least one, for example 1 to 10, but preferably 1 to 3, provided the polyamine contains at least one secondary amino group, and $n$ is a whole number, 2 or greater, for example 2–10, but preferably 2–5. Of course, it should be realized that the amino or hydroxyl group may be modified by acylation to form amides, esters or mixtures thereof, prior to the methylolamino condensation provided at least one active secondary amine group remains on the molecule. Any of the suitable acylating agents herein described may be employed in this acylation. Prior acylation of the amine can advantageously be used instead of acylation subsequent to amine condensation.

A particularly useful class of polyamines is a class of branched polyamines. These branched polyamines are polyalkylene polyamines wherein the branched group is a side chain containing on the average at least one nitrogen-bonded aminoalkylene

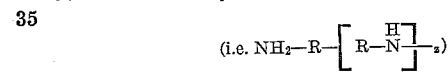

group per nine amino units present on the main chain, for example 1–4 of such branched chains per nine units on the main chain, but preferably one side chain unit per nine main chain units. Thus, these polyamines contain at least three primary amino groups and at least one tertiary amino group in addition to at least one secondary amino group.

These branched polyamines may be expressed by the formula

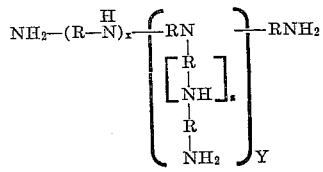

wherein R is an alkylene group such as ethylene, propylene, butylene and other homologues (both straight chained and branched), etc., but preferably ethylene; and $x$, $y$ and $z$ are integers, $x$ being for example, from 4 to 24 or more but preferably 6 to 18, $y$ being for example 1 to 6 or more but preferably 1 to 3, and $z$ being for example 0–6 but preferably 0–1. The $x$ and $y$ units may be sequential, alternative, orderly or randomly distributed.

The preferred class of branched polyamines includes those of the formula

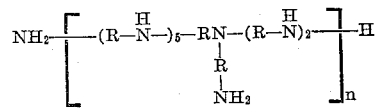

where $n$ is an integer, for example 1–20 or more but preferably 1–3, wherein R is preferably ethylene, but may be propylene, butylene, etc. (straight chained or branched).

The particularly preferred branched polyamines are presented by the following formula:

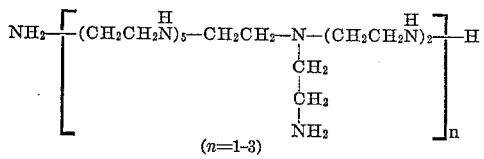
(n=1-3)

The radicals in the brackets may be joined in a head-to-head or a head-to-tail fashion. Compounds described by this formula wherein $n=1-3$ are manufactured and sold by Dow Chemical Company as Polyamines N–400, N–800, N–1200, etc. Polyamine N–400 has the above formula wherein $n=1$ and was the branched polyamine employed in all of the specific examples.

The branched polyamines can be prepared by a wide variety of methods. One method comprises the reaction of ethanolamine and ammonia under pressure over a fixed bed of a metel hydrogenation catalyst. By controlling the conditions of this reaction one can obtain various amounts of piperazine and polyamines as well as the branched chain polyalkylene polyamine. This process is described in Australian Patent No. 42,189 and in the East German Patent 14,480 (March 17, 1958) reported in Chem. Abstracts, August 10, 1958, 14129.

The branched polyamines can also be prepared by the following reactions:

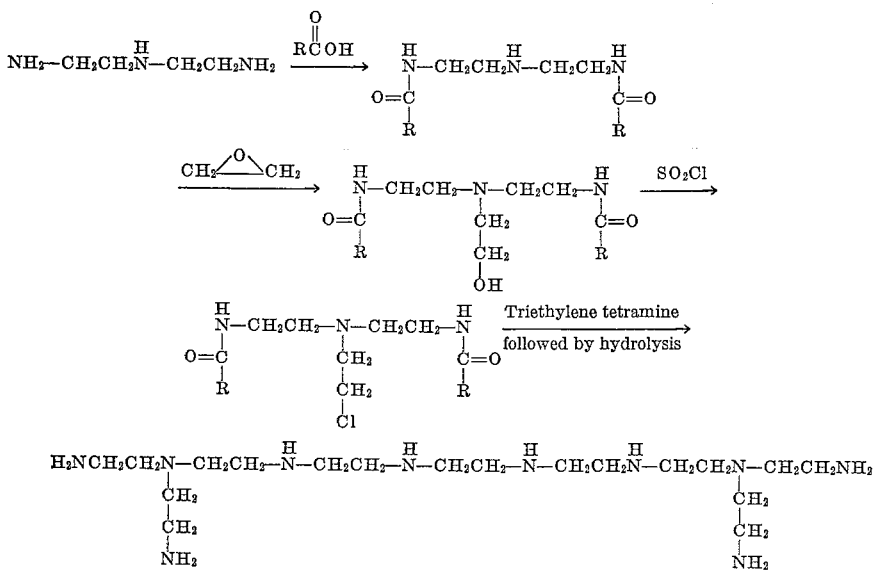

Variations on the above procedure can produce other branched polyamines.

The branched nature of the polyamine imparts unusual properties to the polyamine and its derivatives. Cyclic aliphatic polyamines having at least one secondary amino group such as piperazine, etc., can also be employed.

It should be understood that diamines containing a secondary amino group may be employed. Thus, where $x$ in the linear polyalkylene amine is equal to zero, at least one of the R's would have to be hydrogen, for example, a compound of the following formula:

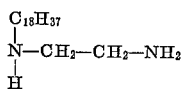

Suitable polyamines also include polyamines wherein the alkylene group or groups are interrupted by an oxygen radical, for example,

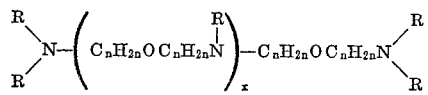

or mixtures of these groups and alkylene groups, for example,

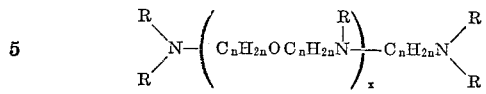

where R, $n$ and $x$ has the meaning previously stated for the linear polyamine.

For convenience the aliphatic polyamines have been classified as nonhydroxylated and hydroxylated alkylene polyamino amines. The following are representative members of the nonhydroxylated series:

Diethylene triamine,
Dipropylene triamine,
Dibutylene triamine, etc.
Triethylene tetramine,
Tripropylene tetramine,
Tributylene tetramine, etc.,
Tetraethylene pentamine,
Tetrapropylene pentamine,
Tetrabutylene pentamine, etc.,
Mixtures of the above,
Mixed ethylene, propylene, and/or butylene, etc., polyamines and other members of the series.

The above polyamines modified with higher molecular weight aliphatic groups, for example, those having from 8–30 or more carbon atoms, a typical example of which is

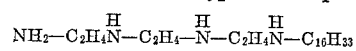

where the aliphatic group is derived from any suitable source, for example, from compounds of animal or vegetable origin, such as coconut oil, tallow, tall oil, soya, etc., are very useful. In addition, the polyamine can contain other alkylene groups, fewer amino groups, additional higher aliphatic groups, etc., provided the polyamine has at least one reactive secondary amino group. Compositions of this type are described in U.S. Patent 2,267,205.

Other useful aliphatic polyamines are those containing-substituted groups on the chain, for example, aromatic groups, heterocyclic groups, etc., such as a compound of the formula

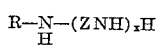

where R is alkyl and Z is an alkylene group containing phenyl groups on some of the alkylene radicals since the phenyl group is not attached directly to the secondary amino group.

In addition, the alkylene group substituted with a hydroxy group

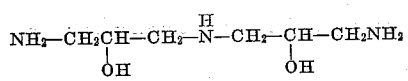

is reactive.

Polyamines containing aromatic groups in the main part of the chain are useful, for example, N,N'-dimethyl-p-xylylenediamine.

Examples of polyamines containing solely secondary amino groups include the following:

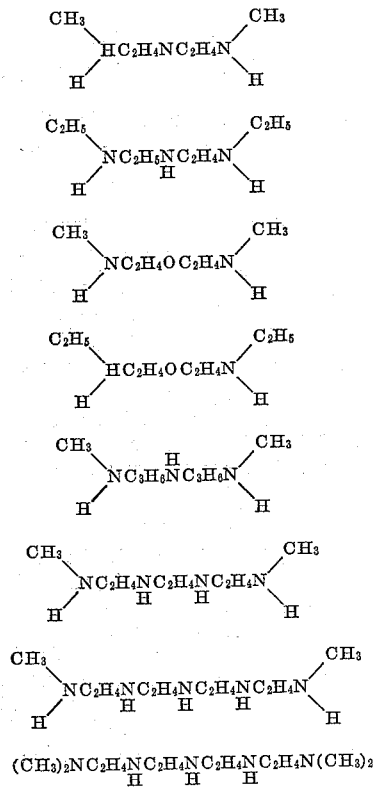

Examples of polyamines having hydroxylated groups include the following:

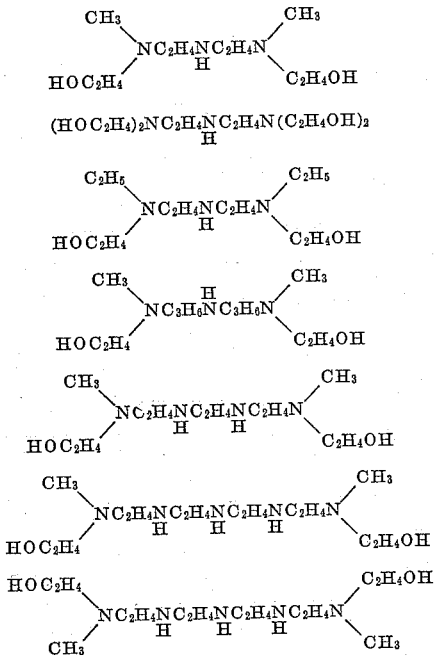

Suitable cyclic amidines include

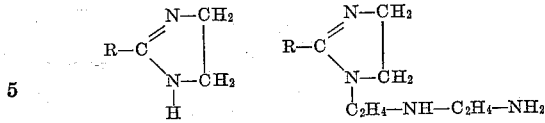

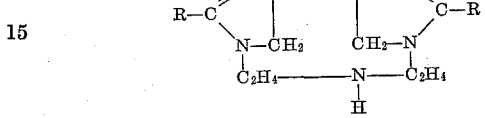

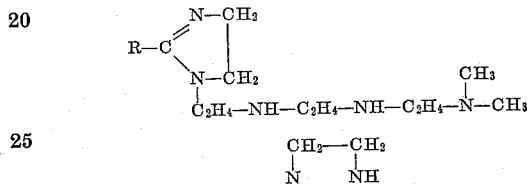

wherein R is a hydrocarbon group,

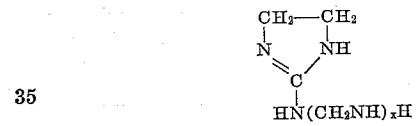

where $x = 1–5$.

2-undecylimidazoline
2-heptadecylimidazoline
2-oleylimidazoline
1-N-decylaminoethyl,2-ethylimidazoline
2-methyl, 1-hexadecylaminoethylaminoethylimidazoline
1-dodecylaminopropylimidazoline
1-(stearoyloxyethyl)aminoethylimidazoline
1-stearamidoethylaminoethylimidazoline
2-heptadecyl,4-5-dimethylimidazoline
1-dodecylaminohexylimidazoline
1-stearoyloxyethylaminohexylimidazoline
2-heptadecyl,1-methylaminoethyl tetrahydropyrimidine
4-methyl,2-dodecyl,1-methylaminoethylaminoethyl tetrahydropyrimidine

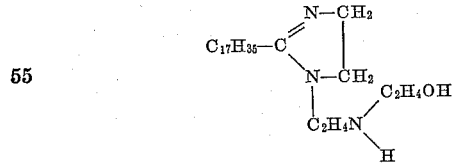

As previously stated, there must be reacted at least one mole of polyamine per equivalent of methylol group. The upper limit to the amount of amine present will be determined by convenience and economics, for example, 1 or more moles of polyamine per equivalent of methylol group can be employed.

The following examples are illustrative of the preparation of the polyaminomethylol phenol condensate and are not intended for purposes of limitation.

The following general procedure is employed in preparing the polyamine-methylol condensate. The methylolphenol is generally mixed or slowly added to the polyamine in ratios of 1 mole of polyamine per equivalent of methylol group on the phenol. However, where the polyamine is added to the methylolphenol, addition is carried out below 60° C. until at least one mole of polyamine per methylol group has been added. Enough of a suitable azeotroping agent is then added to remove water (benzene, toluene, or xylene) and heat applied. After removal of the calculated amount of water from the reaction mixture (one mole of water per equivalent of methylol group) heating is stopped and the azeotroping agent is evaporated off under vacuum. Although the reaction takes place at room temperature, higher temperatures are required to complete the reaction. Thus, the temperature during the reaction generally varies from 80–160° C. and the time from 4–24 hours. In general, the reaction can be effected in the lower time range employing higher temperatures. However, the time test of completion of reaction is the amount of water removed.

*Example 1a*

This example illustrates the reaction of a methylol-monophenol and a polyamine. A liter flask is employed with a conventional stirring device, thermometer, phase separating trap condenser, heating mantle, etc. 70% aqueous 2,4,6-trimethylol phenol which can be prepared by conventional procedures or purchased in the open market, in this instance, the latter, is employed. The amount used is one gram mole, i.e. 182 grams, of anhydrous trimethylol phenol in 82 grams of water. This represents three equivalents of methylol groups. This solution is added dropwise with stirring to three gram moles (309 grams) of diethylene triamine dissolved in 100 ml. of xylene over about 30 minutes. An exothermic reaction takes place at this point but the temperature is maintained below approximately 60° C. The temperature is then raised so that distillation takes place with the removal of the predetermined amount of water, i.e., the water of solution as well as water of reaction. The water of reaction represents 3 gram moles or 54 grams.

The entire procedure including the initial addition of the trimethylol phenol until the end of the reaction is approximately 6 hours. At the end of the reaction period the xylene is removed, using a vacuum of approximately 80 mm. The resulting product is a viscous water-soluble liquid of a dark red color.

*Example 28a*

This example illustrates the reaction of a methylol-monophenol and a branched polyamine. A one liter flask is employed equipped with a conventional stirring device, thermometer, phase separating trap, condenser, heating mantle, etc. Polyamine N–400, 200 grams (0.50 mole), is placed in the flask and mixed with 150 grams of xylene. To this stirred mixture is added dropwise over a period of 15 minutes 44.0 grams (0.17 mole) of a 70% aqueous solution of 2,4,6-trimethylol phenol. There is no apparent temperature change. The reaction mixture is then heated to 140° C., refluxed 45 minutes, and 24 milliliters of water is collected (the calculated amount of water is 22 milliliters). The product is a dark brown liquid (as a 68% xylene solution).

*Example 2d*

This example illustrates the reaction of a methylol diphenol.
One mole of substantially water-free

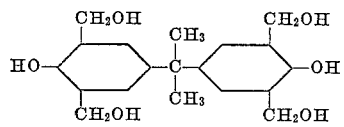

and 4 moles of triethylenetetramine in 300 ml. of xylene are mixed with stirring. Although an exothermic reaction takes place during the mixing, the temperature is maintained below 60° C. The reaction mixture is then heated and azeotroped until the calculated amount (72 g.) of water is removed (4 moles of water of reaction). The maximum temperature is 150° C. and the total reaction time is 8 hours. Xylene is then removed under vacuum. The product is a viscous water-soluble liquid.

*Example 5b*

In this example, 1 mole of substantially water-free

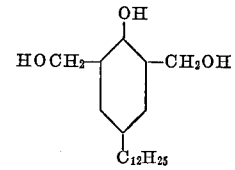

is reacted with 2 moles of Duomeen S (Armour Co.),

where R is a fatty group derived from soya oil, in the manner of Example 2a. Xylene is used as both solvent and azeotroping agent. The reaction time is 8 hours and the maximum temperature 150–160° C.

*Example 28b*

This experiment is carried out in the same equipment as is employed in Example 28a except that a 300 milliliter flask is used. Into the flask is placed 50 grams of xylene and 8.4 grams (0.05 mole) of 2,6-dimethylol-4-methylphenol are added. The resulting slurry is stirred and warmed up to 80° C. Polyamine N–400, 40.0 grams (0.10 mole) is added slowly over a period of 45 minutes. Solution takes place upon the addition of the polyamine. The reaction mixture is refluxed for about 4 hours at 140° C. and 1.8 milliliters of water is collected, the calculated amount. The product, as a xylene solution, is a brown liquid.

*Example 29b*

This experiment is carried out in the same equipment and in the same manner as is employed in Example 28b. To a slurry of 10.5 grams (0.05 mole) of 2,6-dimethylol-4-tertiarybutylphenol in 50 grams of xylene, 40 grams (0.10 mole) of Polyamine N–400 are added all at once with stirring and the mixture is heated and refluxed at 140° C. for 4 hours with the collection of 1.6 milliliters of water. The calculated amount of water is 1.8 milliliters. The product, as a xylene solution, is reddish brown.

*Example 30b*

This experiment is carried out in the same equipment and in the same manner as is employed in Example 28b. To a slurry of 14.0 grams of 2,6-dimethylol-4-nonylphenol in 50 milliliters of benzene, 40.0 grams (0.10 mole) of Polyamine N–400 are added all at once with stirring and the mixture is heated and refluxed at 140° C. for 6 hours with the collection of 1.8 milliliters of water. The calculated amount of water is 1.8 milliliters. The product, as a xylene solution, is dark brown.

The following amino-methylol condensates shown in Tables I–IV are prepared in the manner of Examples 1a, 2d, and 5b. In each case one mole of polyamine per equivalent of methylol group on the phenol is reacted and the reaction carried out until, taking into consideration the water originally present, about one mole of water is removed for each equivalent of methylol group present on the phenol.

The pH of the reaction mixture is determined solely by the reactants (i.e., no inorganic base, such as $Ca(OH)_2$, NaOH, etc. or other extraneous catalyst is present). Examples 1a, 2d, and 5b are also shown in the tables. Attempts are made in the examples to employ commercially available materials where possible.

In the following tables the examples will be numbered by a method which will describe the nature of the product. The polyamine-methylol condensate will have a basic number, for example, 1a, 4b, 6c, 4d, wherein those in the A series are derived from TMP, the B series from DMP, the C series from trimethylol cardanol and side chain hydrogenated cardanol (i.e., hydrocardanol), and the d series from the tetramethylol diphenols. The basic number always refers to the same amino condensate. The symbol A before the basic number indicates that the polyamine had been acylated prior to condensation. The symbol A after the basic number indicates that acylation takes place after condensation.

A25a means that the 25a (amino condensate) was prepared from an amine which had been acylated prior to condensation. However, 10aA means that the condensate was acylated after condensation. The symbol O indicates oxyalkylation. Thus 10aAO indicates that the amine condensate 10a has been acylated (10aA), followed by oxyalkylation. 10aAOA means that the same condensate, 10a has been acylated (10aA) then oxyalkylated (10aAO) and then acylated. In other words, these symbols indicate both kind and order of treatment.

TABLE I

Reaction of

HOCH$_2$—⟨OH⟩—CH$_2$OH (designated TMP) and polyamines

CH$_2$OH

[Molar ratio TMP to amine 1:3]

| Example | Polyamine |
|---|---|
| 1a | Diethylene triamine. |
| 2a | Triethylene tetramine. |
| 3a | Tetraethylene pentamine. |
| 4a | Dipropylene triamine. |
| 5a | Duomeen S (Armour Co.) $$R-\overset{H}{N}-CH_2CH_2CH_2NH_2$$ R derived from soya oil |
| 6a | Duomeen T (Armour Co.) $$R-\overset{H}{N}-CH_2CH_2CH_2NH_2$$ R derived from tallow |
| 7a | Oxyethylated Duomeen S. $$R-\overset{H}{N}-CH_2CH_2CH_2N\overset{C_2H_4OH}{\underset{H}{\diagdown}}$$ |
| 8a | Oxyethylated Duomeen T. $$R-\overset{H}{N}-CH_2CH_2CH_2N\overset{C_2H_4OH}{\underset{H}{\diagdown}}$$ |
| 9a | Amine ODT (Monsanto). $$C_{12}H_{25}-\overset{H}{N}-C_2H_4\overset{H}{N}-C_2H_4NH_2$$ |
| 10a | Oxyethylated Amine ODT. $$C_{12}H_{25}-\overset{H}{N}-C_2H_4\overset{H}{N}-C_2H_4N\overset{C_2H_4OH}{\underset{H}{\diagdown}}$$ |
| 11a | N-(2-hydroxyethyl)-2-methyl-1,2-propanediamine. |
| 12a | N-methyl ethylene diamine. |
| 13a | N,N'-dimethyl ethylene diamine. |
| 14a | Hydroxyethyl ethylene diamine. |
| 15a | N,N'-dihydroxyethylethylene diamine. |
| 16a | N-methyl propylene diamine. |
| 17a | N,N'dihydroxyethyl propylene diamine. |
| 18a | N,N'-dihydroxypropyl propylene diamine |
| 19a | $$HOC_2H_4-\overset{H}{N}C_2H_4O-C_2H_4O-C_2H_4N\overset{C_2H_4OH}{\underset{H}{\diagdown}}$$ |

TABLE I—Continued

| Example | Polyamine |
|---|---|
| 20a | $C_{17}H_{33}C\overset{N-CH_2}{\underset{\overset{\mid}{N}-CH_2}{\diagdown}}\underset{H}{}$ |
| 21a | $CH_3C\overset{N-CH_2}{\underset{\overset{\mid}{N}-CH_2}{\diagdown}}$  $C_2H_4-\overset{H}{N}-C_2H_4\overset{H}{N}-C_{16}H_{33}$ |
| 22a | $C_{17}H_{35}-C\overset{N-CH_2}{\underset{N-CH_2}{\diagdown}}\overset{CH_2}{\underset{CH_3}{\diagup}}$  $C_2H_4N\overset{}{\underset{H}{\diagdown}}$ |
| 23a | $C_{17}H_{35}-C\overset{N-CH_2}{\underset{N-CH_2}{\diagdown}}C_2H_4OH$  $C_2H_4N\underset{H}{}$ |
| 24a | $C_4H_9C\overset{N-CH_2}{\underset{\overset{\mid}{N}-CH_2}{\diagdown}}\underset{H}{}$ |
| A25a | Oleic acid prior acylated triethylene tetramine (1:1 molar ratio). |
| A26a | Stearic acid prior acylated tetraethylene pentamine (1:1 molar ratio). |
| A27a | Lauric acid prior acylated tetraethylene pentamine (1:1 molar ratio). |
| 28a | Polyamine N-400. |

NOTE.—The products formed in the above Table I are dark, viscous liquids.

TABLE II

Reaction of

HOCH$_2$—⟨OH, R⟩—CH$_2$OH (designated DMP) with polyamines

[Molar ratio DMP/amine 1:2]

| Ex. | R | Polyamine |
|---|---|---|
| 1b | Dodecyl | Diethylene triamine. |
| 2b | Octadecyl | Triethylene tetramine. |
| 3b | Sec-butyl | Tetraethylene pentamine. |
| 4b | Dodecyl | Dipropylene triamine. |
| 5b | do | Duomeen S (Armour Co.) $$R-\overset{H}{N}-CH_2CH_2CH_2NH_2$$ R derived from soya oil |
| 6b | Octadecyl | Duomeen T (Armour Co.) $$R-\overset{H}{N}-CH_2CH_2CH_2NH_2$$ R derived from tallow |
| 7b | Mixed sec. and tert-butyl. | Oxyethylated Duomeen S $$R-\overset{H}{N}-CH_2CH_2CH_2N\overset{C_2H_4OH}{\underset{H}{\diagdown}}$$ |
| 8b | Dodecyl | Oxyethylated Duomeen T $$R-\overset{H}{N}-CH_2CH_2CH_2N\overset{C_2H_4}{\underset{H}{\diagdown}}$$ |

TABLE II—Continued

| Ex. | R | Polyamine |
|---|---|---|
| 9b | Tert-butyl | Amine ODT (Monsanto) $C_{12}H_{25}-\underset{H}{N}-C_2H_4\underset{H}{N}-C_2H_4NH_2$ |
| 10b | do | Oxyethylated amine ODT $C_{12}H_{25}-\underset{H}{N}-C_2H_4\underset{H}{N}-C_2H_4N\begin{smallmatrix}C_2H_4OH\\H\end{smallmatrix}$ |
| 11b | Octadecyl | N-(2-hydroxyethyl)-2-methyl-1,2 propanediamine. |
| 12b | Dodecyl | N-methyl ethylene diamine. |
| 13b | do | N,N'-dimethyl ethylene diamine. |
| 14b | do | Hydroxyethyl ethylene diamine. |
| 15b | do | N,N'-dihydroxyethylethylene diamine. |
| 16b | do | N-methyl propylene diamine. |
| 17b | Octadecyl | N,N'-dihydroxyethyl propylene diamine. |
| 18b | do | N,N'-dihydroxypropyl propylene diamine. |
| 19b | Tert-butyl | $HOC_2H_4-\underset{H}{N}C_2H_4O-C_2H_4O-C_2H_4-N\begin{smallmatrix}C_2H_4OH\\H\end{smallmatrix}$ |
| 20b | do | $C_{17}H_{33}C\begin{smallmatrix}N-CH_2\\ \\N-CH_2\\H\end{smallmatrix}$ |
| 21b | do | $CH_3C\begin{smallmatrix}N-CH_2\\ \\N-CH_2\\ \\C_2H_4-\underset{H}{N}-C_2H_4\underset{H}{N}-C_{16}H_{33}\end{smallmatrix}$ |
| 22b | do | $C_{17}H_{35}-C\begin{smallmatrix}N-CH_2\\ \\N-CH_2\\ \\ \\CH_3\\C_2H_4\underset{H}{N}\end{smallmatrix}$ |
| 23b | do | $C_{17}H_{35}-C\begin{smallmatrix}N-CH_2\\ \\N-CH_2\\ \\C_2H_4OH\\ \\C_2H_4\underset{H}{N}\end{smallmatrix}$ |
| 24b | Dodecyl | $C_4H_9C\begin{smallmatrix}N-CH_2\\ \\N-CH_2\\H\end{smallmatrix}$ |
| A25b | do | Oleic acid prior acylated triethylene tetramine (1:1 molar ratio). |
| A26b | do | Stearic acid prior acylated tetraethylenepentamine (1:1 molar ratio). |
| A27b | do | Lauric acid prior acylated tetraethylene pentamine (1:1 molar ratio). |
| 28b | Methyl | Polyamine N-400. |
| 29b | Tert-butyl | Do. |
| 30b | Nonyl | Do. |

NOTE.—The products formed in the above Table II are dark viscous liquids.

TABLE III

Reaction of

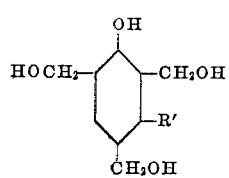

(trimethylol cardanol and side chain hydrogenated cardanol) with polyamines

TABLE III—Continued

[Molar ratio of the trimethylol cardanol to amine 1:3]

| Ex. | R' derived from— | Polyamine |
|---|---|---|
| 1c | Cardanol | Diethylene triamine. |
| 2c | do | Triethylene tetramine. |
| 3c | Hydrogenated cardanol. | Tetraethylene pentamine. |
| 4c | do | Dipropylene triamine. |
| 5c | do | Duomeen S (Armour Co.) $R-\underset{H}{N}-CH_2CH_2CH_2NH_2$ R derived from soya oil |
| 6c | do | Duomeen T (Armour Co.) $R-\underset{H}{N}-CH_2CH_2CH_2NH_2$ R derived from tallow |
| 7c | Cardanol | Oxyethylated Duomeen S $R-\underset{H}{N}-CH_2CH_2CH_2N\begin{smallmatrix}C_2H_4OH\\H\end{smallmatrix}$ |
| 8c | Hydrogenated cardanol. | Oxyethylated Duomeen T $R-\underset{H}{N}-CH_2CH_2CH_2N\begin{smallmatrix}C_2H_4OH\\H\end{smallmatrix}$ |
| 9c | Cardanol | Amine ODT (Monsanto) $C_{12}H_{25}-\underset{H}{N}-C_2H_4\underset{H}{N}-C_2H_4NH_2$ |
| 10c | Hydrogenated cardanol. | Oxyethylated Amine ODT $C_{12}H_{25}-\underset{H}{N}-C_2H_4\underset{H}{N}-C_2H_4N\begin{smallmatrix}C_2H_4OH\\H\end{smallmatrix}$ |
| 11c | Cardanol | N-(2-hydroxyethyl)-2-methyl-1,2-propanediamine. |
| 12c | Hydrogenated cardanol. | N-methyl ethylene diamine. |

NOTE.—The products formed in the above Table III are dark, viscous liquids.

TABLE IV

Reaction of $$HO-\text{[aromatic ring with }CH_2OH\text{ groups]}-\overset{R}{\underset{R}{C}}-\text{[aromatic ring with }CH_2OH\text{ groups]}-OH$$

(tetramethylol diphenol) with polyamine

[Molar ratio of tetramethylol diphenol to polyamine 1:4]

| Ex. | R | Polyamine |
|---|---|---|
| 1d | Hydrogen | Diethylene triamine. |
| 2d | do | Triethylene tetramine. |
| 3d | do | Tetraethylene pentamine. |
| 4d | do | Dipropylene triamine. |
| 5d | do | Duomeen S (Armour Co.) $R-\underset{H}{N}-CH_2CH_2CH_2NH_2$ R derived from soya oil |
| 6d | do | Duomeen T (Armour Co.) $R-\underset{H}{N}-CH_2CH_2CH_2NH_2$ R derived from tallow |
| 7d | do | Oxyethylated Duomeen S $R-\underset{H}{N}-CH_2CH_2CH_2N\begin{smallmatrix}C_2H_4OH\\H\end{smallmatrix}$ |
| 8d | do | Oxyethylated Duomeen T $R-\underset{H}{N}-CH_2CH_2CH_2N\begin{smallmatrix}C_2H_4OH\\H\end{smallmatrix}$ |

TABLE IV—Continued

| Ex. | R | Polyamine |
|---|---|---|
| 9d | ___do___ | Amine ODT (Monsanto)<br>$C_{12}H_{25}-\underset{H}{N}-C_2H_4\underset{H}{N}-C_2H_4NH_2$ |
| 10d | ___do___ | Oxyethylated Amine ODT<br>$C_{12}H_{25}-\underset{H}{N}-C_2H_4\underset{H}{N}-C_2H_4N\begin{smallmatrix}C_2H_4OH\\ \\H\end{smallmatrix}$ |
| 11d | ___do___ | N-(2-hydroxyethyl)-2-methyl-1,2 propanediamine. |
| 12d | ___do___ | N-methyl ethylene diamine. |
| 13d | Methyl | Diethylene triamine. |
| 14d | ___do___ | Triethylene tetramine. |
| 15d | ___do___ | Tetraethylene pentamine. |
| 16d | ___do___ | Dipropylene triamine. |
| 17d | ___do___ | Duomeen S (Armour Co.)<br>$R-\underset{H}{N}-CH_2CH_2CH_2NH_2$<br>R derived from soya oil |
| 18d | ___do___ | Duomeen T (Armour Co.)<br>$R-\underset{H}{N}-CH_2CH_2CH_2NH_2$<br>R derived from tallow |
| 19d | ___do___ | Oxyethylated Duomeen S<br>$R-\underset{H}{N}-CH_2CH_2CH_2N\begin{smallmatrix}C_2H_4OH\\ \\H\end{smallmatrix}$ |
| 20d | ___do___ | Oxyethylated Duomeen T<br>$R-\underset{H}{N}-CH_2CH_2CH_2N\begin{smallmatrix}C_2H_4OH\\ \\H\end{smallmatrix}$ |
| 21d | ___do___ | Amine ODT (Monsanto)<br>$C_{12}H_{25}-\underset{H}{N}-C_2H_4\underset{H}{N}-C_2H_4HN_2$ |
| 22d | ___do___ | Oxyethylated Amine ODT<br>$C_{12}H_{25}-\underset{H}{N}-C_2H_4\underset{H}{N}-C_2H_4N\begin{smallmatrix}C_2H_4OH\\ \\H\end{smallmatrix}$ |
| 23d | ___do___ | N-(2-hydroxyethyl)-2-methyl-1,2-propanediamine. |
| 24d | ___do___ | N-methyl ethylene diamine. |

Note.—The products formed in the above Table IV are dark, viscous liquids.

THE ACYLATING AGENT

As in the reaction between the methylol phenol and the secondary amine, acylation is also carried out under dehydrating conditions, i.e., water is removed. Any of the well-known methods of acylation can be employed. For example, heat alone, heat and reduced pressure, heat in combination with an azeotroping agent, etc., are all satisfactory.

A wide variety of acylating agents can be employed. However, strong acylating agents such as acyl halides, or acid anhydrides should be avoided since they are capable of esterifying phenolic hydroxy groups, a feature which is undesirable.

Although a wide variety of carboxylic acids produce excellent products, in our experience monocarboxy acids having more than 6 carbon atoms and less than 40 carbon atoms give most advantageous products. The most common examples include the detergent forming acids, i.e., those acids which combine with alkalies to produce soap or soap-like bodies. The detergent-forming acids, in turn, include naturally-occurring fatty acids, resin acids, such as abietic acid, naturally occurring petroleum acids, such as naphthenic acids, and carboxy acids, produced by the oxidation of petroleum. As will be subsequently indicated, there are other acids which have somewhat similar characteristics and are derived from somewhat different sources and are different in structure, but can be included in the broad generic term previously indicated.

Suitable acids include straight chain and branched chain, saturated and unsaturated, aliphatic, alicyclic, fatty, aromatic, hydroaromatic, and aralkyl acids, etc.

Examples of saturated aliphatic monocarboxylic acids are acetic, propionic, butyric, valeric, caproic, heptanoic, caprylic, nonanoic, capric, undecanoic, lauric, tridecanoic, myristic, pentadecanoic, palmitic heptadecanoic, stearic, nonadecanoic, eicosanoic, heneicosanoic, docosanoic, tricosanoic, tetracosanoic, pentacosanoic, cerotic, heptacosanoic, montanic, nonacosanoic, mellisic and the like.

Examples of ethylenic unsaturated aliphatic acids are acrylic, methacrylic, crotonic, anglic, teglic, the pentenoic acids, the hexenoic acids, for example, hydrosorbic acid, the heptenoic acids, the octenoic acids, the nonenoic acids, the decenoic acids, for example, obtusilic acid, the undecenoic acids, the dodecenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elardic acid, the nonadecenoic acids, for example, the eicosenoic acids, the docosenoic acids, for example, erucic acid, brassidic acid, cetoleic acid, the tetradosenic acids, and the like.

Examples of dienoic acids are the pentadienoic acids, the hexadienoic acids, for example, sorbic acid, the octadienoic acids, for example, linoleic, and the like.

Examples of the trienoic acids are the octadecatrienoic acids, for example, linolenic acid, eleostearic acid, pseudoeleostearic acid, and the like.

Carboxylic acids containing functional groups such as hydroxy groups can be employed. Hydroxy acids, particularly the alpha hydroxy acids include glycolic acid, lactic acid, the hydroxyvaleric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyoctadecanoic acids, for example, ricinoleic acid, ricinelardic acid, hydroxyoctadecynoic acids, for example, ricinstearolic acid, the hydroxyelcosanoic acids, for example, hydroxyarchidic acid, the hydroxydocosanoic acids, for example, hydroxybehenic acid, and the like.

Examples of acetylated hydroxyacids are ricinoleyl lactic acid, acetyl ricinoleic acid, chloroacetyl ricinoleic acid, and the like.

Examples of the cyclic aliphatic carboxylic acids are those found in petroleum called naphthenic acids, hydnocarpic and chaulmoogric acids, cyclopentane carboxylic acids, cyclohexanecarboxylic acid, campholic acid, fenchlolic acids, and the like.

Examples of aromatic monocarboxylic acids are benzoic acid, substituted benzoic acids, for example, the toluic acids, the xyleneic acids, alkoxy benzoic acid, phenyl benzoic acid, naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; Twitchell fatty acids, carboxydiphenyl pyrridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids are those of the aliphatic series, for example, oxalic, malonic, succinic, glutaric, adipic, pimelic, suberic, azelaic, sebacic, nonanedicarboxylic, decanedicarboxylic acids, undecanedicarboxylic acids, and the like.

Examples of unsaturated aliphatic polycarboxylic acids are fumaric, maleic, mesocenic, citraconic, glutonic, itaconic, muconic, aconitic acids, and the like.

Examples of aromatic polycarboxylic acids are phthalic, isophthalic acids, terephthalic acids, substituted derivatives thereof (e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups are hemimellitic, trimellitic, trimesic, mellophanic, prehnitic, pyromellitic acids, mellitic acid, and the like.

Other polycarboxylic acids are the dimeric, trimeric and polymeric acids, for example, dilinoleic, trilinoleic, and other polyacids sold by Emery Industries, and the like. Other polycarboxylic acids include those containing ether groups, for example, diglycolic acid. Mixtures of the above acids can be advantageously employed.

In addition, acid precursors such as esters, glycerides, etc. can be employed in place of the free acid.

The moles of acylating agent reacted with the polyaminomethyl compound will depend on the number of acetylation reactive positions contained therein as well as the number of moles one wishes to incorporate into the molecule. We have advantageously reacted 1 to 15 moles of acylating agent per mole of polyaminophenol, but preferably 3 to 6 moles.

The following examples are illustrative of the preparation of the acylated polyaminomethyl phenol condensate.

The following general procedure is employed in acylating. The condensate is mixed with the desired ratio of acid and a suitable azeotroping agent is added. Heat is then applied. After the removal of the calculated amount of water (1 to 2 equivalents per mole of acid employed), heating is stopped and the azeotroping agent is evaporated under vacuum. The temperature during the reaction can vary from 80°–200° C. (except where the formation of the cyclic amidine type structure is desired and the maximum temperature is generally 200–280° C.). The times range from 4 to 24 hours. Here again, the true test of the degree of reaction is the amount of water removed.

*Example 3aA*

In a 5 liter, 3 necked flask furnished with a stirring device, thermometer, phase separating trap, condenser and heating mantle, 697 grams of 3a (one mole of the TMP-tetraethylene pentamine reaction product) is dissolved in 600 ml. of xylene. 846 grams of oleic acid (3 moles) is added to the TMP-polyamine condensate with stirring in ten minutes. The reaction mixture was then heated gradually to about 145° in half an hour and then held at about 160° over a period of 3 hours until 54 grams (3 moles) of water is collected in the side of the tube. The solvent is then removed with gentle heating under a reduced pressure of approximately 20 mm. The product is a dark brown viscous liquid with a nitrogen content of 14.5%.

*Example 3aA'*

The prior example is repeated except that the final reaction temperature is maintained at 240° C. and 90 grams (5 moles) of water is removed instead of 54 grams. Infrared analysis of the product indicates the presence of a cyclic amidine ring.

*Example 7aA*

The reaction product of Example 7a (TMP and oxyethylated Duomeen S) is reacted with palmitic acid in the manner of Example 3aA. A xylene soluble product is formed.

The following examples of acylated polyaminomethyl phenol condensates are prepared in the manner of the above examples. The products obtained are dark viscous liquids.

*Example 28aA*

Into a 300 milliliter flask, fitted with a stirring device, thermometer, phase separating trap, condenser and heating mantle, is placed a xylene solution of the product of Example 28a containing 98.0 grams (0.05 mole) of the reaction product of 2,4,6-trimethylolphenol and Polyamine N–400 and about 24 grams of xylene. To this solution is added with stirring 30.0 grams (0.15 mole) of lauric acid. The reaction mixture is heated for about one hour at a maximum reaction temperature of 190° C. and 6 milliliters of water are collected. The calculated amount of water for imidazoline formation is 5.4 milliliters. The resulting product as an 88 percent xylene solution is a dark brown thick liquid.

*Example 28bA*

Into a 300 milliliter flask, fitted with a stirring device, thermometer, phase separating trap, condenser and heating mantle is placed a xylene solution of the product of Example 28b containing 35.0 grams (0.025 mole) of the reaction product of 2,6-dimethylol-4-methylphenol and Polyamine N–400 and about 20 grams of xylene. To this solution is added with stirring 14.1 grams (0.05 mole) of oleic acid. The reaction mixture is heated at reflux for 4.5 hours at a maximum temperature of 183° C. and 1.0 milliliter of water is collected, the calculated amount of water for amide formation being 0.9 milliliters. The product is a dark burgundy liquid (as 70.5% xylene solution).

*Example 29bA*

This experiment is performed in the same equipment and in the same manner as employed in Example 28bA. Into the flask is placed a xylene solution of the product of Example 29b containing 40.9 grams (0.025 mole) of the reaction product of 2,6-dimethylol-4-tertiarybutyl phenol and Polyamine N–400 and about 47 grams of xylene. To this solution is added with stirring 7.2 grams (0.05 mole) of octanoic acid. The reaction mixture is heated at reflux for 3.75 hours at a maximum temperature of 154° C. and 1.3 milliliters of water is collected. The calculated amount of water for amide formation is 0.9 milliliter. The product as a 49.82 percent xylene solution was brown.

*Example 30bA*

This experiment is performed in the same manner and in the same equipment as is employed in Example 28bA. Into the flask is placed a xylene solution of the product of Example 30b containing 39.6 grams (0.025 mole) of the reaction product of 2,6-dimethylol-4-nonylphenol and Polyamine N-400 and about 32 grams of xylene. To this solution is added with stirring 14.2 grams (0.05 mole) of stearic acid. The reaction mixture is heated at reflux for 4 hours at a maximum temperature of 160° C. and 1.0 milliliter of water is collected. The calculated amount of water for amide formation is 0.9 milliliter. The product as a 62.5% xylene solution is a brown liquid.

TABLE V.—ACYLATED PRODUCTS OF TABLE I

| Example | Acid | Grams of acid per gram-moles of condensate | Grams of water removed |
|---|---|---|---|
| 1aA | Oleic | 846 | 54 |
| 2aA | Nonanoic | 316 | 36 |
| 3aA | Oleic | 846 | 54 |
| 3aA' | do | 846 | 90 |
| 4aA | Stearic | 852 | 54 |
| 5aA | Lauric | 600 | 54 |
| 6aA | Myristic | 684 | 54 |
| 7aA | Palmitic | 768 | 54 |
| 8aA | Propanoic | 222 | 54 |
| 9aA | Dimeric [1] | 1,800 | 54 |
| 10aA | Oleic | 846 | 54 |
| 11aA | do | 846 | 54 |
| 12aA | Sunaptic acid [2] | 990 | 54 |
| 14aA | Oleic | 846 | 54 |
| 15aA | Palmitic | 1,536 | 108 |
| 16aA | Oleic | 846 | 54 |
| 17aA | do | 1,692 | 108 |
| 18aA | do | 1,692 | 108 |
| 19aA | do | 846 | 54 |
| 23aA | Acetic | 180 | 54 |
| 28aA | Lauric | 600 | 120 |

[1] Dilinoleic acid sold by Emery Industries. Also employed in examples of Tables VI, VII and VIII.
[2] Naphthenic acid sold by Sun Oil Company, average molecular weight 220-230.

TABLE VI.—ACYLATED PRODUCTS OF TABLE II

| Example | Acid | Grams of acid used per gram-mole of condensate | Grams of water removed |
|---|---|---|---|
| 1bA | Stearic | 568 | 36 |
| 2bA | Oleic | 564 | 36 |
| 3bA | Lauric | 800 | 72 |
| 4bA | Acetic | 120 | 36 |
| 5bA | Myristic | 456 | 36 |
| 6bA | Palmitic | 512 | 36 |
| 7bA | Dimeric [1] | 1,200 | 36 |
| 8bA | Oleic | 564 | 36 |
| 9bA | do | 564 | 36 |
| 10bA | Sunaptic acid [2] | 660 | 36 |
| 11bA | Oleic | 564 | 36 |
| 12bA | do | 564 | 36 |
| 14bA | Palmitic | 512 | 36 |
| 15bA | Acetic | 240 | 72 |
| 16bA | Oleic | 564 | 36 |
| 17bA | do | 1,128 | 72 |
| 18bA | do | 564 | 36 |
| 19bA | do | 564 | 36 |
| 23bA | Lauric | 400 | 36 |
| 28bA | Oleic | 564 | 40 |
| 29bA | Octanoic | 288 | 52 |
| 30bA | Stearic | 569 | 40 |

See Table V for footnotes.

TABLE VII.—ACYLATED PRODUCTS OF TABLE III

| Example | Acid | Grams of acid used per gram-mole of condensate | Grams of water removed |
|---|---|---|---|
| 1cA | Oleic | 564 | 36 |
| 2cA | Palmitic | 512 | 36 |
| 3cA | Lauric | 800 | 72 |
| 4cA | Myristic | 456 | 36 |
| 5cA | Acetic | 120 | 36 |
| 6cA | Dimeric [1] | 1,200 | 36 |
| 7cA | Oleic | 564 | 36 |
| 8cA | do | 564 | 36 |
| 9cA | Sunaptic [2] | 660 | 36 |
| 10cA | Oleic | 564 | 36 |
| 11cA | do | 564 | 36 |
| 12cA | do | 564 | 36 |

See Table V for footnotes.

TABLE VIII.—ACYLATED PRODUCTS OF TABLE IV

| Example | Acid | Grams of acid used per gram-mole of condensate | Grams of water removed |
|---|---|---|---|
| 1dA | Oleic | 1,128 | 72 |
| 2dA | do | 1,128 | 72 |
| 3dA | Stearic | 2,272 | 144 |
| 4dA | Lauric | 800 | 72 |
| 5dA | Myristic | 912 | 72 |
| 6dA | Palmitic | 1,024 | 72 |
| 7dA | Oleic | 1,128 | 72 |
| 8dA | Dimeric [1] | 2,400 | 72 |
| 9dA | Sunaptic [2] | 1,320 | 72 |
| 10dA | Acetic | 240 | 72 |
| 11dA | Oleic | 1,128 | 72 |
| 12dA | do | 1,128 | 72 |
| 13dA | do | 1,128 | 72 |
| 14dA | do | 1,128 | 72 |
| 15dA | Palmitic | 2,048 | 144 |
| 16dA | Myristic | 912 | 72 |
| 17dA | Oleic | 1,128 | 72 |
| 18dA | Palmitic | 1,024 | 72 |
| 19dA | Stearic | 1,136 | 72 |
| 20dA | do | 1,136 | 72 |
| 21dA | Oleic | 1,128 | 72 |
| 22dA | do | 1,128 | 72 |
| 23dA | do | 1,128 | 72 |
| 24dA | do | 1,128 | 72 |

See Table V for footnotes.

Reference has been made and reference will be continued to be made herein to oxyalkylation procedures. Such procedures are concerned with the use of mono-epoxides and principally those available commercially at low cost, such as ethylene oxide, propylene oxide and butylene oxide, octylene oxide, styrene oxide, etc.

Oxyalkylation is well known. For purpose of brevity reference is made to Parts 1 and 2 of U.S. Patent No. 2,792,371, dated May 14, 1957, to Dickson, in which particular attention is directed to the various patents which describe typical oxyalkylation procedure. Furthermore, manufacturers of alkylene oxides furnish extensive information as to the use of oxides. For example, see the technical bulletin entitled "Ethylene Oxide" which has been distributed by the Jefferson Chemical Company, Houston, Texas. Note also the extensive bibliography in this bulletin and the large number of patents which deal with oxyalkylation processes.

The following examples illustrate oxyalkylation.

*Example 1aAO$_1$*

The reaction vessel employed is a 4 liter stainless steel autoclave equipped with the usual devices for heating and heat control, a stirrer, inlet and outlet means, etc., which are conventional in this type of apparatus. The stirrer is operated at a speed of 250 r.p.m. Into the autoclave is charged 1230 grams (1 mole) of 1aA, and 500 grams of xylene. The autoclave is sealed, swept with nitrogen, stirring started immediately, and heat applied. The temperature is allowed to rise to approximately 100° C. at which time the addition of ethylene oxide is started. Ethylene oxide is added continuously at such speed that it is absorbed by the reaction mixture as added. During the addition 132 grams (3 moles) of ethylene oxide is added over 2¼ hours at a temperature of 100° C. to 120° C. and a maximum pressure of 30 p.s.i.

*Example 1aAO$_2$*

The reaction mass of Example 1AO is transferred to a larger autoclave (capacity 15 liters) similarly equipped. Without adding any more xylene the procedure is repeated so as to add another 264 grams (6 moles) of ethylene oxide under substantially the same operating conditions but requiring about 3 hours for the addition.

*Example 1aAO$_3$*

In a third step, another 264 grams (6 moles) of ethylene oxide is added to the product of Example 1aAO$_2$.

The reaction slows up and requires approximately 6 hours, using the same operating temperatures and pressures.

*Example 1aAO₄*

At the end of the third step the autoclave is opened and 25 grams of sodium methylate is added, the autoclave is flushed out as before, and the fourth and final oxyalkylation is completed, using 1100 grams (25 moles) of ethylene oxide. The oxyalkylation is completed within 6½ hours, using the same temperature range and pressure as previously.

*Example 1aAO₅*

The reaction vessel employed is the same as that used in Example 1aAO. Into the autoclave is charged 1230 g. (1 mole) of 1aA and 500 grams of xylene. The autoclave is sealed, swept with nitrogen, stirring is started immediately and heat is applied. The temperature is allowed to rise to approximately 100° C. at which time the addition of propylene oxide is started. Propylene oxide is added continuously at such speed that it is absorbed by the reaction mixture as added. During the addition 174 g. (3 moles) of propylene oxide are added over 2½ hours at a temperature of 100 to 120° C. and a maximum pressure of 30 lbs. p.s.i.

*Example 1aAO₆*

The reaction mass of Example 1aAO₅ is transferred to a larger autoclave (capacity 15 liters). The procedure is repeated so as to add another 174 g. (3 moles) of propylene oxide under substantially the same operating conditions but requiring about 3 hours for the addition.

*Example 1aAO₇*

At the end of the second step (Example 1aAO₂) the autoclave is opened, 25 g. of sodium methylate is added, and the autoclave is flushed out as before. Oxyalkylation is continued as before until another 522 g. (9 moles) of propylene oxide are added. 8 hours are required to complete the reaction.

The following examples of oxyalkylation are carried out in the manner of the examples described above. A catalyst is used in the case of oxyethylation after the initial 15 moles of ethylene oxide are added, while in the case of oxypropylation, the catalyst is used after the initial 6 moles of oxide are added. In the case of oxybutylation, oxyoctylation, oxystyrenation, etc. the catalyst is added at the beginning of the operation. In all cases the amount of catalyst is about 1½ percent of the total reactant present. The oxides are added in the order given reading from left to right. The results are presented in the following tables:

TABLE IX.—THE OXYALKYLATED PRODUCTS OF TABLE I
[Grams of oxide added per gram mole of condensate]

| Example | EtO | PrO | BuO | Octylene oxide | Styrene oxide |
|---|---|---|---|---|---|
| 1aO | 132 | 348 | | | |
| 2aO | 132 | 870 | | | |
| 3aO | | | 288 | | |
| 4aO | | | 174 | | |
| 5aO | 660 | | | | |
| 6aO | 440 | | 174 | | |
| 7aO | | | 348 | 216 | |
| 8aO | | | 698 | 432 | |
| 9aO | | 880 | | 288 | |
| 10aO | 1,100 | | 348 | | |
| 12aO | | | | | 384 |
| 17aO | | 1,740 | | | |
| 20aO | 264 | 1,740 | | | |
| 21aO | | | | | 390 |
| 23aO | | 1,740 | 288 | | |
| 25aO | 880 | | 432 | | |
| 28aO | 396 | 698 | | | |

TABLE X.—THE OXYALKYLATED PRODUCTS OF TABLE II
[Grams of oxide added per gram mole of condensate]

| Example | EtO | PrO | BuO | Octylene oxide | Styrene oxide |
|---|---|---|---|---|---|
| 1bO | 264 | | | | |
| 2bO | 396 | | | | |
| 3bO | 132 | 2,030 | | | |
| 4bO | 1,100 | | 216 | | |
| 5bO | 1,320 | | | | |
| 6bO | 1,540 | | 288 | | |
| 7bO | 1,760 | | | | |
| 8bO | 1,980 | | | | |
| 9bO | 396 | 870 | | | |
| 10bO | | 1,160 | 432 | | |
| 12bO | | | | | 130 |
| 16bO | | | | 128 | |
| 18bO | | | 288 | | |
| 21bO | | | | | 260 |
| 25bO | 660 | 1,450 | 288 | | |
| 28bO | | 1,450 | 288 | | |
| 29bO | 440 | 580 | | | |
| 30bO | | | | 128 | |

TABLE XI.—THE OXYALKYLATED PRODUCTS OF TABLE III
[Grams of oxide added per gram mole of condensate]

| Example | EtO | PrO | BuO | Octylene oxide | Styrene oxide |
|---|---|---|---|---|---|
| 1cO | 396 | | | | |
| 2cO | 660 | | | | |
| 3cO | 1,100 | | | | |
| 4cO | 1,320 | | | | |
| 5cO | 2,200 | | | | |
| 6cO | | 522 | | | |
| 7cO | | | | | 230 |
| 8cO | 1,320 | 870 | 216 | | |
| 9cO | 880 | 2,030 | | | |
| 10cO | 660 | | 360 | | |
| 12cO | | | | 256 | |

TABLE XII.—THE OXYALKYLATED PRODUCTS OF TABLE IV
[Grams of oxide added per gram mole of condensate]

| Example | EtO | PrO | BuO | Octylene oxide | Styrene oxide |
|---|---|---|---|---|---|
| 1dO | | | 432 | | |
| 2dO | | 1,450 | | | |
| 3dO | | 2,320 | | | |
| 4dO | 660 | 2,030 | | | |
| 5dO | 1,100 | 174 | | | |
| 6dO | | 1,450 | | | |
| 7dO | | | | | 420 |
| 8dO | | | | 512 | |
| 9dO | | 720 | | | |
| 10dO | 132 | 870 | | | |
| 13dO | 132 | 1,160 | | | |
| 14dO | 264 | 2,030 | | | |
| 15dO | 264 | 2,900 | | | |
| 16dO | 132 | 1,160 | 228 | | |
| 17dO | 1,100 | 698 | 228 | | |
| 18dO | 1,320 | | 720 | | |
| 19dO | | 1,740 | 432 | | |
| 20dO | | 2,320 | | | |
| 21dO | | 2,900 | 228 | | |
| 22dO | 132 | 2,030 | | | |

TABLE XIII.—THE OXYALKYLATED PRODUCTS OF TABLE V
[Grams of oxide added per gram mole of condensate]

| Example | EtO | PrO | BuO | Octylene oxide | Styrene oxide |
|---|---|---|---|---|---|
| 1aAO₁ | 132 | | | | |
| 1aAO₂ | | | | | 390 |
| 1aAO₃ | 660 | | | | |
| 1aAO₄ | 1760 | | | | |
| 1aAO₅ | | 174 | | | |
| 1aAO₆ | | 348 | | | |
| 1aAO₇ | 396 | 522 | | | |
| 2aAO | 264 | | | | |
| 3aAO | | | | 384 | |
| 3aAO | | | | | 390 |
| 4aAO | 1,540 | | | | |
| 5aAO | 1,100 | | | | |
| 6aAO | 1,320 | | | | |
| 7aAO | 1,100 | 870 | | | |
| 8aAO | 1,100 | | 216 | | |
| 9aAO | | 1,450 | | | |
| 10aAO | | 2,030 | | | |
| 17aAO | | 1,450 | | | |
| 20aAO | 264 | 2,320 | | | |
| 23aAO | 264 | | 720 | | |
| 28aAO | 440 | 580 | | | |

TABLE XIV.—THE OXYALKYLATED PRODUCTS OF TABLE VI

[Grams of oxide added per gram mole of acylated product]

| Example | EtO | PrO | BuO | Octylene oxide | Styrene oxide |
|---|---|---|---|---|---|
| 1bAO | 132 | | | | |
| 2bAO | 264 | | | | |
| 3bAO | | | | 256 | |
| 3bA'O | 1,760 | | | | |
| 4bAO | | | | | 420 |
| 5bAO | 880 | 870 | | | |
| 6bAO | 880 | | 288 | | |
| 7bAO | 660 | 2,030 | | | |
| 8bAO | 660 | | 720 | | |
| 9bAO | 880 | 2,320 | | | |
| 10bAO | 880 | 1,450 | 432 | | |
| 14bAO | 1,760 | 1,450 | 216 | | |
| 28bAO | 440 | 580 | | | |
| 29bAO | | 522 | 216 | | |
| 30bAO | 440 | | 360 | | |

TABLE XV.—THE OXYALKYLATED PRODUCTS OF TABLE VI

[Gram of oxide added per gram mole of acylated product]

| Example | EtO | PrO | BuO | Octylene oxide | Styrene oxide |
|---|---|---|---|---|---|
| 1cAO | 132 | | | | |
| 2cAO | | | | | 390 |
| 3cAO | 880 | | | | |
| 4cAO | 1,320 | | | | |
| 5cAO | 220 | | | | |
| 6cAO | | | | 256 | |
| 7cAO | | | | 216 | |
| 8cAO | | 348 | | | |
| 9cAO | | | | 432 | |
| 10cAO | 880 | 870 | | | |
| 11cAO | 880 | 870 | 216 | | |
| 12cAO | 1,320 | | 288 | | |

TABLE XVI.—THE OXYALKYLATED PRODUCTS OF TABLE VII

[Grams of oxide added per gram mole of acylated product]

| Example | EtO | PrO | BuO | Octylene oxide | Styrene oxide |
|---|---|---|---|---|---|
| 1dAO | 132 | | | | |
| 2dAO | | | | 512 | |
| 3dAO | | 174 | | | |
| 4dAO | | | | 216 | |
| 5dAO | | | | | 520 |
| 6dAO | | | | 432 | |
| 7dAO | 660 | | | | |
| 8dAO | 1,100 | | | | |
| 9dAO | 1,760 | | | | |
| 10dAO | 1,980 | | | | |
| 13dAO | 660 | 580 | | | |
| 14dAO | 660 | 1,450 | | | |
| 15dAO | 660 | 1,740 | 288 | | |
| 16dAO | 1,100 | 2,320 | 432 | | |
| 17dAO | | | 870 | 216 | |
| 18dAO | | 1,450 | | 216 | |
| 19dAO | | 1,740 | | 432 | |
| 20dAO | | 2,610 | | | |
| 21dAO | | 2,900 | | | |
| 22dAO | | 3,190 | | | |

Since the oxyalkylated, and the acylated and oxyalkylated products have terminal hydroxy groups, they can be acylated. This step is carried out in the manner previously described for acylation. These examples are illustrative and not limiting.

*Example 1aOA*

One mole (919 grams) of 1aO mixed with 846 grams (three moles) of oleic acid and 300 ml. xylene. The reaction mixture is heated to about 150–160° C. over a period of 2 hours until 54 grams (3 moles) of water are removed. Xylene is then removed under vacuum. The product 1aOA is xylene soluble.

*Example 1aAOA*

The process of the immediately previous example is repeated using 1aAO. The product is 1aAOA is xylene soluble.

Additional examples are presented in the following tables. All of the products are dark, viscous liquids.

TABLE XVII.—THE ACYLATED PRODUCTS OF TABLES IX', X, XI, XII

| Example | Acid | Grams of acid per gram-mole of oxyalkylated product | Grams water removed |
|---|---|---|---|
| 1aOA | Oleic | 282 | 18 |
| 2aOA | do | 282 | 18 |
| 3aOA | do | 282 | 18 |
| 4aOA | Stearic | 284 | 18 |
| 28aOA | do | 284 | 18 |
| 1bOA | Myristic | 228 | 18 |
| 2bOA | Stearic | 284 | 18 |
| 3bOA | Oleic | 282 | 18 |
| 4bOA | do | 282 | 18 |
| 28bOA | Stearic | 284 | 18 |
| 29bOA | Oleic | 282 | 18 |
| 30bOA | Lauric | 200 | 18 |
| 1cOA | Oleic | 282 | 18 |
| 2cOA | do | 282 | 18 |
| 3cOA | do | 282 | 18 |
| 4cOA | Stearic | 284 | 18 |
| 1dOA | Oleic | 564 | 36 |
| 2dOA | Stearic | 568 | 36 |
| 3dOA | Oleic | 564 | 36 |
| 4dOA | do | 564 | 36 |

TABLE XVIII.—THE ACYLATED PRODUCTS OF TABLES XIII, XIV, XV, XVI

| Example | Acid | Grams of acid per gram-mole of oxyalkylated product | Grams water removed |
|---|---|---|---|
| 1aAOA | Oleic | 282 | 18 |
| 2aAOA | Stearic | 284 | 18 |
| 3aAOA | Oleic | 282 | 18 |
| 4aAOA | Stearic | 284 | 18 |
| 28aAOA | Lauric | 200 | 18 |
| 1bAOA | Oleic | 282 | 18 |
| 2bAOA | do | 282 | 18 |
| 3bAOA | Stearic | 284 | 18 |
| 4bAOA | Oleic | 282 | 18 |
| 28bAOA | Stearic | 284 | 18 |
| 29bAOA | Oleic | 564 | 36 |
| 30bAOA | do | 282 | 18 |
| 1cAOA | Myristic | 228 | 18 |
| 2cAOA | Lauric | 200 | 18 |
| 3cAOA | Oleic | 282 | 18 |
| 4cAOA | do | 282 | 18 |
| 1dAOA | Stearic | 568 | 36 |
| 3dAOA | do | 568 | 36 |
| 3dAOA | Oleic | 564 | 36 |
| 4dAOA | do | 564 | 36 |

(1) BREAKING AND PREVENTING WATER-IN-OIL EMULSIONS

This phase of our invention relates to the use of oxyalkylated and other products of the present invention in preventing, breaking or resolving emulsions of the water-in-oil type, and particularly petroleum emulsions. Their use provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or les permanent state throughout the oil which constitutes the continuous phase of the emulsion.

They also provide an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil (i.e. desalting).

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

These demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., are often employed as diluents. Miscellaneous solvent, such as pine oil, carbon tetrachloride, sulfur dioxide extract obtained in the refining of petroleum, etc., are often employed as diluents. Similarly, the material or materials employed as the demulsifying agent of our process are often admixed with one or more of the solvents customarily used in connection with conventional demulsifying agents. Moreover, said material or materials are often used alone or in admixture with other suitable well-known classes of demulsifying agents.

These demulsifying agents are useful in a water-soluble form, or in an oil-soluble form, or in a form exhibiting both oil and water-solubility. Sometimes they are used in a form which exhibits relatively limited oil-solubility. However, since such reagents are frequently used in a ratio of 1 to 10,000, or 1 to 20,000, or 1 to 30,000, or even 1 to 40,000, or 1 to 50,000, as in desalting practice, such an apparent insolubility in oil and water is not significant, because said reagents undoubtedly have solubility within such concentrations.

In practicing our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e.g. the bottom of the tank, and re-introduces it into the top of the tank, the demulsifier being added, for example, at the suction side of said circulating pump.

In second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixture of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection wtih acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the desirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallongs for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels' to 2000 barrels' capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure through distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like. However, with extremely difficult emulsion higher concentrations of demulsifier can be employed.

In many instances hte oxyalkylated products herein specified as demulsifiers can be conveniently used without dilution. However, as previously noted, they may be diluted as desired with any suitbale solvent. Selection of the solvent will vary, depending upon the solubility characteristics of the oxyalkylated product, and, of course will be dictated in part by economic consideration, i.e., cost. The products herein described are useful not only in diluted form but also admixed with other chemical demulsifiers.

In recent years pipe line standards for oil have been raised so that an effective demulsifier must not only be able to break oil field emulsions under conventional conditions without sludge, but at the same time it must also yield bright pipeline oil, i.e., pipeline oil that is free from the minute traces of foreign matter, whether suspended water or suspended emulsion droplets due to nonresolvable solids. In addition the water phase should be free of oil so as not to create a disposal problem. Thus it is presently desirable to use a demulsifier that produces absolutely bright, haze-free oil in the top layer, yields little or no interphasal sludge, and has little if any oil in the water phase.

The following examples show results obtained in the resolution of crude petroleum emulsions obtained from various sources.

*Example*

This example illustrates the use of a product of the kind presently described for the demulsification of a Texas type oil which is unusually resistant to treatment. The particular demulsification agent employed is that of Example 1A-1. The operating conditions are employed in conventional treatment (see U.S. Patent 2,626,929 to De Groote). On this particular lease (Cobb lease Well #4 of the Texas Company, West Andrews, Texas) one part of demulsifier resolves approximately 10,000 parts of emulsion. The emulsion represents about 60% oil and 40% water. The oil produced is very bright, shows a minimum of residual impurities, and the draw-off water is absolutely clear by visual inspection. No heat is applied in the treating process.

Similarly effective demulsification is effected by employing the compounds shown in the following table. The emulsions are taken from the following leases:

(1) Gulf Oil Company, Goose Creek Texas, Hurst Station Lease, Well #13, 25% water.
(2) Texas Company, Pierce Junction, Texas, Oden Lease Well #3, 45% water.
(3) Delhi-Taylor Oil Company, Berclair, Texas, Lutenbeck Lease, Well #9, 20% water.
(4) Sun Oil Company, Andrews, Texas, Means "A" Lease, 5% water.
(5) Shell Oil Company, Loop, Texas, Williamson Lease, Well #1, 35% water.
(6) General Petroleum Company, Wilmington, California, Southern Pacific Lease.
(7) Richfield Oil Company, North Coles Lease, Section A.
(8) Shell Oil Company, Brea, California, Puente Lease.
(9) Southwest Oil Company, Huntington Beach, California, TF #1, Wells 5 and 6.
(10) Morton Kolgush Company, Torrance, California, Well #7, Redondo Beach, California.

The unexpectedness of this phase of the present invention is demonstrated since the above emulsions are ordinarily not susceptible to cationic and cryptocationic demulsifiers. The present compounds give better results, more rapid demulsification, clearer oil, cleaner draw-off water and more complete absence of sludge than other cationic demulsifiers tried. The demulsifiers prepared by reacting the methylol phenol with the polyamine and then oxyalkylating the condensate are particularly effective. For example, those products obtained by reacting one mole of TMP with three moles of diethylene triamine, triethylene tetramine or tetraethylene pentamine and then subjecting them to oxyalkylation involving the use of both ethylene and propylene oxides, preferably propylene oxide first, in the same weight ratio (i.e. equal weight of alkylene oxide to amine condensate) as employed in the oxyalkylation of certain polyamines described in U.S. Patents 2,792,369–373, show effectiveness in ratios of from 1:10,000 to 1:30,000 or higher ratios on oils of the kind available in the Puente Lease, the Southwest Oil Lease, the Morton Kolgush Co. Lease, etc. mentioned above.

| Ex. No. | I Reactants (grams) | $H_2O$ eliminated (grams) | II—Weight of alkylene oxides added to I in alphabetical order (grams) |
|---|---|---|---|
| 1A-1 | 1a (439) plus oleic acid (846) | 54 | (A) PrO (32,620), (B) EtO (3,690). |
| 1A-2 | do | 54 | (A) PrO (40,000), (B) EtO (2,300). |
| 1A-3 | do | 54 | (A) PrO (40,000), (B) EtO (8,710). |
| 1A-4 | do | 54 | (A) PrO (48,620), (B) EtO (2,585). |
| 1A-5 | do | 54 | (A) PrO (48,620), (B) EtO (5,560). |
| 1A-6 | do | 54 | (A) PrO (48,620), (B) EtO (9,320). |
| 1A-7 | do | 54 | (A) PrO (59,830), (B) EtO (15,390). |
| 1A-8 | 2a (568) plus stearic acid (852) | 54 | (A) PrO (54,640), (B) EtO (13,660). |
| 1A-9 | do | 72 | (A) PrO (61,470), (B) EtO (16,390). |
| 1A-10 | do | 72 | (A) PrO (61,470), (B) EtO (19,120). |
| 1A-11 | 1b (492) plus oleic acid (564) | 36 | (A) PrO (38,760), (B) EtO (6,120). |
| 1A-12 | do | 36 | (A) PrO (40,800), (B) EtO (10,200). |
| 1A-13 | do | 36 | (A) PrO (45,900), (B) EtO (12,240). |
| 1A-14 | 1c (645) plus lauric acid (600) | 54 | (A) PrO (41,680), (B) EtO (5,950). |
| 1A-15 | do | 54 | (A) PrO (47,640), (B) EtO (11,910). |
| 1A-16 | 3c (907) plus lauric acid (600) | 54 | (A) PrO (54,520), (B) EtO (13,630). |
| 1A-17 | do | 54 | (A) PrO (54,520), (B) EtO (20,440). |
| 1A-18 | 1d (660) plus lauric acid (800) | 72 | (A) PrO (69,400), (B) EtO (20,820). |
| 1A-19 | do | 108 | (A) PrO (54,080), (B) EtO (13,520). |
| 1A-20 | do | 108 | (A) PrO (67,600), (B) EtO (17,580). |
| 1A-21 | 6a (1,330) | | (A) BuO (26,600), (B) EtO (19,950). |
| 1A-22 | 9a (943) | | (A) BuO (28,290), (B) EtO (14,150). |
| 1A-23 | 1a (439) | | (A) PrO (17,560), (B) EtO (4,390). |
| 1A-24 | 2a (568) | | (A) BuO (17,040), (B) EtO (5,680). |
| 1A-25 | 4a (523) | | (A) BuO (15,690), (B) EtO (2,620). |
| 1A-26 | 1d (660) | | (A) BuO (13,200), (B) EtO (5,280). |
| 1A-27 | 4d (722) | | (A) BuO (30,880), (B) EtO (7,720). |
| 1A-28 | 28a (1,960) | | (A) PrO (54,520), (B) EtO (20,440). |
| 1A-29 | 28a (1,960) | | (A) BuO (26,600), (B) EtO (19,120). |
| 1A-30 | 28a (1,960) plus lauric acid (600) | 120 | (A) PrO (17,560), (B) EtO (13,630). |
| 1A-31 | do | 120 | |
| 1A-32 | 28aO (3,054) plus stearic acid (284) | 18 | |
| 1A-33 | 28aAOA | | (A) PrO (47,640), (B) EtO (5,950). |
| 1A-34 | 28b (1,400) | | (A) BuO (17,040), (B) EtO (5,680). |
| 1A-35 | 28b (1,400) plus oleic acid (564) | 40 | |
| 1A-36 | do | 40 | |
| 1A-37 | 29b (1,635) | | (A) BuO (780), (B) PrO (1,264), (C) EtO (7,720). |
| 1A-38 | 29bO (2,655) plus oleic acid (282) | 18 | |
| 1A-39 | 29bAOA | | (A) PrO (40,000), (B) EtO (15,000). |
| 1A-40 | 30b (1,580) | | |
| 1A-41 | 30b (1,580) plus stearic acid (569) | 40 | (A) EtO (1,995), (B) PrO (12,000). |
| 1A-42 | do | 40 | |

Because of their demulsification properties the compounds of this invention are also useful in preventing the formation of emulsions during transit.

Often oil which meets specifications when shipped arrives emulsified at its destination when extraneous water becomes mixed with the oil during transit through pipe lines, storage in tanks during transportation in seagoing tankers, and the like.

For example, as is well known in a number of places where petroleum is produced containing a minimum amount of foreign matter and is completely acceptable for refinery purposes prior to shipment, it is not acceptable after a shipment has been made, for instance, thousands of miles by tanker. The reason is that an empty tanker employs sea water for ballast prior to reloading and it is almost impossible to remove all ballast sea water before the next load starts. In some instances a full tanker may use sea water for ballast also. In other instances, due to seepage, etc., contamination takes place. The rolling or rocking effect of the sea voyage seems to give all the agitation required. It is to be noted that the emulsion, generally a water-in-oil type, so produced is characterized by the fact that the dispersed phase is sea water.

Typical examples are shipments of oil from the Near East to Japan, Australia, etc., and various quantities shipped to the west coast of the U.S.A. and, for that matter, to the east coast of the U.S.A.

The presence of water in petroleum distillate fuels often results in emulsion formation especially when such water-containing fuels are subjected to agitation or other conditions promoting emulsification. Unless such emulsion formation is retarded or emulsions that have been formed are resolved so as to permit separation of water from the fuel, the water entering the fuel system deleteriously affects the performance of the system, particularly mechanisms therein of ferrous metals with which the water-containing fuel comes into contact.

As an example, serious difficulties arise in marine operations when salt water, in amounts even as low as 0.01% by weight of a diesel fuel, enters diesel engines. The presence of water in the fuel enhances emulsification thereof and some of the emulsion normally passes through filtering media in the same manner as the fuel that has not been emulsified and, as a result, rapid engine failures often occur. Such failures are often due to corrosion of metal surfaces, as is manifested by surface pitting and formation of fatigue cracks on machined parts, to deleterious effects on fuel injectors resulting in broken or completely disintegrated check valve springs, to promotion of seizure of plungers in bushings and general corrosion of metal surfaces that are contacted by the water-containing fuel. Accordingly, the presence of water in petroleum distillate fuels, and particularly in diesel fuels, is highly undesirable and means are generally employed to separate the water, often in emulsified form, from the fuel. When the water present in the fuel is in emulsified form, one method for treating the emulsion to prevent water from entering the system is to break the emulsion and separate water from the fuel. As manufactured, petroleum distillates suitable for use as fuels are normally water free or contain not more than a trace of water and, hence, such distillates per se present little, if any, difficulty from emulsification unless extraneous water becomes admixed therewith.

In illustration reference is made to a current Navy Department Specification for diesel fuels which, in listing the chemical and physical requirements for conformance therewith, sets forth that the diesel fuels must not contain more than a trace, as a maximum, of water and sediment. Nevertheless, and in the handling of such fuels through pipe lines, storage thereof in tanks, and during transportation such as in seagoing tankers, extraneous water oftentimes becomes admixed with the fuel thereby providing difficulties inclusive of those aforesaid.

Oil in transit can be effectively inhibited against emulsification by adding a small amount, i.e., sufficient substantially to reduce the tendency of the fuel to emulsify, of the demulsifiers described above.

In practicing this phase of our invention, the contemplated demulsifiers may be added in desired amounts to a fuel oil that has emulsified as a result of water having become admixed therewith or may be added to a fuel oil to suppress emulsification thereof when such oils are subsequently exposed to conditions promoting emulsification by admixture of water therewith. For such purposes, the demulsifiers of the present invention may be employed per se, in mixtures thereof, or in combination with a suitable vehicle e.g., a petroleum fraction, to form a concentrated solution or dispersion for addition to the fuels to be treated. For example, when it is desired to add the demulsifying agent in the form of a concentrated solution or dispersion, it is preferably that such a solution or dispersion be prepared by employing a vehicle that is compatible with and does not deleteriously affect the performance of the petroleum distillate fuel to be treated. Hence, particularly suitable vehicles for preparing concentrated solutions or dispersions of the demulsifying agents include petroleum fractions similar to or identical to the petroleum distillate fuel to be treated in accordance with this invention.

In illustration, such concentrates may comprise a petroleum distillate or other suitable liquid hydrocarbon in admixture with a demulsifier as embodied herein and wherein the demulsifier is present in an amount of about 10 to 75% or higher but preferably 10 to 25% based on the weight of the concentrate. As specific illustrations, such concentrates may comprise a suitable hydrocarbon vehicle, e.g., diesel fuels, kerosenes, and other mineral oil fractions, in which there is dissolved or dispersed a demulsifier in amounts varying from about 10 to 75% by weight of the concentrate, and, in still more specific illustration, a suitable concentrate comprising about 50% by weight of demulsifier in admixture with a petroleum hydrocarbon of diesel fuel grade.

In practice, the general procedure is either to add the compound of our invention at the refinery of at the loading dock using a proportional pump. The pumping device adds the product so that is is entirely mixed and thus insures that the cargo oil meets all the required specifications on arrival.

The amount of active emulsion preventive added will vary depending upon many factors, for example, the fuel oil, the amount of agitation encountered, the amount of water, etc. In most cases suitable results are obtained employing 0.005 to 2 parts of active compound per 100 parts of oil, but preferably 0.01 to 1 parts per 100 parts of oil. In certain oils, the lower concentrations are satisfactory whereas with certain more readily emulsifiable oils, the higher concentrations are desirable.

In order further to describe this phase of our invention, several of the test compositions are prepared by dissolving 0.2% of the following compounds of this invention in a diesel fuel, mixing the thus prepared solution with an equal amount of either distilled water or synthetic seal water, and subjecting the resulting admixtures to stirring at the rate of 1500 revolutions per minute. Blanks are prepared by mixing the diesel fuel with distilled water or synthetic sea water in equal amounts. The test compositions containing no demulsifier form emulsions which persist for long periods of time after stirring is stopped. Test compositions containing the compounds shown in the following table either do not emulsify or the emulsions are completely resolved within a short time after stirring is stopped.

EMULSION PREVENTATIVE FOR OIL IN TRANSIT

| Ex. No. | I Reactants (grams) | H₂O eliminated (grams) | II—Weight of alkylene oxides added to I in alphabetical order (grams) |
|---|---|---|---|
| 1B-1 | 1a (439) plus oleic acid (846) | 54 | (A) PrO (32,620), (B) EtO (3,690). |
| 1B-2 | ......do...... | 54 | (A) PrO (40,000), (B) EtO (2,300). |
| 1B-3 | ......do...... | 54 | (A) PrO (40,000), (B) EtO (8,710). |
| 1B-4 | ......do...... | 54 | (A) PrO (48,620), (B) EtO (2,585). |
| 1B-5 | ......do...... | 54 | (A) PrO (48,620), (B) EtO (5,560). |
| 1B-6 | ......do...... | 54 | (A) PrO (48,620), (B) EtO (9,320). |
| 1B-7 | ......do...... | 54 | (A) PrO (59,830), (B) EtO (15,390). |
| 1B-8 | 2a (568) plus stearic acid (852) | 54 | (A) PrO (54,640), (B) EtO (13,660). |
| 1B-9 | ......do...... | 72 | (A) PrO (61,470), (B) EtO (16,390). |
| 1B-10 | ......do...... | 72 | (A) PrO (61,470), (B) EtO (19,120). |
| 1B-11 | 1b (492) plus oleic acid (564) | 36 | (A) PrO (38,760), (B) EtO (6,120). |
| 1B-12 | ......do...... | 36 | (A) PrO (40,800), (B) EtO (10,200). |
| 1B-13 | ......do...... | 36 | (A) PrO (45,900), (B) EtO (12,240). |
| 1B-14 | 1c (645) plus lauric acid (600) | 54 | (A) PrO (41,680), (B) EtO (5,950). |
| 1B-15 | ......do...... | 54 | (A) PrO (47,640), (B) EtO (11,910). |
| 1B-16 | 3c (907) plus lauric acid (600) | 54 | (A) PrO (54,520), (B) EtO (13,630). |
| 1B-17 | ......do...... | 54 | (A) PrO (54,420), (B) EtO (20,440). |
| 1B-18 | 1d (660) plus lauric acid (800) | 72 | (A) PrO (69,400), (B) EtO (20,820). |
| 1B-19 | ......do...... | 108 | (A) PrO (54,080), (B) EtO (13,520). |
| 1B-20 | ......do...... | 108 | (A) PrO (67,600), (B) EtO (17,580). |
| 1B-21 | 6a (1,330) | | (A) BuO (26,600), (B) EtO (19,950). |
| 1B-22 | 9a (943) | | (A) BuO (28,290), (B) EtO (14,150). |
| 1B-23 | 1a (439) | | (A) PrO (17,560), (B) EtO (4,390). |
| 1B-24 | 2a (568) | | (A) BuO (17,040), (B) EtO (5,680). |
| 1B-25 | 4a (523) | | (A) BuO (15,690), (B) EtO (2,620). |
| 1B-26 | 1d (660) | | (A) BuO (13,290), (B) EtO (5,280). |
| 1B-27 | 4d (722) | | (A) BuO (30,880), (B) EtO (7,720). |
| 1B-28 | 28a (1,960) | | (A) PrO (54,520), (B) EtO (20,440). |
| 1B-29 | 28a (1,960) | | (A) BuO (26,600), (B) EtO (19,120). |
| 1B-30 | 28a (1,960) plus lauric acid (600) | 120 | (A) PrO (17,560), (B) EtO (13,630). |
| 1B-31 | ......do...... | 120 | |
| 1B-32 | 28aOA (3,054) plus stearic acid (284) | 18 | |
| 1B-33 | 28aOA | | (A) PrO (47,640), (B) EtO (5,950). |
| 1B-34 | 28b (1,400) | | (A) BuO (17,040), (B) EtO (5,680). |
| 1B-35 | 28b (1,400) plus oleic acid (564) | 40 | |
| 1B-36 | ......do...... | 40 | (A) BuO (780), (B) PrO (1,264), (C) EtO (7,720). |
| 1B-37 | 29b (1,635) | | |
| 1B-38 | 29bO (2,655) plus oleic acid (282) | 18 | |
| 1B-39 | 29bAOA | | (A) PrO (40,000), (B) EtO (15,000). |
| 1B-40 | 30b (1,580) | | |
| 1B-41 | 30b (1,580) plus stearic acid (569) | 40 | (A) EtO (1,995), (B) PrO (12,000). |
| 1B-42 | ......do...... | 40 | |

(2) BREAKING OIL-IN-WATER EMULSIONS

This phase of our invention relates to the use of the oxyalkylated and other products of this invention in a process for preventing, resolving or separating emulsions of the oil-in-water class.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or brine are representative oil-in-water emulsions. Other oil-in-water emulsions include: steam cylinder emulsions, in which traces of lubricating oil are found dispersed in condensed steam from steam engines and steam pumps; wax-hexane-water emulsions, encountered in de-waxing operations in oil refining; butadiene tar-in-water emulsions, encountered in the manufacture of butadiene from heavy naphtha by cracking in gas generators, and occurring particularly in the wash box waters of such systems; emulsions of "flux oil" in steam condensate produced in the catalytic dehydrogenation of butylene to produce butadiene; styrene-in-water emulsions in synthetic rubber plants; synthetic latex-in-water emulsions, found in plants producing copolymer butadiene-styrene or GRS synthetic rubber; oil-in-water emulsions occurring in the cooling water systems of gasoline absorption plants; pipe press emulsions from steam-actuated presses in clay pipe manufacture; emulsions of petroleum residues-in-diethylene glycol, in the dehydration of natural gas.

In other industries and arts, emulsions of oily materials in water or other non-oily media are encountered, for example, in sewage disposal operations, synthetic resin emulsion paint formulation, milk and mayonnaise processing, marine ballast water disposal, and furniture polish formulation. In cleaning the equipment used in processing such products, diluted oil-in-water emulsions are inadvertently, incidentally, or accidentally produced. The disposal of aqueous wastes is, in general, hampered by the presence of oil-in-water emulsions.

Essential oils comprise non-saponifiable materials like terpenes, lactones, and alcohols. They also contain saponifiable esters or mixtures of saponifiable and non-saponifiable materials. Steam distillation and other production procedures sometimes cause oil-in-water emulsions to be produced, from which the valuable essential oils are difficultly recoverable.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

The foregoing examples illustrate the fact that, within the broad genus of oil-in-water emulsions, there are at least three important sub-genera. In these, the dispersed oily material is respectively non-saponifiable, saponifiable, and a mixture of non-saponifiable and saponifiable materials. Among the most important emulsions of non-saponifiable material in water are petroleum oil-in-water emulsions. Saponifiable oil-in-water emulsions have dispersed phases comprising, for example, saponifiable oils and fats and fatty acids, saponifiable oily or fatty esters, and the organic components of such esters to the extent such components are immiscible with aqueous media. Emulsions produced from certain blended lubricating compositions containing both mineral and fatty oil ingredients are examples of the third sub-genus.

Oil-in-water emulsions contain widely different proportions of dispersed phase. Where the emulsion is a waste product resulting from water flushing of manufacturing areas or equipment, the oil content may be only a few parts per million. Resin emulsion paints, as produced, contain a major proportion of dispersed phase. Naturally-occurring oil-field emulsions of the oil-in-water class carry crude oil in proportions varying from a few parts per million to about 20%, or higher in certain cases.

This phase of the present invention is concerned with the resolution of those emulsions of the oil-in-water class which contain a minor proportion of dispersed phase, ranging, for example, from 20% or higher down to 50 parts per million or less.

Although the present process relates to emulsions containing for example as much as 20% or more dispersed oily material, many if not most of them contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not mean that any sharp line of demarcation exists and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

In emulsions having high proportions of dispersed phase, appreciable amounts of some emulsifying agent are probably present, to account for their stability. In the case of more dilute emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremely stable dispersion; yet neither the steam condensate nor the refined hydrocarbon oil would appear to contain anything suitable to stabilize the emulsion. In such cases, emulsion stability must probably be predicated on some basis other than the presence of an emulsifying agent.

The present process is not believed to depend for its effectiveness on the application of any simple laws, because it has a high level of effectiveness when used to resolve emulsions of widely different composition, e.g., crude or refined petroleum in water or diethyleneglycol, as well as emulsions of oily materials like animal or vegetable oils or synthetic oily materials in water.

Some emulsions are by-products of manufacturing procedures in which the composition of the emulsion is known. In many instances, however, the emulsions to be resolved are either naturally-occurring or are accidentally or unintentionally produced; or in any event they do not result from a deliberate or premeditated emulsification procedure. In numerous instances, the emulsifying agent is unknown and as a matter of fact an emulsifying agent, in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, unintentionally, or unavoidably produced. Such emulsions are commonly of the most dilute type, containing about 1% or less of dispersed phase, although higher concentrations are often encountered.

The process which constitutes this phase of the present invention consists in subjecting an emulsion of the oil-in-water class to the action of a demulsifier of the kind described, thereby causing the oil particles in the emulsion to coalesce sufficiently to rise to the surface of the non-oily layer (or settle to the bottom, if the oil density is greater) when the mixture is allowed to stand in the quiescent state after treatment with the reagent or demulsifier.

Applicability of the present process can be readily determined by direct trial on any emulsion, without reference to theoretical considerations. This fact facilitates its application to naturally-occurring emulsions, and to emulsions accidentally, unintentionally, or unavoidably produced; since no laboratory experimentation, to discover the nature of the emulsion components or of the emulsifying agent, is required.

Our reagents are useful in undiluted form or diluted with any suitable solvent. Water is commonly found to be a highly satisfactory solvent, because of its ready availability and negligible cost; but in some cases, non-aqueous solvents such as an aromatic petroleum solvent may be found preferable. The products themselves may exhibit solubilities ranging from rather modest water-dispersibility to full and complete dispersibility in that solvent. Because of the small proportions in which our reagents are customarily employed in practicing our process, apparent solubility in bulk has little significance. In the extremely low concentrations of use they undoubtedly exhibit appreciable water-solubility or water-dispersibility as well as oil-solubility or oil-dispersibility.

Our reagents may be employed alone, or they may in some instances be employed to advantage admixed with other and compatible oil-in-water demulsifiers.

Our process is commonly practiced simply by introducing small proportions of our reagent into an oil-in-water class emulsion, agitating to secure distribution of the reagent and incipient coalescence, and letting stand until the oil phase separates. The proportion of reagent required will vary with the character of the emulsion to be resolved. Ordinarily, proportions of reagent required are from 1/10,000 to 1/1,000,000 by volume of emulsion treated; but preferably is 5–50 p.p.m. More reagent is sometimes required. We have found that the factors, reagent feed rate, agitation, and settling time are somewhat interrelated. For example, we have found that if sufficient agitation or proper character is employed, the settling time is shortened materially. On the other hand, if satisfactory agitation is not available, but extended settling time is, the process is equally productive of satisfactory results.

Agitation may be achieved by any available means. In many cases, it is sufficient to introduce the reagent into the emulsion and use the agitation produced as the latter flows through a conduit or pipe. In some cases, agitation and mixing are achieved by stirring together or shaking together the emulsion and reagent. In some instances, distinctly improved results are obtained by the use of air or other gaseous medium. Where the volume of gas employed is relatively small and the conditions of its introduction relatively mild, it behaves as a means of securing ordinary agitation. Where aeration is effected by introducing a gas directly under pressure or from porous plates or by means of aeration cells, the effect is often importantly improved. A sub-aeration type flotation cell, of the kind commonly employed in ore beneficiation operations, is an extremely useful adjunct in the application of our reagents to many emulsions. It frequently accelerates the separation of the emulsion, reduces reagent requirements, or produces an improved effluent. Sometimes all three improvements are observable.

Heat is ordinarily of little importance in resolving oil-in-water class emulsions with our reagents although there are some instances where heat is a useful adjunct. This is especially true where the viscosity of the continuous phase of the emulsion is appreciably higher than that of water.

In some instances, importantly improved results are obtained by adjusting the pH of the emulsion to be treated to an experimentally determined optimum value.

The reagent feed rate also has an optimum range, which is sufficiently wide, however, to meet the tolerances required for the variances encountered daily in commercial operations. A large excess of reagent can produce distinctly unfavorable results.

Our reagents have likewise been successfully applied to other oil-in-water class emulsions, of which representative examples have been referred to above. Their use is, therefore, not limited to crude petroleum-in-water emulsions.

The manner of practicing the present invention is clear from the foregoing description. However, for completeness the following example is included:

*Example*

An oil-in-water class emulsion produced from an oil well in the Coalinga Field located in Southern California contains about 1,500 p.p.m. of crude oil, on the average, and is stable for days in the absence of external resolution. Our process is practiced by flowing the well fluids, comprising free crude oil, oil-in-water emulsion and natural gas, through a gas separator, then to a steel tank of 5,000 barrel capacity. In this tank the oil-in-water emulsion falls to the bottom and is separated from the free oil. The oil-in-water emulsion is withdrawn from the bottom of the tank and the reagent, of Example 2-1 introduced into the stream. The proportion employed is about 5 p.p.m. based on the volume of emulsion, on the average. The chemicalized emulsion flows to a second tank, mixing being achieved in the pipe. In the second tank it is allowed to stand quiescent. Clear water is withdrawn from the bottom of this tank, separated oil from the top.

The compounds in the following table are tested on oil-in-water emulsions taken from two currently producing oil fields, Coalings located in Southern California and Mt. Poso located in Southern California, according to the following procedure:

Natural crude oil-in-water emulsions are subjected to the emulsifiers set forth below. The mixture of emulsion and demulsifier is agitated for about two minutes at about 150 shakes per minute and then allowed to stand quiescent at 160° F. for about 19 hours. A clean break is noted at all of the concentrations shown under the conditions indicated. A check or control sample processed in the same way, except that no reagent is added to it, is still a brown emulsion at the end of the period. This is done to determine the feed ratio of demulsifier to be employed in field demulsification.

OIL-IN-WATER DEMULSIFIER

| Ex. No. | I | | Weight of alkylene oxide added to I (grams) | Demulsification ratio (p.p.m.) |
|---|---|---|---|---|
| | Reactants (grams) | $H_2O$ eliminated (grams) | | |
| 2-1 | 1a (439) plus oleic acid (846) | 54 | EtO (880) | 3-5 |
| 2-2 | do | 54 | EtO (1,560) | 3-5 |
| 2-3 | do | 54 | PrO (200) | 3-5 |
| 2-4 | 2a (568) plus oleic acid (846) | 54 | EtO (1,110) | 3-5 |
| 2-5 | do | 54 | PrO (120) | 3-5 |
| 2-6 | 3a (679) plus oleic acid (846) | 54 | EtO (920) | 3-5 |
| 2-7 | do | 54 | PrO (185) | 3-5 |
| 2-8 | 4a (523) plus oleic acid (846) | 54 | EtO (970) | 3-5 |
| 2-9 | 4a (523) plus stearic acid (852) | 54 | BuO (130) | 3-5 |
| 2-10 | 4a (523) plus lauric acid (600) | 54 | BuO (140) | 3-5 |
| 2-11 | 1d (660) plus lauric acid (800) | 72 | PrO (145) | 3-5 |
| 2-12 | 1d (660) plus oleic acid (1,128) | 72 | BuO (140) | 3-5 |
| 2-13 | do | 72 | EtO (1,540) | 3-5 |
| 2-14 | 2d (832) plus oleic acid (1,128) | 72 | EtO (1,670) | 3-5 |
| 2-15 | do | 72 | PrO (230) | 3-5 |
| 2-16 | do | 72 | BuO (160) | 3-5 |
| 2-17 | 3d (1,004) plus lauric acid (800) | 72 | EtO (1,450) | 3-5 |
| 2-18 | do | 72 | PrO (200) | 3-5 |
| 2-19 | 4d (772) plus oleic acid (1,128) | 72 | EtO (1,540) | 3-5 |
| 2-20 | do | 72 | PrO (200) | 3-5 |
| 2-21 | do | 72 | BuO (140) | 3-5 |
| 2-22 | 10a (1,075) | | EtO (1,670) | 3-5 |
| 2-23 | 2b (662) | | PrO (175) | 3-5 |
| 2-24 | 2c (774) | | BuO (180) | 3-5 |
| 2-25 | 3c (907) | | EtO (1,630) | 3-5 |
| 2-26 | 4c (733) | | PrO (170) | 3-5 |
| 2-27 | 28a (1,960) | | EtO (2,540) | 3-5 |
| 2-28 | 28a (1,960) | | (A) PrO (200), (B) EtO (1,930) | 3-5 |
| 2-29 | 28a (1,960) plus lauric acid (600) | 120 | | 3-5 |
| 2-30 | do | 120 | EtO (2,850) | 3-5 |
| 2-31 | 28aO (3,054) plus stearic acid (284) | 18 | | 3-5 |
| 2-32 | 28a AOA | | (A) PrO (380), (B) EtO (240) | 3-5 |
| 2-33 | 28b (1,400) | | EtO (960), (B) PrO (220) | 3-5 |
| 2-34 | 28b (1,400) plus oleic acid (564) | 40 | EtO (1,560) | 3-5 |
| 2-35 | 29b (1,635) | | | 3-5 |
| 2-36 | 29b AOA | | | 3-5 |
| 2-37 | 29b (1,635) plus oleic acid (282) | 18 | (A) PrO (150), (B) EtO (320) | 3-5 |
| 2-38 | 30b (1,580) plus stearic acid (569) | 40 | BuO (410) | 3-5 |
| 3-39 | 30b (1,580) | | | 3-5 |
| 3-40 | 30b AOA | | | 3-5 |

(3) CORROSION INHIBITORS

This phase of our invention relates to the use of our compositions in preventing the corrosion of metals and particularly iron, steel and ferrous alloys. These compositions can be used in a wide variety of applications and systems where iron, steel and ferrous alloys are affected by corrosion. They may be employed for inhibiting corrosion in processes which require thin protective or passivating coatings as by dissolution in the medium which comes in contact with the metal. They can be used in preventing atmospheric corrosion, underwater corrosion, corrosion in closed systems, corrosion in steam and hot water systems, corrosion in chemical industries, underground corrosion, etc.

These corrosion inhibitors find special utility in the prevention of corrosion of pipe or equipment which is in contact with a corrosive oil-containing medium, as, for example, in oil wells producing corrosive oil or oil-brine mixtures, in refineries, and the like. They appear to possess properties which impart to metals resistance to attack by a variety of corrosive agents, such as brines, weak inorganic acids, organic acids, $CO_2$, $H_2S$, etc.

The method of carrying out our process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, organic acids and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all well-head fittings, connections and flow lines handling the corrosive fluid.

Where the inhibitor composition is a liquid, it is conveniently fed into the well annulus by means of a motor driven chemical injector pump, or it may be dumped periodically (e.g., once every day or two) into the annulus by means of a so-called "boll weevil" device or similar arrangement. Where the inhibitor is fabricated in solid form (as hereinafter described), it may be dropped into the well as a solid lump or stick, or it may be washed in with a small stream of the well fluids or other liquid. Where there is gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally, oil and gas wells are completed in such a manner that there is no opening between the annulus and the bottom of the tubing or pump. The results, for example, when the tubing is surrounded at some point by a packing held by the casing or earth formation below the casing. In such wells the reagent may be introduced into the tubing through a pressure equalizing vessel, after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent, such as mineral oil, methylethyl ketone, xylene, kerosene, or even water. The selection of solvent will depend much upon the exact reagent being used and its solubility characteristics. It is also generally desirable to employ a solvent which will yield a solution of low freezing point, so as to obviate the necessity of heating the solution and injection equipment during winter use.

For treating wells with packed-off tubing, the use of solid weighted or unweighted "sticks" or plugs of inhibitor is especially convenient. These may be prepared by blending the inhibitor with a mineral wax, asphalt or resin in a proportion sufficient to give a moderately hard and high-melting solid which can be handled and fed into the well conveniently. Methods of preparing and using these types of sticks are described in U.S. Patents 2,559,384 and 2,559,385.

The amount of corrosion preventive agent required in our process varies with the corrosiveness of the system, but where a continuous or semi-continuous treating procedure is carried out as described above, the addition of reagent in the proportion of from 5 parts to 1,000 parts per million or more parts of corrosive fluid, but preferably from 10 to 100 p.p.m., will generally provide protection.

The protective action of the herein described reagents appears to be maintained for an appreciable time after treatment ceases, but eventually is lost unless another application is made.

For the protection of gas wells and gas-condensate wells, the amount of corrosion inhibitor required will usually be within the range of one-half to 3 lbs. or more per million cubic feet of gas produced, depending upon the amount and type of corrosive agent in the gas and the amount of liquid hydrocarbon and water produced. However, in no case does the amount of inhibitor required appear to be stoichiometrically related to the amount of acids produced by a well, since protection is obtained with much less of the compounds than usually would be required for neutralization of the acids produced.

The compounds of this invention can also be employed in conjunction with other corrosive inhibitors, for example, those disclosed in Reissue 22,963, etc.

The following examples are presented to illustrate the superiority of the instant compounds as corrosive inhibitors.

Examples

*Stirring tests.*—These tests are run on synthetic fluids. The procedure involves the comparison of the amount of iron in solution after a predetermined interval of time of contact of a standardized iron surface with a two-phase corrosive medium with similar determinations in systems containing inhibitors.

Six hundred ml. beakers equipped with stirrers and heaters are charged with 400 ml. of 10% sodium chloride containing 500 p.p.m. acetic acid and 100 ml. of mineral spirits. The liquids are brought to temperature and a 1 x 1 inch sand blasted coupon is suspended by means of a glass hook approximately midway into the liquid phase of the beaker. The stirrer is adjusted to agitate the liquids at such a rate as to provide good mixing of the two layers.

After 30 minutes samples of the aqueous phase are taken and the iron content of each sample is determined by measuring the color formed by the addition of hydrochloric acid and potassium thiocyanate in a photoelectric colorimeter.

The protection afforded by an inhibitor is measured by comparison of the amount of light absorbed by inhibited and unhibited samples run simultaneously. Percent protection can be determined by the following formula:

$$\frac{A_1 - A_2}{A_1} \times 100 = \text{percent protection}$$

where $A_1$ is the percent light absorbed by an uninhibited sample and $A_2$ is the same value for inhibited sample. The results are shown in the following table.

The present tests were run at room temperature at 100 p.p.m. based on total fluids.

CORROSION INHIBITOR

| Ex. No. | I | | Weight of oxides added to I (grams) | Percent protection |
|---|---|---|---|---|
| | Reactants (grams) | H₂O eliminated (grams) | | |
| 3A-1 | 1a (439) plus oleic acid (846) | 54 | 0 | 84.1 |
| 3A-2 | 1a (439) plus lauric acid (600) | 54 | 0 | 86.3 |
| 3A-3 | 4a (523) plus lauric acid (600) | 54 | 0 | 85.0 |
| 3A-4 | 2a (558) plus oleic acid (1,692) | 108 | 0 | 85.2 |
| 3A-5 | 3a (697) plus lauric acid (1,800) | 162 | 0 | 87.6 |
| 3A-6 | 1a (439) plus oleic acid (1,692) | 108 | 0 | 80.8 |
| 3A-7 | 6a (1,330) plus lauric acid (600) | 54 | 0 | 75.8 |
| 3A-8 | 9a (943) plus lauric acid (600) | 54 | 0 | 79.2 |
| 3A-9 | 1b (492) plus lauric acid (400) | 36 | 0 | 83.0 |
| 3A-10 | 3b (522) plus oleic acid (1,128) | 72 | 0 | 86.2 |
| 3A-11 | 1c (645) plus lauric acid (600) | 54 | 0 | 83.4 |
| 3A-12 | 4c (733) plus lauric acid (600) | 72 | 0 | 85.2 |
| 3A-13 | 1d (660) plus oleic acid (1,128) | 72 | 0 | 87.0 |
| 3A-14 | 4d (772) plus oleic acid (1,128) | 72 | 0 | 86.2 |
| 3A-15 | 1a (439) plus oleic acid (846) | 54 | EtO (130) | 92.3 |
| 3A-16 | ----do---- | 54 | EtO (400) | 89.2 |
| 3A-17 | ----do---- | 54 | PrO (360) | 91.7 |
| 3A-18 | ----do---- | 54 | Octylene oxide (255) | 90.2 |
| 3A-19 | ----do---- | 54 | Styrene oxide (390) | 92.0 |
| 3A-20 | 2b (662) plus lauric acid (400) | 36 | EtO (440) | 93.2 |
| 3A-21 | 3b (552) plus oleic acid (564) | 36 | BuO (230) | 89.5 |
| 3A-22 | ----do---- | 36 | Styrene oxide | 90.5 |
| 3A-23 | 1c (645) plus lauric acid (600) | 54 | EtO (350) | 89.7 |
| 3A-24 | 3c (907) plus lauric acid (600) | 54 | PrO (870) | 92.5 |
| 3A-25 | 1d (660) plus oleic acid (1,128) | 72 | BuO (360) | 93.8 |
| 3A-26 | ----do---- | 72 | Octylene oxide (385) | 92.0 |
| 3A-27 | ----do---- | 72 | Styrene oxide (520) | 91.8 |
| 3A-43 | 28a (1,960) | | (A) PrO (54520), (B) EtO (1,750) | 87.2 |
| 3A-28 | 28a (1,960) plus lauric acid (600) | 120 | 0 | 85.1 |
| 3A-29 | ----do---- | 120 | PrO (12,000) | 88.3 |
| 3A-30 | 28aO (3,054) plus stearic acid (284) | 18 | 0 | 90.2 |
| 3A-31 | 28aAOA | | 0 | 89.5 |
| 3A-32 | 28b (1,400) | | (A) PrO (8,240), (B) EtO (1,200) | 90.3 |
| 3A-33 | 28b (1,400) plus oleic acid (564) | 40 | 0 | 84.7 |
| 3A-34 | ----do---- | 40 | BuO (1,230) | 86.2 |
| 3A-35 | 28bAOA | | 0 | 84.1 |
| 3A-36 | 29b (1,635) | | (A) PrO (7,470), (B) EtO (730) | 83.7 |
| 3A-37 | 29b (1,635) plus oleic acid (282) | 18 | (A) BuO (870), (B) PrO (360) | 89.1 |
| 3A-38 | 29bAOA | | 0 | 92.3 |
| 3A-39 | 30b (1,580) | | (A) PrO (12,150) | 90.1 |
| 3A-40 | 30b (1,580) plus stearic acid (569) | 40 | 0 | 93.2 |
| 3A-41 | ----do---- | 40 | BuO (360) | 89.6 |
| 3A-42 | 30bAOA | | 0 | 90.5 |

These corrosion inhibitors also find special utility in the prevention of corrosion or rusting of metals when applied thereto in the form of a coating, for example, as slushing oils.

In the shipping and storage of metal articles, particularly ferrous metal articles having machined surfaces, it is highly desirable to protect such articles from the corrosion and rusting which normally occur when metal surfaces are exposed to the atmosphere for any length of time. While such protection should remain effective over long periods of time under very adverse conditions of humidity, it should likewise be of such nature that it can readily be removed when it is desired to place the metal article into use. Among the various means employed for providing such protection against corrosion, that of applying a film or coating of a corrosion inhibiting liquid composition to the metal surface has enjoyed widest use by reason of its economy and adaptability to all sorts of metal articles ranging from simple pieces to complicated machine assemblies. Such liquid corrosion preventive compositions often comprise a mineral or other non-drying oil base having a corrosion preventive material dispersed or dissolved therein, and are hence usually referred to generically as "slushing oils" even though in some instances they may not actually contain an oil.

The slushing oils heretofore employed, however, have been subjected to numerous disadvantages. In some instances they have been too expensive for widespread general use whereas in others they are too difficult to remove from surfaces to which they have been applied. Many of them have not proved effective over sufficiently long periods of time, or have not provided the desired degree of protection against corrosion under extreme climatic conditions such as those encountered in the tropics or at sea.

The compositions of this invention are capable of use in inhibiting or preventing the corrosion or rusting of metal surfaces over long periods of time and under adverse climatic conditions. They can readily be dissolved or dispersed in a suitable liquid vehicle to form inexpensive and highly effective slushing oil compositions.

While the above-described products can be employed per se in inhibiting or preventing the corrosion or rusting of metals, by reason of their high viscosity they are more readily applied to metal surfaces in the form of a solution or dispersion in a liquid vehicle. For example, they are dissolved in a heavy organic solvent where one does not desire it to evaporate, or in a relatively light organic solvent, such as hexane, benzene, petroleum ether, carbon tetrachloride, or a light naphtha, etc., to form slushing oil compositions of a viscosity suitable for application to metal surfaces by dipping, brushing, or spraying procedures. The heavy solvent will remain with the compositions of this invention, but the light solvent will evaporate leaving a thin protective coating of the corrosion inhibiting products on the metal surface. When it is desired to use the metal article thus protected, the corrosion preventive coating may readily be removed by washing with a suitable solvent. Gasoline is an excellent solvent for this purpose since it is cheap and universally available. The light petroleum distillate known as Stoddard solvent has been found particularly suitable for use as the solvent in preparing liquid protective coating compositions comprising the new corrosion preventives, and may also be used in the subsequent removal of the protective coating.

In addition to being employed per se or in the form of the above-described liquid coating compositions, the corrosion preventive reaction products of the present invention may advantageously be employed in conjunction with other corrosion inhibitors.

The amount of active compound in the solvent will depend upon the nature of the solvent itself as well as the thickness of the coating desired on the metal surface, for example, from 0.5 to 100% by weight based on the weight of the solvent, but preferably 1–25%. Where the solvent is not appreciably volatile lesser amounts can be employed for example, 0.5–10%, but preferably 1–5%. Where the solvent is volatile more of the active compound is employed, for example, 5–100%, but preferably 25–75%.

Among the solvents which can be used are normally liquid petroleum hydrocarbons, such as normal hexane, 2,2,4-trimethyl pentane, 2,2,5,3-tetramethylbutane, 2,5-di-methylhexane, normal octane, nonane, decane, dodecane, ethyl cyclohexane, isopropylcyclohexane, toluene, p-xylene, o-xylene, m-xylene, cumene, petroleum naphtha, mineral spirits which are distillates obtained from petroleum having a boiling range of between about 150°–216° C. and a flash point of 100° C., kerosene, Stoddard solvent, mineral seal oil, gas oil, gasoline, other light petroleum distillates, turpentine, halo-genated hydrocarbons such as ethylene dichloride, trichloroethylene, propyl chloride, butyl chloride, chlorinated kerosene, alcohols such as methyl ethyl, propyl, isopropyl, butyl, amyl, hexyl, cyclohexyl, heptyl, methyl, cyclohexyl, octyl, decyl, lauryl, myristyl, cetyl, stearyl, benzyl, etc., alcohols, polyhydric alcohols, such as glycols, glycerols, etc., esters of monohydric alcohols, etc.

The following examples are presented to illustrate our present invention.

*Examples*

Test pieces of iron plaques are coated with—

(A) 3% sea water emulsified in refined petroleum distillate.
(B) Composition A containing 0.2% by weight, based on the weight of composition A, of the compounds shown in the following table.

The iron plaques are kept at a temperature of about 90° C. In contrast to the control A on which intensive rust is observed after 2 hours, no rusting is observed on the composition containing the compounds of our invention.

(4) ANTI-SLUDGING AND COLOR STABILIZING ADDITIVES FOR FUEL OILS

This phase of our invention relates to the use of our compositions to improve hydrocarbon fuels, particularly fuel oils, since they are capable of preventing or inhibiting undesirable color formation and the sludging and/or clogging tendencies generally exhibited by hydrocarbon fuels, such as those utilized in burner systems, tanks, diesel and jet engines, and other industrial and domestic equipment. These compounds are particularly useful in engines such as jet and diesel engines, where the problem of thermal stabilization arises. In addition, they are capable of removing preformed deleterious matter from filters, screens, and the like, which deleterious matter is formed by deterioration of and/or the presence of foreign bodies (e.g. water) in the fuel oils.

Hydrocarbons, such as distillate fuels, for example, those having a normal distillation range of from about 300° F. to about 700° F., and particularly those from about 340° F. to about 640° F., generally have a marked tendency to deteriorate under oxidizing conditions, and to form sludge. Also, the presence of impurities in such fuels, such as the presence of moisture, dispersed water, organic and/or inorganic foreign matter and the like, causes the formation of insoluble products which tend to settle out and adhere to surfaces with which they come in contact, thereby in turn, causing clogging or plugging of filters, strainers, screens, conduit lines, and the like, of the equipment in which they are used. This necessitates frequent cleaning and even replacement of parts, thereby markedly decreasing the performance efficiency of various equipment which utilizes such fuel oils.

The problem of screen clogging is common, particularly in domestic fuel oil systems employing distillate fuel oils produced by distillation or cracking of petroleum, which fuels are characterized by their relatively low

SLUSHING COMPOUNDS

| Ex. No. | I | | Weight of oxides added to I (grams) |
|---|---|---|---|
| | Reactants (grams) | H₂O eliminated (grams) | |
| 3B–1 | 1a (439) plus lauric acid (600) | 54 | None. |
| 3B–2 | do | 72 | Do. |
| 3B–3 | 1a (439) plus stearic acid (852) | 54 | Do. |
| 3B–4 | do | 72 | Do. |
| 3B–5 | 2a (568) plus stearic acid (852) | 54 | Do. |
| 3B–6 | 3a (679) plus oleic acid (846) | 54 | Do. |
| 3B–7 | do | 72 | Do. |
| 3B–8 | 1b (492) plus lauric acid (400) | 36 | Do. |
| 3B–9 | do | 54 | Do. |
| 3B–10 | 1c (645) plus stearic acid (852) | 54 | Do. |
| 3B–11 | 1d (660) plus lauric acid (800) | 72 | Do. |
| 3B–12 | do | 72 | PrO (348). |
| 3B–13 | do | 72 | BuO (288). |
| 3B–14 | 16d (800) plus lauric acid (800) | 72 | None. |
| 3B–15 | do | 72 | Styrene oxide (260). |

CORROSION INHIBITOR

| Ex. No. | I | | II—Weight of alkylene oxides added to I in alphabetical order (grams) |
|---|---|---|---|
| | Reactants (grams) | H₂O eliminated (grams) | |
| 3B–16 | 28a (1,960) | | (A) PrO (54,520), (B) EtO (1,750). |
| 3B–17 | 28a (1,960) plus lauric acid (600) | 120 | 0. |
| 3B–18 | do | 120 | PrO (12,000). |
| 3B–19 | 28aO (3,054) plus stearic acid (284) | 18 | 0. |
| 3B–20 | 28aAOA | | 0. |
| 3B–21 | 28b (1,400) | | (A) PrO (8,240), (B) EtO (1,200). |
| 3B–22 | 28b (1,400) plus oleic acid (564) | 40 | 0. |
| 3B–23 | do | 40 | BuO (1,230). |
| 3B–24 | 28bAOA | | 0. |
| 3B–25 | 29b (1,635) | | (A) PrO (7,470), (B) EtO (730). |
| 3B–26 | 29b (1,635) plus oleic acid (282) | 18 | (A) BuO (870), (B) PrO (360). |
| 3B–27 | 29bAOA | | 0. |
| 3B–28 | 30b (1,580) | | (A) PrO (12,150). |
| 3B–29 | 30b (1,580) plus stearic acid (569) | 40 | 0. |
| 3B–30 | do | 40 | BuO (360). |
| 3B–31 | 30bAOA | | 0. | viscosity and other properties. Fuel oils of this type generally conform to the specifications set forth in Commercial Standards C.S. 12–40 for Nos. 1, 2 and 3, Fuel Oils. Petroleum distillates within the ranges specified and which generally do not exceed 700° F., and preferably are below 675° F., for use as diesel fuels, are further examples of the type of oils which under conditions described herein have a tendency to clog screens or filters, particularly when such fuels contain minor amounts of water dispersed therein.

Another place where screen clogging and plugging of conduit lines is encountered is in fuel oil storage tanks, which latter may be connected to burner systems or engines, etc. The stored fuel generally comes in contact with air, moisture, etc., which causes formation and precipitation of sludge materials, the latter depositing on and clogging the screens or filters used for protecting the burners or engines using such fuel oils.

The compositions of this invention inhibit sludging tendencies of hydrocarbon fuel oils. They inhibit sludging and precipitation of contaminants in hydrocarbon distillate fuel oils, particularly in cracked hydrocarbon fuels. They also provide distillate fuel oil compositions, particularly of fuel oils obtained during cracking of hydrocarbons, which fuel oil compositions have excellent performance characteristics with respect to freedom from screen clogging, even after extensive storage under oxidizing conditions and in the presence of water. They also provide distillate fuel oil compositions which are effective in removing preformed sludge deposits formed in fuel oil systems. In addition they provide a particular type of distillate fuel oil composition or a blend thereof, which is non-corrosive, stable, and effective for removing sludge and for cleaning metal surfaces.

These improvements are attained by dispersing, admixing with or dissolving in hydrocarbon fuel oils (which normally have a tendency to cause clogging or plugging of screens or the like) a minor amount, which is sufficient to inhibit said tendencies, of the compositions of this invention, for example, from 0.001% to 1%, but preferably from 0.003% to 0.010% by weight based on the fuel. If desired, a minor amount of a detergent and/or solutizer may also be added to the composition.

For ease of handling a concentrate of the compounds of this invention in a hydrocarbon oil can be prepared, for example in concentration of from 5%–50% or higher. This concentrate is then added to the fuel having sludging tendencies to yield the desired active concentration. Other additives can also be added to this concentrate such as oil soluble petroleum sulfonate salts, drying agents, etc.

The hydrocarbon distillate fuel oils in which the active ingredient and/or ingredients of this invention are dispersed or dissolved may be treated or untreated cracked fuel oils, or mixtures of cracked fuels with straight run fuel oils, said fuel oils having components normally distilling from about 300° F. to about 700° F. Preferred fuels have a boiling range of from about 340° F. to about 700° F., and particularly from about 400° F. to about 675° F. Specifically, hydrocarbon distillates which are utilized as bases in compositions of this invention are cracked gas oils, fuel oils, furnace oils, burner oils, diesel fuel oils, kerosene, etc., or mixtures of said cracked fuels with the corresponding or like straight run hydrocarbon fractions.

In general, fuel oils which have marked tendencies towards sluding and clogging of screens, filters, etc., are primarily cracked or blends of cracked and straight run fuel oils which have the following properties:

Gravity, ° API _____ 29–35
ASTM dist., ° F.:
    IBP _____ 400–500
    EBP _____ 600–700
Sulfur, percent w _____ 0.5–1.05
Carbon residue (10 btms.), percent w _____ 0.1–1.4
Pour point, ° F. _____ 0–15

In systems wherein substantial amounts of moisture are present a drying agent may be added which is compatible with the active ingredients of this invention. By typing up most of the free moisture in this manner, the amount which would normally combine with sludge-forming materials is diminished, thus alleviating a most aggravating clogging problem.

Drying agents which are particularly suited are of the glycol-ether type such as diethylene glycol monomethyl, ethyl N-and ispropyl ether, diethylene glycol mono-butyl ether, diethylene glycol mono-decyl ether, etc., also dipropylene glycol mono-ethyl ether, dipropylene glycol mono-isopropyl ether, dipropylene glycol mono-isoamyl ether, diisobutylene glycol mono-isopropyl ether, ethylene-propylene glycol mono-ethyl ether, ethylene-isobutylene glycol mono-isopropyl ether, etc. Instead of the glycol-ethers, various alcohols may be used such as diols having 6 or more carbon atoms in the molecule such as hexylene glycol, decylene glycol, cetylene glycols, etc., diglycols such as dipropylene glycol, dibutylene glycol, diamylene glycol, ether alcohols and particularly the glycol mono-alkyl ethers, e.g. the Cellosolves such as ethylene glycol mono-ethyl ether, ethylene glycol mono-propyl ether, ethylene glycol mono-tert-butyl ether, ethylene glycol mono-butyl ether, propylene glycol mono-ethyl ether, propylene glycol mono-isoamyl ether, etc. Also glycol mono-tert-butyl ether, ethylene glycol mono-hexyl-butyl ether, propylene glycol mono-isoamyl ether, etc. Also glycerine and the like may be used. For example, the amount of drying agent in the fuel can range from 0–2% or higher, but preferably 0–0.5%.

To distillate fuel oil compositions of this invention may also be added minor amounts of a foaming inhibitor such as silicone liquids, e.g., dimethyl silicone, fluoro organic compounds, chloro paraffins, salts of alkyl alkylene phosphates and the like. Compositions of this invention may be used to remove deposits, formed on metal surfaces such as in tubes, evaporators, heat exchangers, distillation and cracking equipment and the like. They are non-corrosive and do not interfere with the functioning of the liquid in which dispersed.

The following examples illustrate the effectiveness of compositions of this invention as sludge inhibitors and anti-clogging agents.

*Test I.—110° F. Accelerated Storage Test*

This test is widely accepted throughout the industry as useful in predicting the amount of degradation products that will form in a fuel oil during normal storage conditions. One week at 110° F. is approximately equal to one month ambient storage for this purpose.

Following are results of a 6 week test on a commercial #2 fuel oil:

| Additive | Conc. (p.p.m.) | Mg. sludge/ 100 ml. | Color (optical density, units) |
|---|---|---|---|
| None | | 3.0 | 28.4 |
| 4–15 | 25 | 2.2 | 26.7 |
| 4–15 | 75 | 1.3 | 23.6 |
| 4–15 | 150 | 0.9 | 19.8 |

*Test II.—90 Minutes 300° F. Diesel Test*

This is a thermal stability test specified by railroads for fuel oil used in diesel engines.

Following are results of a test on a commercial diesel fuel:

| Additive | Conc. (p.p.m.) | Mg. sludge/ 100 ml. | Color (optical density, units) |
|---|---|---|---|
| None | | 12.5 | 100+ |
| 4–15 | 50 | 1.6 | 14.8 |

The following compositions also exhibited similarly effective sludge and color inhibition on the same oils.

The tendency of mineral lubricating oils to deposit gums, resins, soot, and varnish-like materials about the

FUEL ADDITIVE

| Ex. No. | I | | Weight of oxides added to I (grams) |
|---|---|---|---|
| | Reactants (grams) | H₂O eliminated (grams) | |
| 4-1 | 1a (439) plus oleic acid (846) | 54 | None. |
| 4-2 | 2a (568) plus stearic acid (852) | 54 | Do. |
| 4-3 | do | 90 | Do. |
| 4-4 | 4a (523) plus lauric acid (600) | 54 | Do. |
| 4-5 | 1b (492) plus lauric acid (400) | 36 | Do. |
| 4-6 | do | 54 | do. |
| 4-7 | 2b (662) plus lauric acid (400) | 36 | Do. |
| 4-8 | 3b (552) plus stearic acid (568) | 36 | Do. |
| 4-9 | 1c (645) plus lauric acid (600) | 54 | Do. |
| 4-10 | 1c (645) plus oleic acid (846) | 54 | Do. |
| 4-11 | 1d (660) plus stearic acid (1,136) | 72 | Do. |
| 4-12 | 4d (772) plus stearic acid (1,136) | 72 | Do. |
| 4-13 | 13d (688) plus stearic acid (1,136) | 72 | Do. |
| 4-14 | 16d (800) plus stearic acid (1,136) | 72 | Do. |
| 4-15 | 1a (439) plus oleic acid (846) | 54 | PrO (174). |
| 4-16 | do | 54 | PrO (348). |
| 4-17 | do | 54 | BuO (216). |
| 4-18 | 2a (568) plus stearic acid (852) | 54 | Pro (348). |
| 4-19 | do | 54 | BuO (216). |
| 4-20 | do | 54 | Styrene oxide (260). |
| 4-21 | do | 54 | Octylene oxide (256). |
| 4-22 | 1b (492) plus lauric acid (400) | 36 | PrO (348). |
| 4-23 | do | 36 | Styrene oxide (260). |
| 4-24 | 1c (645) plus lauric acid (600) | 54 | PrO (174). |
| 4-25 | 1d (660) plus stearic acid (1,136) | 72 | PrO (348). |
| 4-26 | 4d (772) plus stearic acid (1,136) | 72 | Styrene oxide (260). |
| 4-27 | 16d (800) plus stearic acid (1,136) | 72 | BuO (216). |

| Ex. No. | I | | II—Weight of alkylene oxides added to I in alphabetical order (grams) |
|---|---|---|---|
| | Reactants (grams) | H₂O eliminated (grams) | |
| 4-28 | 28a (1,960) | | (A) PrO (54,520), (B) EtO (1,750). |
| 4-29 | 28a (1,960) plus lauric acid (600) | 120 | 0. |
| 4-30 | do | 120 | PrO (12,000). |
| 4-31 | 28aO (3,054) plus stearic acid (284) | 18 | 0. |
| 4-32 | 28aAOA | | 0. |
| 4-33 | 28b (1,400) | | (A) PrO (8,240), (B) EtO (1,200). |
| 4-34 | 28b (1,400) plus oleic acid (564) | 40 | 0. |
| 4-35 | do | 40 | BuO (1,230). |
| 4-36 | 28bAOA | | 0. |
| 4-37 | 29b (1,635) | | (A) PrO (7,470), (B) EtO (730). |
| 4-38 | 29b (1,635) plus oleic acid (282) | 18 | (A) BuO (870), (B) PrO (360). |
| 4-39 | 29bAOA | | 0. |
| 4-40 | 30b (1,580) | | (A) PrO (12,150). |
| 4-41 | 30b (1,580) plus stearic acid (569) | 40 | 0. |
| 4-42 | do | 40 | BuO (360). |
| 4-43 | 30bAOA | | 0. |

(5) ADDITIVE FOR LUBRICATING OILS

This phase of the invention relates to the use of the compounds of this invention to produce an improved lubricating oil adapted for use in internal combustion engines.

It is generally conceded that in the recent development of internal combustion engines, and particularly engines designed for heavy duty service, the increase in operating temperatures, together with the reduction of clearances and the use of hard bearing alloys, such as copper-lead, cadmium, silver, etc., has set up such severe operating conditions as to necessitate an improvement in the highly solvent refined mineral oils marketed for use as lubricants. These vigorous operating conditions, which are most prevalent in diesel and gasoline engines used in heavy duty bus and tractor service, where the piston ring temperatures range from approximately 425° to 650° F. and pressures from the oxidizing combustion gases are as high as 750 to 1150 pounds per square inch, have seriously accentuated such problems as corrosion, oxidation and resin formation in the solvent refined mineral lubricating oils with the resultant deleterious effect on the efficiency of the engines. The nature and extent of these problems depend upon the conditions of operation of the particular engine type, the type and extent of refining of the base oil used, and numerous other factors.

valves, rings, pistons, cylinders and other engine parts can be largely overcome by the addition of certain types of additive ingredients which possess detergent qualities when dissolved or dispersed in lubricating oils. By detergent property is meant not only that property which aids in dispersing, removing or purging foreign materials which accumulate on the surface of the engine parts but also that property which prevents the accumulation or deposition of such materials as distinguished from solvent action upon those accumulations or deposits.

In addition thereto, the added tendency of these oils to corrode the metal surfaces with which the lubricating oil comes in contact may be overcome or reduced by the addition of additive components which possess anti-oxidant or anti-corrosive properties when dissolved or dispersed in mineral lubricating oils. These anti-oxidant or anti-corrosive properties are meant to include all such properties which effect a reduction or elimination of weight loss of the lubricated surfaces, particularly bearing surfaces, which results from the corrosive action of the mineral lubricating oil. Incorporation of these compositions in lubricating oils provide a mineral oil composition which possesses the above-mentioned detergent and anti-oxidant or anti-corrosive properties together with improved stability in service and storage and improved load-carrying capacity.

However, when a small proportion of a compound within the scope of the present invention is blended with a mineral lubricating oil, a mineral oil composition is formed possessing excellent detergent, anti-oxidant and/or anti-corrosive, stabilizing, and load-carrying (i.e. extreme pressure) properties.

These compositions can be added undiluted or after being diluted in a suitable solvent. For ease of handling a concentrate of the compounds of this invention in a hydrocarbon oil can be prepared, for example, in concentrations of 5%–50% or higher.

The proportions of active additive actually present in the mineral lubricating oil composition may vary between 0.1% and 5.0% by weight based on the composition, depending upon the particular base oil used and the type of engine and service involved. However, the range of proportions between 0.25% and 2.0% by weight has been found to be particularly effective in imparting excellent detergent, anti-corrosive, and load-carrying properties to the mineral lubricating oil.

The compositions of the present invention can be employed alone or together with an auxiliary additive to further enhance the anti-oxidant or anti-corrosive properties of the mineral oil with which the additives are used in certain diesel and gasoline engines designed for heavy duty service.

The multifunctional additives of the present invention may further be used in combination with other additive ingredients such as anti-corrosive sulfurized agents, pour point depressors, oiliness agents, extreme pressure agents, blooming agents, viscosity index improving agents, color stabilizers, etc.

The following examples are presented for purposes of illustration.

The compounds shown in the following table are added to a distilled, solvent-refined, dewaxed, paraffin base Mid-Continent lubricating oil, SAE 30 grade, in ratios of 0.5% to 1.0% and tested in a single cylinder standard Lauson engine for 24 hours at 1800 r.p.m. at a crankcase temperature of 275°–300° C., conditions which simulate extremely severe operating conditions. At the end of the 24 hour period the engine is dismantled and the condition of the piston noted. The oils containing the compositions shown in the following table are invariably superior to the controls which contain no additive in both the Lauson detergency and the Lauson varnish tests.

These same test oils are tested for anti-corrosive properties according to the following technique:

A copper-lead bearing specimen, encased in a special non-wear bushing and rotatably mounted on a stainless steel shaft, is immersed in a glass pot of the oil to be tested. The test oil is heated to a controlled temperature of either 250° F. or 350° F. and continuously circulated between the bearing specimen and the shaft for ten hours.

The oils containing the compositions shown in the following table show less wear than the control oil.

LUBRICATING OIL ADDITIVE

| Ex. No. | I | | Weight of oxides added to I (grams) |
|---|---|---|---|
| | Reactants (grams) | H₂O eliminated (grams) | |
| 5-1 | 1a (439) plus oleic acid (846) | 54 | None. |
| 5-2 | do | 72 | Do. |
| 5-3 | 2a (568) plus lauric acid (800) | 72 | Do. |
| 5-4 | 3a (679) plus stearic acid (1,420) | 90 | Do. |
| 5-5 | 1b (492) plus oleic acid (564) | 36 | Do. |
| 5-6 | 3b (552) plus stearic acid (568) | 36 | Do. |
| 5-7 | 1c (645) plus oleic acid (846) | 54 | Do. |
| 5-8 | do | 72 | Do. |
| 5-9 | 4c (733) plus oleic acid (846) | 72 | Do. |
| 5-10 | 1d (660) plus oleic acid (1,128) | 72 | Do. |
| 5-11 | 3d (1,004) plus oleic acid (1,128) | 72 | Do. |
| 5-12 | 13d (688) plus oleic acid (1,128) | 72 | Do. |
| 5-13 | 7a (1,462) plus oleic acid (1,128) | 72 | Do. |
| 5-14 | 10a (1,075) | | |
| 5-15 | 1a (439) plus oleic acid (846) | 54 | PrO (348). |
| 5-16 | do | 54 | BuO (216). |
| 5-17 | do | 54 | Styrene oxide (260). |
| 5-18 | do | 54 | Octylene oxide (384). |
| 5-19 | 1b (492) plus oleic acid (846) | 36 | Octylene oxide (256). |
| 5-20 | do | 36 | Styrene oxide (260). |
| 5-21 | 3b (552) plus stearic acid (568) | 36 | BuO (144). |
| 5-22 | do | 36 | PrO (232). |
| 5-23 | 1d (660) plus oleic acid (1,128) | 72 | PrO (232). |
| 5-24 | do | 72 | BuO (216). |
| 5-25 | 3d (1,004) plus oleic acid (1,128) | 72 | Styrene oxide (260). |
| 5-26 | do | 72 | BuO (288). |
| 5-27 | do | 72 | Octylene oxide (382). |

| Ex. No. | I | | II—Weight of alkylene oxides added to I in alphabetical order (grams) |
|---|---|---|---|
| | Reactants (grams) | H₂O eliminated (grams) | |
| 5-28 | 28a (1,960) | | (A) PrO (54,520), (B) EtO (1,750). |
| 5-29 | 28a (1,960) plus lauric acid (600) | 120 | 0. |
| 5-30 | do | 120 | PrO (12,000). |
| 5-31 | 29aO (3,054) plus stearic acid (284) | 18 | 0. |
| 5-32 | 28aAOA | | 0. |
| 5-33 | 28b (1,400) | | (A) PrO (8,240), (B) EtO (1,200). |
| 5-34 | 28b (1,400) plus oleic acid (564) | 40 | 0. |
| 5-35 | do | 40 | BuO (1,230). |
| 5-36 | 28bAOA | | 0. |
| 5-37 | 29b (1,635) | | (A) PrO (7,470), (B) EtO (730). |
| 5-38 | 29b (1,635) plus oleic acid (282) | 18 | (A) BuO (870), (B) PrO (360). |
| 5-39 | 29bAOA | | 0. |
| 5-40 | 30b (1,580) | | (A) PrO (12,150). |
| 5-41 | 30b (1,580) plus stearic acid (569) | 40 | 0. |
| 5-42 | do | 40 | BuO (360). |
| 5-43 | 30bAOA | | 0. |

(6) INHIBITING FOAM

This phase of the invention relates to the use of the compositions of our invention in a process for reducing or destroying foam or inhibiting its formation in environments of either an aqueous or a non-aqueous nature.

Foams occur as undesirable, incidental features in many industrial processes. The theory of their formation is not highly developed; so that hypotheses on which foam reduction or destruction processes might be based are difficult to formulate. As a consequence, the effectiveness of foam-destroying agents are difficult to predict.

Our novel process of reducing or destroying foams and of preventing their formation appears to be relatively general in applicability, in that it may be used with compositions comprising aqueous materials or solutions, compositions comprising nonaqueous materials, such as hydrocarbon liquids, and compositions comprising mixtures of aqueous and nonaqueous media. Our process consists in subjecting a foaming or potentially-foaming composition to the action of a small proportion of the reagents of this invention as anti-foamers, thereby causing the foaming properties of the liquid to be diminished, suppressed or destroyed. In applying our process to the reduction or destruction of a foam, the reagent is poured or sprayed or dripped into the body of foam on top the liquid, as desired; and the foam breaks and is destroyed or reduced, substantially at once, as a consequence of such addition of said reagent. Adding the reagent to the liquid underlying such already-formed foam is also practicable. In applying our process to the prevention of foaming, the reagent is admixed, in some small proportion, with a potentially-foaming liquid, by any desired or suitable procedure. The ability of the system to foam is destroyed or at least materially reduced by such addition of said reagent.

It is usually convenient to dilute our reagents during manufacture or before use with some suitable solvent. Solvents generally suitable for incorporation into our reagent include: water; petroleum hydrocarbons, like gasoline, kerosene, stove oil, aromatic solvent; coal tar products, such as benzene, toluene, xylene, tar acid oil, cresol, anthracene oil; alcohols, particularly aliphatic alcohols like methyl, ethyl, isopropyl, butyl, hexyl, octyl, etc. Miscellaneous solvents, such as pipe oil, carbon tetrachloride, etc., may be employed. Sometimes other factors such as whether it imparts an objectionable odor to the defoamed composition or to the products into which it finds its way will determine the choice of solvent. In general, the amount of finished anti-foamer reagent employed is so small that considerable tolerance of undesirable properties in a solvent exists.

The mixture of active ingredient and solvent is stirred until homogeneous. We prefer to employ a petroleum distillate in the proportion of 25 to 30% of the finished product, by volume, although water is an excellent solvent in some instances.

We desire to point out that the superiority to the reagent contemplated by our process is based upon its ability to reduce or destroy foam, or to prevent foam formation, in certain forming or potentially foaming compositions more advantageously and at lower cost than is possible with other reagents or processes. Our reagents are useful in controlling foams in many different types of systems, aqueous and non-aqueous. They will control foams encountered in the manufacture of alkaline hypochlorite bleaches. They are effective in controlling foam in petroleum refining operations. They are effective in inhibiting foam in a gas-treating system, in which a mixture of glycols and alkanolamines is used to dehydrate and purify natural gas.

We can apply our reagents to the control of foam in protein adhesives solutions, such as casein and soybean adhesives, as used in the plywood industry, in papermaking, latex adhesives, printing inks, aqueous emulsion paints, which all produce foams which are amenable to our reagents.

In the foregoing description we have made it clear that our reagents may be used to reduce, destroy, or prevent foam. In the appended claims we have used the word "inhibit" to include all these corrective and preventive aspects of our process and reagents.

The procedures employed in practicing our process are numerous. The following description will illustrate several techniques commonly employed. It should be understood that the claims are not limited to the procedures described, and that our process consists broadly in bringing into contact by any suitable means our reagent and the foam or the potentially foaming composition.

In controlling foam in a glycol-amine gas treating plant handling natural gas, the glycol-amine mixture has a volume of about 2,000 gallons and make-up is about 2,000 gallons a month. The reagents are injected into the liquid mixture in the return line from the stripping operation, by means of an electrically-powered proportioning pump of conventional design. The feed rate is less than 1 quart daily. Foam difficulties in the system are satisfactorily controlled by this procedure.

In sewage plants, for example, in activated sludge-process plants, foam is frequently a serious problem in aeration basins and elsewhere. In one such plant, our reagents will control foam when sprayed into the head of foam, or when sprayed into or simply poured into the liquid in such basins. The foam-inhibiting effect appears to persist quite satisfactorily.

Determination of the optimum or minimum amount of our foam-inhibiting reagents to be used in any application is accomplished in different ways. Small portions of the potentially foaming liquid are added to test bottles, different small proportions of our reagent added, and the chemicalized samples shaken for a short time. Simple observation of the relative speed and completeness of foam destruction should permit selection of the best reagent proportion to be applied on the large scale. The easiest way to determine the amount of reagent required is to introduce it into the foaming or potentially foaming liquid in a fairly large proportion, e.g., 1%, and then to reduce the reagent feed rate until foam destruction is just being accomplished satisfactorily. Usually foam destruction is directly proportional to the amount of reagent used, at least up to about 1% of reagent. In a few instances, it may be found that using more or less reagent than an optimum proportion will give inferior results.

If the proportions of reagents to be employed in the above test are very small, it may be desirable to determine the optimum proportions of foaming composition and anti-foamer by introducing the latter into the sample of foaming liquid in the form of a solution in a suitable solvent.

Our process is equally applicable to systems in which a foam is already in existence and to systems which are potentially foaming composition, in that they have the property of producing foams when agitated or mixed with air or some other suitable gas. Destruction, reduction and prevention are substantially equivalent actions. It is impossible to determine whether the reagent does in fact prevent the formation of the initial laminae of foam or whether such initial laminae are destroyed by the reagent before subsequent laminae of sufficient stability to produce a foam can be superimposed thereon. By "foaming composition" in the appended claims we means a composition which is either actually foaming or which is capable of producing a foam under suitable conditions, e.g., by simply passing air through it.

It most instances, our reagents are effective to the extent that they destroy an existing foam substantially completely. In some instances, as when too little reagent is used and foam reduction may be slow or even incomplete, we intend that the description and our invention relate both to complete destruction and to partial destruction of foams.

The proportions of our reagent required to be employed appear to vary widely. However, we generally use our reagent in amounts 1% by volume or less of the foaming composition. Usually, the amounts required will be between 0.1% and 0.0001%, by volume based on the volume of the foaming composition.

Our present reagents may be used in conjunction with any other effective and compatible anti-foamer. It should also be stated that they are useful in conjunction with foam-inhibiting processes which are mechanical or electrical in character, rather than chemical. For example, some foams may be effectively destroyed by water sprays or jets. Incorporation of a small proportion of our reagents into such water sprays increase their effectiveness. U.S. Patent No. 2,240,495, to Dillon et al., dated May 6, 1941, relates to a process for resolving foam by means of a high electrical potential. Incorporation of a small proportion of our present reagents into the foaming liquid increases the effectiveness of such electrical processes.

The following examples are presented to illustrate our invention.

A foam is effected in a graduated cylinder containing mineral oil by bubbling nitrogen into the system. At equilibrium the height of the foam is measured and when the nitrogen is shut off, the time for the foam to drop is also measured. This procedure is repeated employing the compounds shown in the following table in ratios of 0.001% by volume in the oil. The presence of these compounds effectively reduces the height of the foam that is formed and aids in its elimination.

ANTI-FOAMING AGENT

| Ex. No. | Reactants (grams), order of addition of oxides as indicated by alphabet |
|---|---|
| 6-1 | 1a (439) plus PrO (870). |
| 6-2 | 2a (568) plus PrO (1,450). |
| 6-3 | 2a (568) plus (A) PrO (1,900) plus (B) EtO (220). |
| 6-4 | 2a (568) plus BuO (720). |
| 6-5 | 2a (568) plus (A) styrene oxide (780) plus (B) EtO (220). |
| 6-6 | 6a (1,330) plus (A) PrO (580) plus (B) EtO (220). |
| 6-7 | 1b (492) plus PrO (1,160). |
| 6-8 | 1b (492) plus (A) PrO (2,030) plus (B) EtO (440). |
| 6-9 | 1b (492) plus (A) BuO (1,080) plus (B) EtO (440). |
| 6-10 | 2b (662) plus (A) PrO (1,160) plus (B) EtO (660). |
| 6-11 | 1c (645) plus PrO (1,160). |
| 6-12 | 2c (774) plus PrO (1,160). |
| 6-13 | 1d (660) plus PrO (2,320). |
| 6-14 | 2d (832) plus BuO (2,160). |
| 6-15 | 12d (800) plus octylene oxide (1,280). |
| 6-16 | 28a (1,960) plus PrO (580). |
| 6-17 | 28aA (2,440) plus (A) BuO (720) plus (B) PrO (174). |
| 6-18 | 28aA (3,320) plus (A) PrO (348) plus (B) EtO (440). |
| 6-19 | 28aOA. |
| 6-20 | 28aAOA. |
| 6-21 | 28b (1,400) plus PrO (348). |
| 6-22 | 28bA. |
| 6-23 | 28bA (1,924) plus EtO (440). |
| 6-24 | 28bOA. |
| 6-25 | 28bAOA. |
| 6-26 | 29b (1,635) plus PrO (348). |
| 6-27 | 29b (1,635) plus BuO (2,160). |
| 6-28 | 30b (1,580) plus (A) PrO (1,450) plus (B) EtO (220). |
| 6-29 | 30bOA. |
| 6-30 | 30bAOA. |

(7) USE IN THE INHIBITION OF ICE FORMATION IN FUELS

This phase of the invention relates to the use of the compounds of our invention in reducing the tendency of water present as an impurity in liquid fuels to precipitate as a solid at reduced temperatures. More particularly they can be used to prevent the clogging of fuel filters of internal combustion engines, especially aviation internal combustion engines, using such water-contaminated fuels, when such clogging of fuel filters is due to the precipitation at low temperatures of small crystals of the adulterant water.

Liquid fuels very often contain small but significant amounts of water, the fuel often being saturated with water. The presence of such water may be accidental, or it may be the result of the widespread practice of storing fuels, particularly those having a relatively high volatility, over water. In either case, if such fuels are exposed to low, or reduced, temperatures, such as normally occur, for example, at high altitudes or in arctic or near arctic latitudes, the water in the fuel is precipitated in the form of crystals of ice which are usually too small to settle quickly, but which are large enough to clog the filters through which a fuel passes on its way to the combustion chamber or cylinder of an internal combustion engine. This precipitation constitutes a serious problem, particularly in aviation turbine or jet fuels, owing partly to the fineness of the filtration to which these fuels are subjected and partly to the great altitudes at which jet-propelled aircraft cruise. The problem is not, however, confined to just those fuels, but may also be present in the use of other fuels, such as those for aviation and automotive piston engines, particularly in cold latitudes or, for example, under extreme conditions of artificial cooling to avoid vapor lock.

The compounds of this invention eliminate the above-mentioned adverse effects of water in fuels, and provide a method for greatly reducing the tendency of water present as an impurity in internal combustion engine fuels to precipitate as a solid. They provide a method for storing such fuels under conditions which greatly reduce the precipitating tendency and prevent clogging of fuel filters of internal combustion engines due to precipitation of adulterant water in the fuel at low temperature.

The tendency of ice crystals to precipitate at low temperatures from fuels containing water may be greatly reduced and even practically eliminated by adding the compounds of this invention to the fuel in ratios of from .001% to 0.1% by weight or higher, based on weight of fuel, but preferably from 0.005% to 0.01%.

The following examples are presented to illustrate the present invention.

To gasoline saturated with water (which had previously caused filter clogging at −20° C.) is added .01% by weight based on the weight of saturated gasoline of the composition shown in the following table. Thereafter, no filter clogging occurs even at −40° C.

INHIBITORS FOR ICE FORMATION IN FUELS

| Ex. No. | I | | Weight of oxides added to I (grams) |
|---|---|---|---|
| | Reactants (grams) | H₂O eliminated (grams) | |
| 7-1 | 1a (439) plus oleic acid (846) | 54 | EtO (1,320). |
| 7-2 | do | 72 | EtO (1,320). |
| 7-3 | 2a (568) plus oleic acid (846) | 72 | EtO (1,560). |
| 7-4 | do | 72 | EtO (2,200). |
| 7-5 | 1b (492) plus lauric acid (400) | 36 | EtO (1,320). |
| 7-6 | do | 36 | EtO (2,200). |
| 7-7 | 3b (552) plus lauric acid (400) | 36 | EtO (2,200). |
| 7-8 | 1c (645) plus lauric acid (400) | 54 | EtO (1,980). |
| 7-9 | do | 54 | EtO (2,200). |
| 7-10 | 1d (660) plus oleic acid (1,128) | 72 | EtO (2,200). |
| 7-11 | do | 72 | EtO (2,640). |
| 7-12 | 4d (772) plus oleic acid (1,128) | 72 | EtO (1,980). |
| 7-13 | do | 72 | EtO (2,640). |
| 7-14 | 16d (800) plus oleic acid (1,128) | 72 | EtO (2,200). |
| 7-15 | do | 72 | EtO (2,860). |

| Ex. No. | I | | Weight of oxides added to I in alphabetical order (grams) |
|---|---|---|---|
| | Reactants (grams) | H₂O eliminated (grams) | |
| 7-16 | 28a (1,960) | | (A) PrO (580). |
| 7-17 | 28a (1,960) plus lauric acid (600) | 120 | (A) PrO (116), (B) EtO (1,320). |
| 7-18 | 28aO (3,054) plus stearic acid (284) | 18 | |
| 7-19 | 28aAOA | | |
| 7-20 | 28b (1,400) | | EtO (1,980). |
| 7-21 | 28b (1,400) plus oleic acid (564) | 40 | EtO (2,640). |
| 7-22 | 28bAOA | | |
| 7-23 | 29b (1,635) | | (A) PrO (522), (B) EtO (1,980). |
| 7-24 | 29b (1,635) plus oleic acid (282) | 18 | EtO (1,320). |
| 7-25 | 29bO (2,655) plus oleic acid (282) | 18 | |
| 7-26 | 29bAOA | | |
| 7-27 | 30b (1,580) | | EtO (2,200). |
| 7-28 | 30b (1,580) plus stearic acid (569) | 40 | |
| 7-29 | ....do.... | 40 | (A) PrO (464), (B) EtO (1,320). |
| 7-30 | 30bAOA | | |

(8) AGENTS FOR SCALE PREVENTION

This phase of the invention relates to the use of the compounds of this invention in a process for removing from surfaces, particularly of pipes and other processing equipment, desposits of inorganic solids arising from the passage of aqueous media therethrough, and for inhibiting and preventing the accumulation of such deposits on such surfaces. They are particularly adapted for use in equipment used in producing and handling crude oil, since the water produced from the earth along with the oil often deposits inorganic solids as a scale in the well tubing, or, more commonly, in traps, heaters, or other surface equipment, and in some instances even in pipelines. They are likewise valuable in controlling deposits or scales of such inorganic solids which may accumulate in steam-generating equipment if somewhat hard waters are used. Utility of these compounds is not limited to such characteristic applications; they may be used in other instances where scales or deposits of inorganic solids originating from naturally-occurring constituents of aqueous media constitute a nuisance in industrial or other activities.

The scales or deposits of inorganic solids that occur in hard water with which this invention is concerned are clearly to be distinguished from accumulations of solid organic matter, whose removal is the subject-matter of Patent No. 2,470,831, dated May 24, 1949.

The accumulations with which this phase of the present invention is concerned are also to be distinguished at the outset from accumulations of mud solids in the form of mud sheaths. Mud sheaths are essentially filter cakes of water-insoluble solids of natural clay solids or of barite, iron oxide, bentonite, or other inorganic solids used in preparing and conditioning drilling mud and originally present as an aqueous suspension. The inorganic solids with which the present invention is concerned may be thought of as being originally water-soluble inorganic solids which have been precipitated as "hard-water scale" by the application of heat, the loss of carbon dioxide or some other constituent, or in some cases by the chilling of the aqueous medium as it passes through the conduit or apparatus which exhibits the scaling, etc. Accumulations of such solids are recurring problems.

The process which constitutes this phase of our invention consists in applying to inorganic solid deposits of the kind described the compounds of the present invention to the end that such inorganic solids are removed from the surfaces to which they originally adhered. By such means, the capacity of pipes, towlines, pipelines, traps, tanks, pumps, and other equipment supporting such deposits is materially increased. The exact nature of the action taking place when our reagents are used is unknown to us.

It will be apparent that if our reagents are applied to a system which periodically accumulates such deposits of inorganic solids, before appreciable deposition has occurred, and if such application of reagents is practiced continuously or with sufficient frequency, the operation may be considered a preventive process, rather than a corrective one. If applied in somewhat insufficient quantity to a deposit already accumulated, it may accomplish partial reduction of such deposit, rather than complete removal. Our process is therefore both a preventive and a corrective one, and may be applied in either sense, to achieve the same ultimate goal, viz., improvement of the capacity of conduits through which fluids are passed.

Our process is equally applicable to systems in which a deposit of inorganic salts is already in existence and to systems which are potentially susceptible to such deposition. When we use the word "inhibiting," we mean to include therein the prevention, reduction, and removal of such deposits of inorganic solids.

These compositions are usually used diluted with a suitable diluent, such as water or a water-insoluble organic liquid capable of acting as an oil solvent.

In treating systems in which oil is present, we prefer to mix the compounds with a water-insoluble organic liquid capable of acting as an oil solvent, and to employ such mixture in the form of a relatively stable aqueous dispersion. By "relatively stable aqueous dispersion," we mean one that is not resolved into its components spontaneously on standing for protracted periods of time, e.g., for more than one hour. However, such preferred mixture may be employed undiluted or dispersed in oil. These compounds may be mixed with water, especially if in salt form, to produce a relatively stable aqueous dispersion, and may be used as such or diluted further with water. In general, we believe the form of the reagent in which a water-insoluble organic liquid is incorporated gives superior results, at least where the system to be treated includes oil.

Some of the compounds of our invention are freely dispersible in water in the free state. In other instances, the free forms of the reagents are substantially water-insoluble, but the salt forms (e.g., the acetates) are very water-dispersible. We prefer to employ the water-dispersible form by neutralizing the compound to produce a salt which will be water-dispersible. We have found, for example, that the acetate, hydroxyacetate, lactate, gluconate, propionate, caprate, phthalate, fumarate, maleate, benzoate, succinate, oxalate, tartarate, chloride, nitrate, or sulfate, prepared by addition of the suitable acid to the compound, usually constitutes a reagent which is somewhat more soluble or dispersible in water than many of the original compounds. It is to be understood that references to be reagents, in these specifications and claims, include the reagent in the form of salts, as well as in the free form and the hydrated form.

Depending upon the choice of compound and its molecular weight, the solubility may be expected to range from ready water-solubility in the free state substantially to water-insolubility. As stated above, the salts, and specifically the acetates, generally show improved water-solubility over the simple compound and we have obtained the best results by using salt forms which possess appreciable water-solubility.

For a number of reasons it is usually desirable to mix the compounds with a suitable diluent before use in our process. Water is sometimes the most desirable diluent, being cheap and available. In some instances, as above noted, especially where the scale-susceptible system includes oil we prefer to use a water-insoluble organic liquid, which is capable of acting as an oil solvent, for the diluent. Many materials lend themselves to this use. One of the most common is the aromatic fraction of petroleum distillates. Edeleanu extract, which comprises aromatic and unsaturated compounds, is frequently found useful. In some cases stove oil or a similar petroleum distillate is usable. Oil solvents like carbon tetrachloride or carbon disulfide are usable, although their comparatively high cost militates against their use. Amylene dichloride is sometimes a desirable material for the present purpose, as are tetrachloroethane, tetraline, trichloroethylene, benzol and its homologs, cyclohexane, etc. This component of our reagents should naturally be compatible with the other ingredient thereof; otherwise its selection is not limited. Cost and availability will influence the selection. We prefer to use an aromatic petroleum solvent as a widely available reagent of good properties and low cost for the present use.

To prepare our reagents, when diluents are included, the components are simply mixed together in suitable proportion. The optimum proportion of each will vary, depending on its properties; but in general the resulting mixture should be homogeneous.

We also require that the finished reagent produce a relatively stable aqueous dispersion. In cases where the ingredients form thoroughly homogeneous mixtures which are not water-dispersible, the transformation of the reagent into its salt form will sometimes accomplish this purpose. In such cases, we have preferably used acetic acid to effect this neutralization.

The reagent may be employed in undiluted form, except for the dilution employed in manufacture, to deliver it in readily usable form. In such cases, the reagent as compounded is simply introduced into the pipe or apparatus from whose surface a deposit or scale of inorganic solids is to be removed or deposition thereon inhibited. In such cases, there is undoubtedly produced an aqueous dispersion of the reagent if water is present in or passing through such apparatus. Such addition of undiluted reagent into a stream containing aqueous components may be considered equivalent to introducing a previously prepared aqueous dispersion of my reagent.

In most cases, an aqueous dispersion is obtained almost spontaneously on mixing with water our reagents and preferred non-aqueous diluent. We prefer to employ such embodiments of our reagents in aqueous dispersion, because, when so employed, the components of the reagent are prevented from separating from each other by the influence of oily materials present in the pipe or apparatus to be treated.

When a water-insoluble organic liquid is employed as diluent in preparing our reagents, we prefer to employ a considerable excess of reagent over what would be exactly required to effect dispersion of the water-insoluble organic liquid in water. Such excess further prevents any separation of the phases, enhancing the stability of the dispersion so that it will remain stable for at least several hours. The excess of reagents also acts to lower the surface tension of the whole reagent, because of which the reagent exhibits a marked penetrating effect. In this way, it is carried into the crevices and irregularities of the deposit, weakening the bond between the deposit of inorganic solids and the supporting wall.

As a preferred example of reagent, we employ a 20% by weight dispersion in aromatic petroleum solvent, including 2% by weight of concentrated acetic acid in the finished reagent in some instances. We prefer to employ this reagent in the form of a dilute aqueous dispersion, of about 5% by weight concentration. Sometimes aqueous dispersions containing as little as 1% of the reagent are fully effective. Sometimes it is desirable to introduce the reagent in the form of a more concentrated aqueous dispersion, as when additional water is expected to be encountered in the system being treated. This preferred reagent may of course be introduced in undiluted form, if desired, it has been successfully so used.

From the foregoing, it will be understood that our process, broadly stated, consists in subjecting a deposit of inorganic solids of the kind described above to the action of a reagent of the kind described. Merely introducing our reagent continuously into a scaled-up system usually results in the more or less complete removal of the scale within a reasonable time. Agitating the reagent in the system sometimes facilitates removal of the scale deposits, as does allowing the reagent to stand in the system and "soak" it for any desired time.

The theory of the mode of operation of our process is uncertain; but the effects of applying the process are striking. Capacity of pipes and apparatus is usually promptly and markedly increased. Line pressures which have increased with deposition of the inorganic solids fall to normal within a short time; and sometimes sizeable chunks of the dislodged deposit are observed in the stream from the wells or lines, on screens inserted into such streams for purposes of observation, or even, at times, by their erosive effects on valves or other equipment downstream the deposit.

Our reagents may be applied in many ways, depending on the location and character of the deposit of inorganic solids it is proposed to remove or whose deposition is to be inhibited. In the case of pipe, it is usually preferred to introduce, by means of a small proportioning pump, a continuous small stream of reagent, either undiluted or diluted as desired, upstream the deposit, until the latter is dislodged and removed. In some apparatus, it is most practicable to fill the whole with an aqueous solution or dispersion of the reagent, and allow a considerable soaking period to elapse before again pumping. As stated above, we prefer to introduce our reagents in aqueous dispersion, and continuously in small proportions, to inhibit or to remove inorganic solid deposits of the kind here under consideration. The essential step of our process is that our reagent is brought into contact with the deposit; and the latter is thereby caused to become dislodged from its supporting surface.

The following specific examples will illustrate typical applications of our process.

*Example 8–1*

The surface flow system from an oil well regularly accumulates a hard scale which includes an appreciable proportion of carbonates precipitated from the oil well water as a compact, adherent deposit, reaching thicknesses of ¼" or greater, in the header manifolds, trap valves, rundown lines, etc. Trap valves at the high- and low-pressure traps are favorable observation points, in that they scale-up soonest after cleaning. General practice at the location is to produce the well as long as possible, shut down, and then remove the scale manually from all accessible locations in the system. The operation is required to be repeated at intervals of about three weeks.

A reagent comprising a 20 weight percent solution of compound 8–1 of the following table in an aromatic solvent is introduced continuously into the system upstream the high-pressure trap at the rate of 1 gallon to 1,500 barrels of water produced by the well. Inspection of accessible points, which normally scale-up within three weeks, is made regularly from the beginning of such application of reagent. After about a month, inspection shows a slight deposit of solids on the trap valves, very soft and readily removable. Three months later, the injection of reagent is still continuing, the well having never been shut down for scale removal, and there is no evidence of appreciable scale accumulation in the system.

*Example 8–2*

This example is cited to illustrate the removal approach, rather than the inhibition or prevention approach of the previous example.

An oil well production system has accumulated scale to the point where it could handle only about 9,000 barrels of fluid daily, against a rated capacity of 12,000 barrels daily. Any attempt to increase the flow through the traps caused them to "pop" their contents of crude oil. The compound of 8–2 (20 weight percent solution in aromatic solvent) is injected at the well head, just downstream of the flow beam, after preliminary inspection of the degree of scale deposition has been made. Such inspection shows that flow valves upstream the master trap, the manifold, and also the trap discharge valve are heavily scaled. The rate of reagent feed is 1 gallon to 1,500 barrels of well water. Within a week after introduction of our reagent has begun, sustained unrestricted flow at 12,000 barrels daily is again effected.

Re-inspection of accessible points shows some of them to be entirely free from scale deposits, points previously scaled hard. In other cases, the scale has not been entirely removed in the short time of application of our reagent; but the remaining accumulations are very soft in character.

This second example illustrates the fact that our process may be successfully applied as a scale-removing process; and the fact that incomplete removal is found at several points in the system after a short period of treatment illustrates the scale-reduction feature of our process.

*Example 8–3*

In a third application of our process, we employ compound 8–3 in the form of the acetate, prepared as a 20 weight percent aromatic solvent solution diluted with water to a 15% solution. This material is introduced into a pipe carrying oil and water at the rate as in the preceding two examples. Such introduction effectively inhibits the accumulation of scale in such pipe.

Example of compounds capable of being similarly employed are shown in the following table.

SCALE REMOVER

| Ex. No. | I | | Weight of oxides added to I (grams) |
|---|---|---|---|
| | Reactants (grams) | $H_2O$ eliminated (grams) | |
| 8–1 | 1a (439) plus oleic acid (282) | 18 | None. |
| 8–2 | 1a (430) plus lauric acid (200) | 18 | Do. |
| 8–3 | 2a (568) plus lauric acid (200) | 18 | Do. |
| 8–4 | 10a (1075) plus lauric acid (200) | 18 | Do. |
| 8–5 | 1b (492) plus oleic acid (282) | 18 | Do. |
| 8–6 | 3b (552) plus oleic acid (282) | 18 | Do. |
| 8–7 | 4c (733) plus lauric acid (200) | 18 | Do. |
| 8–8 | 1d (660) plus sunaptic acid (330) | 18 | Do. |
| 8–9 | 16d (800) plus lauric acid (200) | 18 | Do. |
| 8–10 | 1a (439) plus oleic ald (282) | 18 | EtO (880). |
| 8–11 | ____do____ | 18 | EtO (1,320). |
| 8–12 | 1b (492) plus oleic acid (282) | 18 | EtO (1,100). |
| 8–13 | 4c (733) plus lauric acid (200) | 18 | EtO (1,320). |
| 8–14 | 1d (660) plus sunaptic acid (330) | 18 | EtO (1,760). |
| 8–15 | 16d (800) plus lauric acid (200) | 18 | EtO (1,320). |

| Ex. No. | I | | Weight of oxides added to I in alphabetical order (grams) |
|---|---|---|---|
| | Reactants (gams) | $H_2O$ eliminated (grams) | |
| 8–16 | 28a (1,960) | | (A) PrO (580). |
| 8–17 | 28a (1,960) plus lauric acid (600) | 120 | (A) PrO (116), (B) EtO (1,320). |
| 8–18 | 28aO (3,054) plus stearic acid (284) | 18 | |
| 8–19 | 28aAOA | | |
| 8–20 | 28b (1,400) | | EtO (1,980). |
| 8–21 | 28b (1,400) plus oleic acid (564) | 40 | EtO (2,640). |
| 8–22 | 28bAOA | | |
| 8–23 | 29b (1,635) | | (A) PrO (522), (B) EtO (1,980). |
| 8–24 | 29b (1,635) plus oleic acid (282) | 18 | EtO (1,320). |
| 8–25 | 29bO (2,655) plus oleic acid (282) | 18 | |
| 8–26 | 29bAOA | | |
| 8–27 | 30b (1,580) | | EtO (2,200). |
| 8–28 | 30b (1,580) plus stearic acid (569) | 40 | |
| 8–29 | ____do____ | 40 | (A) PrO (464), (B) EtO (1,320). |
| 8–30 | 30bAOA | | |

(9) CHELATING AGENTS

This phase of the invention relates to the use of the compounds of our invention as chelating agents and to the chelates thus formed.

Chelation is a term applied to designate cyclic structures arising from the combination of metallic atoms with organic or inorganic molecules or ions. Chelates are very important industrially because one of the unusual features of the chelate ring compounds is their unusual stability in which respect they resemble the aromatic rings of organic chemistry. Because of the great affinity of chelating compounds for metals and because of the great stability of the chelates they form, they are very important industrially The compositions of this invention are excellent chelating agents. They are particularly suitable for forming oil soluble chelates of great stability with a wide variety of metals.

Chelating metals comprise magnesium, aluminum, arsenic, antimony, chromium, iron, cobalt, nickel, palladium, and platinum. Particularly preferred of such metals as chelate constituents are iron, nickel, copper and cobalt.

The chelates formed from the compositions of our invention are useful as bactericidal or fungicidal agents, particularly in the case of the copper chelates. In addition the chelates can be employed to stabilize hydrocarbon oils against the deleterious effects of oxidation.

In general, these chelates are prepared by adding a sufficient amount of a metal salt to combine with a compound of this invention. They are prepared by the general method described in detail by Hunter and Marriott in the Journal of the Chemical Society (London) 1937, 2000, which relates to the formation of chelates from metal ions and salicylidene imines.

The following examples are illustrative of the preparation of the chelates.

*Example 9–1₁*

To a solution of 1 mole of the chelating agent of Example 9–1 in alcohol is added 1 mole of cupric acetate monohydrate. After most of the alcohol is evaporated, a green solid precipitates which analysis indicates to be the copper chelate.

*Example 9–1₂*

The above procedure is used except the cobaltous acetate tetrahydrate is employed to yield a red solid which analysis indicates to be the cobaltous chelate.

*Example 9–1₃*

The above procedure is used except that nickelous acetate, $Ni(OAC)_2 \cdot 4H_2O$ is employed. A dark green product is formed.

To save repetitive detail, chelates are formed from the above nickel, cobalt and copper salts, and the compounds shown in the following table.

CHELATING AGENTS

| Ex. No. | Reactants (grams) | H₂O eliminated (grams) |
|---|---|---|
| 9–1, 1₂, 1₃ | 1a (439) plus oleic acid (846) | 54 |
| 9–2, 2₂, 2₃ | 1a (439) plus lauric acid (600) | 54 |
| 9–3, 3₂, 3₃ | 2a (568) plus palmitic acid (769) | 54 |
| 9–4, 4₂, 4₃ | 2a (568) plus lauric acid (600) | 54 |
| 9–5, 5₂, 5₃ | 3a (697) plus myristic acid (685) | 54 |
| 9–6, 6₂, 6₃ | 3a (697) plus oleic acid (846) | 54 |
| 9–7, 7₂, 7₃ | 1b (492) plus lauric acid (400) | 36 |
| 9–8, 8₂, 8₃ | 1b (492) plus oleic acid (564) | 36 |
| 9–9, 9₂, 9₃ | 2b (662) plus oleic acid (564) | 36 |
| 9–10, 10₂, 10₃ | 3b (552) plus oleic acid (564) | 36 |
| 9–11, 11₂, 11₃ | 1c (645) plus oleic acid (846) | 54 |
| 9–12₁, 12₂, 12₃ | 2c (774) plus oleic acid (846) | 54 |
| 9–13₁, 13₂, 13₃ | 1d (660) plus lauric acid (800) | 72 |
| 9–14₁, 14₂, 14₃ | 4d (772) plus lauric acid (800) | 72 |
| 9–15₁, 15₂, 15₃ | 16d (800) plus lauric acid (800) | 72 |
| 9–16₁, 16₂, 16₃ | 28a (1,960) plus lauric acid (600) | 120 |
| 9–17₁, 17₂, 17₃ | 28aO (3,054) plus stearic acid (284) | 18 |
| 9–18₁, 18₂, 18₃ | 28b (1,400) plus oleic acid (564) | 40 |
| 9–19₁, 19₂, 19₃ | 29b (1,635) plus oleic acid (282) | 18 |
| 9–20₁, 20₂, 20₃ | 29bO (2,655) plus oleic acid (282) | 18 |
| 9–21₁, 21₂, 21₃ | 30b (1,580) plus stearic acid (569) | 40 |

(10) FLOTATION AGENTS

This phase of the invention relates to the use of the compounds of our invention in separating minerals by froth flotation, and particularly to separating metallic minerals. They provide a novel process for separating minerals or ores into their more valuable and their less valuable components, by means of a froth flotation operation to beneficiate ores, particularly of metallic minerals, by applying a specifically novel reagent in a froth flotation operation.

Froth flotation has become established as a highly useful method of recovering from ores and minerals the relatively small percentages of valuable components they contain. The general technique is to grind the ore or mineral to such a degree that the individual grains of the valuable components are broken free of the less valuable components or gangue; make a liquid mass of such finely ground ores, which mass or "pulp" usually contains a major proportion of water and only a minor proportion of finely-ground ore; subject such pulp to the action of a highly specific chemical reagent in a flotation machine or flotation cell, in the presence of a large amount of air; and recover the valuable constituents of the ore from the mineralized froth which overflows from the flotation cell. Many variations of this basic procedure have been developed, including the use of different types of flotation cells, different procedures of combining individual operations into different flow sheets to float successively and separately a number of valuable components, etc. The chemical side of the operation has likewise been varied greatly to make such complex operations practicable. In addition to reagents adapted to collect the ore values in the froth ("collectors"), other reagents for improving the frothing characteristics of the flotation operation ("frothers") or for selectively improving or retarding the flotation of individual members among the valuable components of the ore ("activators" or "depressors") have been developed. The characteristics of the chemical reagents that have been used in the flotation operation differ greatly, until it may be said that a reagent's flotation possibilities may best be determined by actual test in the process.

Our process relates to the use of the compositions of this invention as promotors or collectors, particularly in selecting acidic minerals from other ore constituents. For various reasons, including viscosity, we prefer to employ our reagents in the form of solution in a suitable solvent. In some instances, where the compounds are water soluble, water is selected as a solvent. Where the reagent is water insoluble, various organic solvents are employed.

We prefer to use our compounds and a solvent in proportions of 1:4 and 4:1. In some instances, the best results have been obtained by the use of reagents comprising substantially equal proportions of such two ingredients. On the other hand, mixtures in the proportions of 1:9 or 9:1 have sometimes been most useful.

The solvent employed may be selected as desired. In some instances, crude petroleum oil itself is satisfactory; in other cases, gas oil, kerosene, gasoline, or other distillate is to be preferred. We prefer specifically to employ the petroleum distillate sold commercially as stove oil, as it appears to have, in addition to desirable properties as used in our reagent for floating minerals, certain desirable physical properties, i.e., it is relatively stable and non-volatile, it is relatively limpid, and it is relatively non-flammable.

The flotation reagent contemplated for use in our process is prepared by simply mixing the compound of our invention and the solvent in the desired proportions. The reagent so compounded is used in the ordinary operating procedure of the flotation process.

In some instances, the components of the mixture are compatible and combine into a perfectly homogeneous liquid reagent. In other instances, they are more or less incompatible, and tend to separate or stratify into layers on quiescent standing. In instances where the ingredients are capable of making a homogeneous mixture, the reagent may be handled and used without difficulty. If a non-homogeneous mixture results when the desired proportions are employed, a number of expedients may be resorted to to obviate the difficulty. For example, since it is common to include the use of a frothing agent in many flotation operations, the collector which comprises our reagent may be homogenized by being combined with a mutual solubilizer in the form of the desired frother, e.g., cresylic acid, pine oil, terpineol, one of the alcohols manufactured and used for froth promotion, like the du Pout alcohol frothers, etc. If such mutual solubilizer is incorporated in or with the compounds and petroleum body, as above described, the resulting reagent is also contemplated by us for use in our process.

Another means of overcoming the non-homogeneity of some of the examples of the reagents contemplated by us is to homogenize the mixture mechanically, as by a beater or agitator, immediately before injecting it into the mineral pulp which is to be treated for the recovery of mineral values.

The reagents of the present invention are effective promotors or collecting agents for acidic ore materials generally and said acidic materials may be either worthless gangue or valuable ore constituents. The most important use, however, is in connection with the froth flotation of silica from non-metallic ores in which the siliceous gangue may represent a much smaller proportion of the ore rather than metallic and sulfide ores in which the gangue usually represents the major proportion of the ore. Representative acidic ore materials are the feldspars, quartz, pyroxenes, the spinels, biotite, muscovite, clays, and the like.

Although the present invention is not limited to the treatment of any particular ore materials, it has been found to be well suited for froth flotation of silica from phosphate rock, and this is a preferred embodiment of the invention. In the processes of removing silica from phosphate rock the conditions are such that practically complete removal of the silica must be accomplished in order to produce a salable phosphate material. It is therefore an advantage of this invention that our reagents not only effect satisfactory removal of the silica but are economical in amounts used. For example, the quantities of active compounds required range from 0.1 pound to 2.0 pounds or more, but preferably 0.2 to 1.5 pounds, per ton of ore depending upon the particular ore and the particular reagent. The invention is not, however, limited to the use of such quantities.

These reagents can also be used for the flotation of feldspar from quartz and for the flotation of mica from quartz and calcite.

The reagents of the present invention can be used alone or in mixtures with other promoters. They can likewise be used in conjunction with other cooperating materials such as conditioning reagents, activators, frothing reagents, depressing reagents, dispersing reagents, oily materials such as hydrocarbon oils, fatty acids or fatty acid esters.

The present reagents are also adaptable for use in any of the ordinary concentrating processes such as film flotation, tabling, and particularly in froth flotation operations. The ore concentrating processes employed will depend upon the particular type or kind of ore which is being processed. For example, in connection with phosphate rock, relatively coarse phosphate-bearing materials, for example 28 mesh or larger, can be economically concentrated by using these reagents in conjunction with other materials such as fuel oil or pine oil in a concentration process employing tables or film flotation. The less than 28 mesh phosphate rock material is best concentrated by means of froth flotation employing these improved silica promoters.

When the reagents of the present invention are employed as promoters in the froth flotation of silica from phosphate rock the conditions may be varied in accordance with procedures known to those skilled in the art. The reagent can be employed in the form of aqueous solutions, emulsions, mixtures, or solutions in organic solvents such as alcohol and the like. The reagents can be introduced into the ore pulp in the flotation cell without prior conditioning or they can be conditioned with the ore pulp prior to the actual concentration operation. They can also be stage fed into the flotation circuit.

Other improved phosphate flotation features which are known may be utilized in connection with the present invention.

While the above relates specifically to the flotation of silica from phosphate rock, the present invention is not limited to such operations and the reagents are useful in the treatment of various other types of ore materials wherein it is desirable to remove acidic minerals in the froth. For example, the reagents are useful in the treatment of rake sands from the tailings produced in cement plant operations. In this particular instance, the rake sands are treated by flotation to remove part of the alumina which is present in the form of mica and the removal of silica is not desirable. Our reagents are useful in such flotation operations. The reagent may also be used for the flotation of silica from iron ores containing magnetite, limonite and quartz, and in tests conducted on this type of ore, the rough tailing resulting from the flotation of silica containing both magnetite and limonite assayed much higher in iron than concentrates produced by the conventional soap flotation of the iron minerals.

Some 10 million tons of phosphate rock are produced annualy from the Florida pebble phosphate deposits. Located principally in Polk and Hillsborough Counties, these marine deposits produce three-fourths of the U.S. supply of phosphate and about three-eights of the world supply.

Such pebble phosphate, as mined by the conventional strip-mining methods, includes undesirably large proportions of non-phosphate minerals, principally siliceous and principally silica, which reduce the quality and the price of this large-tonnage, small-unit-value product. Extensive and costly ore-dressing plants have consequently been required to deliver a finished product of acceptable grade.

Among the procedures employed, and one which is almost universally used by the industry, is a two-stage or double flotation process. In the first stage (or rougher flotation circuit), washed phosphate rock having particle sizes usually between about 28- and about 150-mesh is subjected to the action of a reagent conventionally comprising tall oil, fuel oil, and caustic soda. The concentrate delivered by such rougher circuit is a phosphate rock of grade higher than the original rock but which still contains too much silica and similar impurities to be of acceptable market grade.

The rougher concentrate is therefore "de-oiled" with dilute sulfuric acid to remove the tall-oil-soap-and-fuel-oil reagent and is thereafter subjected to flotation in a secondary or cleaner flotation circuit. The froth product delivered from this secondary circuit is high in silica and similar impurities and is desirably low in phosphate values so that it can be thereafter discarded.

Our process is particularly applicable to such secondary or cleaner flotation circuit of such a conventional flotation scheme. Our process may, of course, be applied to beneficiate a phosphate rock that has not been subjected to such preliminary rougher circuit flotation process.

Because our compounds are most advantageously used in conventional flotation plants in the phosphate rock industry, and in the secondary-circuit or cleaner-circuit section of such plants, it is not necessary here to describe in detail how they are used. Where they are employed, the operation of the plant is continued in normal fashion, the only change being the substitution of our compounds for the conventional reagents otherwise used.

For sake of completeness, the following brief example of their use is presented.

*Example*

A typical Florida pebble phosphate rock is subjected to conventional pre-flotation treatment and sizing. That portion having a particle-size range of from about 28- to about 150-mesh is processed through a conventional rougher flotation circuit employing the conventional tall oil, fuel oil, and caustic soda reagents to float a phosphate rock concentrate. The concentrate delivered from such rougher circuit contains 12–14% insoluble matter, after deoiling with dilute sulfuric acid and washing with water. In the consequent secondary flotation circuit compound 10–1 of the table below is used at a rate of about 0.85 pound per ton of rougher concentrate.

Aeration is started, additional water being added to the cell as required to maintain the proper level as the froth is continuously skimmed off. The collected overflow and tailings are analyzed. The overflow froth is high in silica and low in bone phosphate of lime while the tailing in the underflow are low in silica and high in bone phosphate of lime.

By employing this process with the agents listed below one obtains a phosphate of marketable grade separation of the bone phosphate of lime with these compounds more efficiently than with the conventional agents.

FLOTATION COLLECTION AGENTS

| Ex. No. | I | | Weight of oxides added to I (grams) |
|---|---|---|---|
| | Reactants (grams) | H₂O eliminated (grams) | |
| 10-1 | 1a (439) plus lauric acid (600) | 54 | None. |
| 10-2 | ----do---- | 72 | Do. |
| 10-3 | 1a (439) plus oleic acid (846) | 54 | Do. |
| 10-4 | ----do---- | 72 | Do. |
| 10-5 | 2a (568) plus stearic acid (852) | 54 | Do. |
| 10-6 | ----do---- | 72 | Do. |
| 10-7 | 6a (1,330) | | PrO (174). |
| 10-8 | 6a (1,330) | | Octylene oxide (384). |
| 10-9 | 9a (943) | | Do. |
| 10-10 | 9a (943) | | BuO (216). |
| 10-11 | 1b (492) plus oleic acid (1,128) | 36 | None. |
| 10-12 | ----do---- | 36 | PrO (232). |
| 10-13 | 2b (662) plus stearic acid (1,136) | 36 | PrO (232). |
| 10-14 | 3b (552) plus lauric acid (800) | 36 | Octylene Oxide (384). |
| 10-15 | ----do---- | 36 | PrO (232). |
| 10-16 | 1c (645) plus lauric acid (600) | 54 | None. |
| 10-17 | 1d (660) plus lauric acid (800) | 72 | Do. |
| 10-18 | 4d (772) plus lauric acid (800) | 72 | PrO (232). |
| 10-19 | 13d (668) plus oleic acid (1,128) | 72 | Styrene oxide (260). |
| 10-20 | 16d (800) plus oleic acid (1,128) | 72 | BuO (288). |

| Ex. No. | I | | Weight of oxides added to I in alphabetical order (grams) |
|---|---|---|---|
| | Reactants (grams) | H₂O eliminated (grams) | |
| 10-21 | 28a (1,960) | | (A) PrO (580). |
| 10-22 | 28a (1,960) plus lauric acid (600) | 120 | (A) PrO (116), (B) EtO (1,320). |
| 10-23 | 28aO (3,054) plus stearic acid (284) | 18 | |
| 10-24 | 28aAOA | | EtO (1,980). |
| 10-25 | 28b (1,400) | | EtO (2,640). |
| 10-26 | 28b (1,400) plus oleic acid (564) | 40 | |
| 10-27 | 28bAOA | | (A) PrO (522), (B) EtO (1,980). |
| 10-28 | 29b (1,635) | | EtO (1,320). |
| 10-29 | 29b (1,635) plus oleic acid (282) | 18 | |
| 10-30 | 29bO (2,655) plus oleic acid (282) | 18 | |
| 10-31 | 29bAOA | | EtO (2,200). |
| 10-32 | 30b (1,580) | | |
| 10-33 | 30b (1,580) plus stearic acid (569) | 40 | (A) PrO (464), (B) EtO (1,320). |
| 10-34 | ----do---- | 40 | |
| 10-35 | 30bAOA | | |

(11) ASPHALT ADDITIVES

This phase of the invention relates to the use of the compounds of our invention in securing a satisfactory bond between bituminous compositions and the various surfaces to which they are applied in industrial operations, such as road-building. This problem is well-recognized, and many attempts have been made to overcome it. For example, see U.S. Patents Nos. 2,317,959, dated April 27, 1943, to Johnson et al.; 2,361,488, dated October 31, 1944, to Mikeska; 2,386,867, dated October 16, 1945, to Johnson; 2,508,428-9, dated May 23, 1950, to Smith et al.

In road-construction use, bituminous compositions are employed in conjunction with various mineral materials, sometimes mineral materials like cinders or slags, but more usually of natural origin, such as sand, rock, etc. It is obvious that the potentially usable aggregates include all the various kinds of rock native to the localities where roads are to be built. For example, limestone, dolomite, silica, rhyolite, caliche, and sedimentary, metamorphic, or igneous rocks of various other kinds, are regularly used in road-building. Such mineral aggregates are hydrophilic in character, a fact that is generally considered to be principally responsible for the existence of the bitumen-stripping problem.

When a bituminous substance such as asphalt, in molten, cutback, or emulsified form, is applied to such hydrophilic surfaces as those of mineral aggregates (in road-building), concrete walls (in water-proofing), paper (in water-proofing), etc., it is difficult to secure prompt coating of the surfaces by the bituminous material. Further, it is difficult to prevent the stripping or removal of such bituminous coating from such surfaces, with time. Prevention of stripping is the more important consideration, although ease of application is frequently of material importance.

Where the surface is moist, damp, or actually soaked, the problem is obviously intensified, because the bitumen must not only coat the surface, but it must first dislodge a tenaciously held water film. Some aggregates are river gravels; when freshly-dredged they come to the job saturated with water. Rainstorms occurring during construction also produce soaked aggregates and promote stripping. Some aggregates, like caliche, and some limestones and dolomites are quite porous and retain considerable water in the interstices after the outer surfaces of the particles seem reasonably dry.

In some cases it has been necessary first to dry the surface before applying the bituminous coating. Roadways laid in wet weather deteriorate rapidly in use. Where a bituminous roadway is subjected to water, as in low-lying areas or areas where water run-off is frequent or constant, it soon disintegrates, with the development of holes. The aggregate used in its construction is easily broken down to individual pebbles or small clumps of pebbles under such conditions, in absence of some corrective or preventive procedure, such as drying the aggregate by heat, before use.

The bitumen additives or reagents of our invention, when added in small proportions materially improve the bond between bituminous compositions and the surfaces to which they are applied. Stated another way, they will effectively reduce the degree of stripping of such bituminous compositions from such surfaces. Reagents employed for such purpose are commonly termed "anti-strippers" or "asphalt anti-strippers."

These compounds in very small proportions in such bituminous compositions are useful in road construction, in water-proofing, and in coating surfaces of various kinds. Bituminous compositions which include our reagents resist stripping from the surfaces to which they are applied. In other words, they are strip-resistant, as compared with the same bitumen used in absence of our reagents.

Where the bituminous composition is to be used for water-proofing walls or paper or other surfaces, the mixture of it with our reagent is the finished or complete composition.

Within the terms "bitumen," "bituminous compositions," "bituminous materials," and similar expressions including the word "bituminous," we mean to include natural asphalt, petroleum still residues of paving grade, plastic residues from coal tar distillation, petroleum pitch, solutions of such substances like cut-back asphalts, emulsions thereof, and the like.

To accomplish the foregoing objectives, the agents of our invention are required to be employed in only very small proportions, generally not more than 1% by weight of such reagents based on the weight of the bituminous component, but preferably 0.1% to 0.8%, being sufficient satisfactorily to control stripping. However, larger amounts may be employed if desired.

While our reagents are highly effective when used in absence of other available additives, they are useful in conjunction with, or admixed with, any other effective and compatible anti-stripper. For example, U.S. Patent No. 2,392,863, dated January 15, 1946, to Rudd, claims tall oil as an anti-stripper. Our reagents are generally compatible with tall oil, and are used for their present purpose in the presence of tall oil, or can be applied in the form of an admixture with tall oil.

Ordinarily, our reagents are added to or incorporated in the bituminous component before it is incorporated into any mixture. For example, they are added to molten asphalt or to cutback asphalt. If desired, our reagents are added to the mixer in which the bituminous material and the mineral aggregate are being mixed. In the case of bituminous emulsions, our reagents are added to the emulsion after it has been produced or to the bituminous component of such emulsions, before emulsification. The procedure of incorporating our reagents is not critical; the important thing is that they be as uniformly distributed throughout the finished composition as is possible.

For various reasons, including viscosity, we prefer to employ our reagents in the form of a solution in a suitable solvent. In some instances, especially where salt forms of our reagents are desired or required, water is the solvent selected, because of cost considerations. Where the reagent is water-insoluble or where water is unacceptable as a solvent, for temperature or other reasons, various organic solvents are employed. Aromatic petroleum solvent, sulfur dioxide extract, and petroleum distillates of various kinds, are useful. The solvent is not a material part of our invention. Any suitable solvent may be employed; usually the selection will be on the basis of cost. We prefer aromatic petroleum solvent because of its good solvent power and low cost. When our preferred reagents, described above, are mixed with aromatic petroleum solvent in equal volumes, a solution of satisfactory viscosity is produced. It is the preferred form of employing reagents. Our reagents are often added to asphalt, for example, at the refinery. This is a desirable procedure where large volumes are to be handled or where the asphalt is so heavy-bodied as to require heating to insure uniform distribution of the anti-stripper. Where conditions in the field are such that adequate mixing is achieved, our reagents are often added there, as the asphalt is used. Reagents appear to be quite stable at the usual storage and working temperatures of asphalt.

If the reagent is added at the refinery, the following example of procedure is practicable: Place the bituminous material or asphalt in a tank containing heating coils and bring it to a temperature at which its viscosity is relatively low. Add 1 pound of either of our reagents (in the form of a 50 weight percent solution in aromatic petroleum solvent) to every 133 pounds of bitumen, a ratio of 0.75%. If the asphalt is SC–6 or penetration grade asphalt, considerable heating will be required to bring the asphalt to acceptable fluid state. Pour in the desired proportion of reagent and mix it in the asphalt by rolling with gas, recycling through a mixing tank with mixing-type pumps, or stirring with a propeller or other tank-type stirrer. The bituminous mixture so prepared is delivered to the job ready for use in any desired method of application.

There may be, for example, direct application by spraying it on already-laid aggregate; application to a continuous road-mixing unit; or addition to a hot-mix plant. The reagent-asphalt mixture may be sprayed or poured for seal-coat application in the conventional manner. The presence of the reagent does not adversely affect the properties of the asphalt, or the application of the latter; the bituminous material is handled exactly as if no reagent had been added.

Where small batches of several-barrel size are involved, addition of the reagent may take place in the field, followed by hand stirring until a uniform distribution of reagent has been achieved.

Where the reagent is to be incorporated in an emulsified bituminous composition, it may be added to the bitumen ingredient in the manner just described; or it may be added to the finished emulsion by simply stirring it in the desired proportion in any conventional manner. The salt form of the reagent may be preferable in such latter instances. We have added our compounds in 50 weight percent solution in aromatic petroleum solvent to emulsified asphalt to produce a highly strip-resistant composition.

If desired, our reagents are added to and mixed with the aggregate before it is coated with the bituminous composition. While this is a less common procedure, it is perfectly feasible, especially where the reagent is sufficiently water-dispersible to give a reasonably stable dispersion which can be quite uniformly distributed throughout the aggregate.

A number of laboratory techniques have been proposed to evaluate anti-strippers. All or nearly all of them include the operation of coating some surface with a bituminous composition, subjecting the coated surface to stripping conditions, and appraising the degree of stripping that has taken place. Our reagents demonstrate their effectiveness strikingly in such tests.

One such test (Test #1) subjects a measured amount of mineral aggregate to a measured amount of water; thereafter coats the aggregate with the bitumen or bitumen-additive mixture; cures or ages the coated sample for a definite period of time; then strips the coated aggregate with water at a definite temperature and for a definite time; and thereafter, usually by visual examination, determines the percentage of the aggregate particles that have been stripped of their original bituminous coating.

The following examples are presented to illustrate this phase of the present invention:

The anti-stripping agents are tested according to the general procedure of Test #1, described above, by mixing 0.5% by weight of the anti-stripping agents listed in the table below into a MC–3 asphalt heated to about 200–275° F. This asphalt mixture is then used to coat a wet rock aggregate containing about 2% by weight of water (San Gabriel #4 crushed). The coated aggregate (as well as a control containing no anti-stripping agent) is then aged for 20 hours at room temperature. At the end of this time water (3 times the weight of the coated aggregate) is added and this mixture is stirred for 5 minutes at 150–175° F. Thereupon the coated aggregates are examined to determine the percentage of the aggregates that have been stripped of their asphalt coating. In all cases aggregates containing the composition shown in the following table are superior to the control.

ANTI-STRIPPING AGENT

| Ex. No. | I | | Weight of oxides added to I (grams) |
|---|---|---|---|
| | Reactants (grams) | H₂O eliminated (grams) | |
| 11-1 | 1a (439) plus oleic acid (846) | 54 | None. |
| 11-2 | ___do___ | 54 | EtO (132). |
| 11-3 | ___do___ | 54 | EtO (264). |
| 11-4 | 2a (568) plus stearic acid (852) | 54 | None. |
| 11-5 | ___do___ | 72 | EtO (132). |
| 11-6 | 3a (679) plus oleic acid (846) | 54 | None. |
| 11-7 | ___do___ | 72 | EtO (132). |
| 11-8 | 4a (523) plus oleic acid (846) | 54 | EtO (132). |
| 11-9 | 1a (439) plus nonanoic acid (475) | 54 | None. |
| 11-10 | ___do___ | 54 | EtO (132). |
| 11-11 | 1b (492) plus lauric acid (400) | 36 | None. |
| 11-12 | ___do___ | 36 | EtO (88). |
| 11-13 | 1c (645) plus lauric acid (600) | 54 | None. |
| 11-14 | ___do___ | 54 | EtO (132). |
| 11-15 | 1d (660) plus oleic acid (1,128) | 72 | None. |
| 11-16 | ___do___ | 72 | EtO (176). |
| 11-17 | 3d (1,004) plus lauric acid (800) | 72 | None. |
| 11-18 | ___do___ | 72 | EtO (176). |
| 11-19 | 16d (800) plus lauric acid (800) | 72 | None. |
| 11-20 | ___do___ | 72 | EtO (176). |
| 11-21 | 10a (1,075) plus lauric acid (600) | 54 | None. |
| 11-22 | 7a (1,462) plus lauric acid (600) | 54 | Do. |

| Ex. No. | I | | Weight of oxides added to I in alphabetical order (grams) |
|---|---|---|---|
| | Reactants (grams) | H₂O eliminated (grams) | |
| 11-23 | 28a (1,960) | | (A) PrO (580). |
| 11-24 | 28a (1960) plus lauric acid (600) | 120 | (A) PrO (116), (B) EtO (1,320). |
| 11-25 | 28aO (3,054) plus stearic acid (284) | 18 | |
| 11-26 | 28aAOA | | |
| 11-27 | 28b (1,400) | | EtO (1,980). |
| 11-28 | 28b (1,400) plus oleic acid (564) | 40 | EtO (2,640). |
| 11-29 | 28bAOA | | |
| 11-30 | 29b (1,635) | | (A) PrO (522), (B) EtO (1,980). |
| 11-31 | 29b (1,635) plus oleic acid (282) | 18 | EtO (1,320). |
| 11-32 | 29bO (2,655) plus oleic acid (282) | 18 | |
| 11-33 | 29bAOA | | |
| 11-34 | 30b (1,580) | | EtO (2,200). |
| 11-35 | 30b (1,580) plus stearic acid (569) | 40 | |
| 11-36 | ___do___ | 40 | (A) PrO (464), (B) EtO (1,320). |
| 11-37 | 30bAOA | | |

(12) ACIDIZATION OF CALCAREOUS STRUCTURES

This phase of our invention relates to the use of the compounds of our invention in preventing the formation of emulsions in the acidization of oil-bearing, calcareous strata, or the like. The conventional acidization process comprises introducing a strong mineral acid into an oil well for the purpose of causing the acid to disintegrate, dissolve, or react with the calcareous, oil-bearing structure of the well, in a manner that results in an increase in the amount of crude petroleum obtained from the oil-bearing strata. In this phase of our invention the present compounds are introduced with the strong mineral acid.

Many oil wells, after being subjected to acidization, produce emulsions, frequently of a very refractory nature, that have to be demulsified or subjected to chemical, electrical or similar treatment, in order to recover the oil or valuable constituent of the emulsion. Our compositions prevent the formation of objectionable water-in-oil type emulsions resulting from acidization of oil wells, or stated in another way, provide a means by which the oil-bearing, calcareous structure of a well can be acidized to increase the oil production, without danger of the procedure causing the well to produce a product, which, after being discharged from the well, has to be treated with a demulsifying agent, or subjected to other treatment of the kind commonly employed for converting refractory petroleum emulsions into oil that can be sold to pipe lines and refineries. Such refractory emulsions, which often follow conventional acidization, represent a transitory, rather than a permanent, situation, but even if lasting only for a few weeks, are extremely objectionable. The new compositions of this invention are adapted for use in acidizing the calcareous, oil-bearing strata of a well, inasmuch as the acid component will react with or act upon the calcareous structure in a way to increase the amount of crude petroleum obtainable from said structure, without, however, converting said crude petroleum into an objectionable emulsion.

In practicing our process, the said emulsion-preventing agent is caused to act upon or come in contact with the fluids, liquids, or liquid mixture in a well that has been subjected to acidization, either while said fluids or liquids are at the bottom of the well, or while said fluids or liquids are traveling upwardly to the surface of the ground, but the particular procedure, the means used to effect the mixing, or commingling of said emulsion-preventing agent with the well fluids or liquids, and the particular time when said mixing is effected, are immaterial, so long as said emulsion-preventing agent becomes mixed with, dissolved in, or commingled with the fluids of the well or the liquids or liquid mixture resulting from the acidization operation (the oil and the reaction product of the mineral acid on the calcareous structure), prior to emergence from the well. Equally good results may be obtained by the following procedure, to wit:

(a) Introducing the emulsion-preventing agent, preferably in aqueous solution, prior to the introduction of the mineral acid into the well;

(b) Introducing the emulsion-preventing agent, along with the mineral acid, i.e., dissolved in said acid; and (c) Introducing the emulsion-preventing agent, preferably in aqueous solution, immediately after the introduction of the mineral acid.

The composition of matter that we have devised for acidizing the calcareous, oil-bearing structure of oil wells, consists of the emulsion-preventing agent above described, mixed with, dissolved in, or combined with a strong mineral acid, such as hydrochloric acid, nitric acid, sulfuric acid, sulfamic acid, or mixtures of the same. Our preference is to use hydrochloric acid, whose concentration is at least equal to approximately half strength commercial 18° Baumé acid, as we have found that when such an acid is mixed with approximately 0.01% to 2.5% by weight based on the weight of the acid of the herein contemplated emulsion-preventing agent or agents, one obtains a new composition of matter that is perfectly stable and homogeneous, and which exhibits unusual properties, particularly when said new composition of matter is employed in the acidization of oil-bearing strata. However, we wish it to be understood that this phase of our invention, i.e., the new process and composition of matter herein described, is not restricted to the use of hydrochloric acid, but instead, contemplates the use of any suitable "strong mineral acid," several of which have previously been described as being usable in place of hydrochloric acid.

A number of problems have been involved in the introduction of strong mineral acid into oil-bearing strata of the kind containing calcium carbonate, magnesium carbonate, mixtures of the same, siliceous material, or material which is dolomitic in character, and commonly referred to as calcareous structures. One problem is the prevention of corrosion, or damage, to the metallic working parts of the well into which the acid is introduced. This has been overcome in various ways, such as by the use of an inhibitor. The compositions of this invention also act as corrosion inhibitors. For the sake of brevity, reference is made to the following patents, which give a cross-sectional view of the art relating to acidization, although there are in addition certain other practical elements which are well known.

U.S. Patents No. 1,877,504, September 13, 1932, Grebe and Sanford; 1,891,667, December 20, 1932, Carr; 1,911,446, May 20, 1933, Grebe and Sanford; 1,990,960, February 12, 1935, Wilson; 2,011,579, August 20, 1935, Health and Fry; 2,024,718, December 17, 1935, Chamberlain; 2,038,956, April 28, 1936, Parkhurst; 2,053,285, September 8, 1936, Grebe; 2,128,160, August 23, 1938, Morgan; 2,128,161, August 23, 1938, Morgan; and 2,161,085, June 6, 1939, Phalen.

As has been previously stated, in the acidization of oil-bearing, calcareous strata, or the like, it has been found necessary, in some instances, to add certain other materials or compounds which give additional desirable effects, at least under certain conditions. For instance, hydrofluoric acid or fluorides have been added to intensify the action of the hydro-chloric acid used to treat the well. Possibly this is related to the action on siliceous matter in the calcareous structure. The reason for the addition of inhibitors has been previously indicated. Sometimes it has been found desirable to add tenacious, foam-producing agents, such as glue, gelating, or the like. In other instances, it has been found desirable to add calcium sequestering compounds, such as sodium hexametaphosphate. In other instances, reducing agents have been added to keep any dissolved iron salts in the ferrous state. Isopropyl alcohol, or the like, is sometimes added as a surface tension depressant. Thus, the addition of various other auxiliary agents, commonly referred to as addition agents, is well known.

For the sake of brevity, reference will be made to hydrochloric acid as illustrating any suitable mineral acid. It is understood, of course, that such hydrochloric acid may or may not contain various amounts of hydrofluoric acid.

As previously indicated, the emulsion-preventing agents herein described have the effect of preventing emulsions when an oil well is turned into production after the acidizing operation. Many oil wells are acidized without subsequently producing any emulsions; or the emulsions, if produced, are self-resolving, or readily susceptible to any moderate breaking action. However, certain wells, particularly those located in western Kansas and certain wells in Illinois, when acidized by conventional processes, yield particularly refractory emulsions. This is a rather surprising situation, insofar that the spent acid results in a solution having approximately 20% of calcium chloride present, and having a pH value of approximately 3.5 to 5. One would expect the increased acidity over that of most natural brines to decrease the stability of the emulsion. One would also expect that the increased electrolyte content of the dispersed phase would decrease the stability of the emulsion. The increased specific gravity differential should have a similar destabilizing effect. Actually, in a number of instances, this is not the case, and such emulsions have resulted in unusual problems. In its broadest aspect, then, the agents herein contemplated may be used simply as emulsion-preventers, in connection with the acidization of subterranean strata.

The most concentrated hydrochloric acid, ordinarily available, is about 36% HCl strength. The commercial acid of this strength, or somewhat weaker, is usually diluted with an equal quantity of water before it is used for acidization; i.e., the acid used in acidization may vary from 14% to 16.5% HCl, although acid varying in strength from 5% to 20% HCl has been employed. It is entirely feasible to add an agent to the acid, as produced at the point of manufacture, thus exemplifying the composition of matter feature of the present invention. For instance, if desired, 0.02% to 5% by weight of the contemplated agent may be added to the concentrated hydrochloric acid at the point of manufacture. Such acid can be diluted to a suitable point before being employed in the acidization process. Thus, even concentrated acid can be diluted, for instance, half and half, so that the reagent is present in the dilute product within the ratio suggested previously, to wit, 0.01% to 2.5% by weight. In many instances, the use of between 0.05% and 0.5% represents an acceptable average range.

In actual practice the hydrochloric acid obtained by a person or firm responsible for acidization operations may be used, in some instances, on oil-bearing strata which do not form severe or refractory emulsions and thus no advantage is obtained by adding a composition of the kind herein contemplated in comparison with ordinary acid. Then too, some calcareous, oil-bearing strata which produces severe emulsions may require more or less of the agent of the kind herein contemplated than would be necessary in some other strata. For this reason, in the practical aspect it is generally desirable to add the agent of the kind herein contemplated to the dilute acid, so as to be suitable for the specific local conditions which require treatment. The suitable range of ratios for ordinary half-strength acids has been indicated.

As has been previously suggested, one may also add to the acid intended for acidization various other reagents or addition products of the kind described in the aforementioned list of patents without affecting the operation of the emulsion-preventing agent that we employ and without danger of said emulsion-preventing agent interfering with the effectiveness of such other acidization addition products. Likewise, it has been indicated that one need not necessarily employ our emulsion-preventing agent in the form of an addition agent which is added to or mixed with the acid used in the acidizing step. Instead, our emulsion-preventing agent may be introduced in suitable aqueous solution, preferably in fairly concentrated solution, for instance, 1–5%, prior to the acidizing step or immediately after the acidizing step. The method of introduction is, of course, any conventional method and preferably employs the same apparatus and procedure used for introducing the acid. For convenience, however, and in the most preferred form, our process is exemplified by employing, as an integral part thereof, the composition of matter herein contemplated, to wit, hydrochloric acid, or the like, containing, in stable admixture, agents of the kind described.

The ineffectiveness of most ordinary demulsifiers for preventing the formation of water-in-oil type emulsions resulting from acidization is readily understandable. Ordinary demulsifiers either are not soluble in half-strength hydrochloric acid, or its equivalent, or they are not soluble in spent brine of the kind previously mentioned, i.e., brine containing, roughly, equivalent to 20% of calcium chloride, and having a pH of 3.5 to 5. Furthermore, if soluble at all, they are generally decomposed; and if they do not decompose under ordinary conditions, they at least decompose under the conditions which involve the necessary pressure employed in acidization. Then too, in some instances where such demulsifiers appear to meet all other requirements, they apparently precipitate out on the face of the pay sand or oil-bearing strata, and they may even reduce instead of increase the oil production, as compared with results obtained by ordinary acid. There are a number of other reasons not necessary to explain which prevent ordinary demulsifiers from being effective.

Many of the compounds of this invention are water-soluble. For that reason they can be used without difficulty in aqueous solution as an emulsion-preventing agent by injecting such aqueous solution into the oil-bearing strata prior to acidization or immediately after acidization. Such injection is made by conventional means as, for example, the same apparatus or mechanical device employed for injecting acid into the well or oil-bearing strata. Furthermore, substantially all of the compounds of this invention are soluble in hydrochloric acid of a strength corresponding to approximately 15%. Substantially all of the compounds of the type indicated are soluble in concentrated hydrochloric acid. Commercial hydrochloric acid is ordinarily available in grades from approximately 18° Baumé, corresponding to approximately 28% anhydrous acid, to 22° Baumé, corresponding to approximately 35.2% anhydrous acid. Some commercial hydrochloric acid is available in a strength which approximates the C.P. grade, or slightly less than 37% anhydrous acid.

Needless to say, solutions of our compositions of matter can be prepared readily in any convenient manner. The selected compound can be dissolved in concentrated hydrochloric acid without dilution. The percentages employed have already been indicated. Such a concentrated hydrochloric acid may or may not contain some hydrofluoric acid. Likewise, if desired, the emulsion-preventing agent can be dissolved in water, and such aqueous solution added to the hydrochloric acid or the like in order to dilute the same to the desired concentration. Another procedure, of course, is to dilute the hydrochloric acid to the desired concentration and add the particular chemical compound which has been selected as the emulsion-preventing agent. The percentage of chemical compound of the kind herein described is added within the range of 0.01% to 5% by weight based on the weight of the acid.

*Examples*

The following test, which is a severe test for acidizing emulsions (referred to as the homogenizer test) is applied to the compounds of this invention.

Aqueous hydrochloric acid (15%) in the amount of 50 ml. is placed in a beaker. A compound selected from the table below is mixed into the acid in an amount of 0.3% by weight based on the weight of acid. Crude oil (50 ml.) is added and the mixture is then placed in a pneumatic homogenizer. This mixture is pressured through a homogenizing nozzle and the emulsion is caught in a graduate beaker. A second pass through the homogenizer is made. The resulting emulsion is caught in a graduate and the volume of acid settled is noted as a function of time. Normally, any acid that is not separated in 10 to 15 minutes will not separate. With the compounds shown in the following table, substantially all of the acid separated out within 15 minutes.

ACIDIZING DEMULSIFIERS

| Ex. No. | I | | Weight of oxides added to I (grams) |
|---|---|---|---|
| | Reactants (grams) | $H_2O$ eliminated (grams) | |
| 12-1 | 1a (439) plus oleic acid (846) | 54 | EtO (352). |
| 12-2 | ----do---- | 54 | EtO (440). |
| 12-3 | ----do---- | 54 | PrO (870). |
| 12-4 | ----do---- | 54 | PrO (1,450). |
| 12-5 | ----do---- | 54 | BuO (720). |
| 12-6 | 2a (568) plus stearic acid (852) | 54 | PrO (1,160). |
| 12-7 | ----do---- | 72 | PrO (1,450). |
| 12-8 | ----do---- | 72 | Octylene oxide (768). |
| 12-9 | 3a (679) plus lauric acid (600) | 54 | PrO (1,160). |
| 12-10 | 3a (697) plus lauric acid (600) | 72 | PrO (1,740). |
| 12-11 | 1b (492) plus lauric acid (400) | 36 | BuO (720). |
| 12-12 | 4c (733) plus lauric acid (600) | 54 | EtO (440). |
| 12-13 | ----do---- | 54 | PrO (1,160). |
| 12-14 | 1d (660) plus oleic acid (1,128) | 72 | PrO (1,450). |
| 12-15 | 13d (688) plus lauric acid (800) | 72 | PrO (1,740). |
| 12-16 | 6a (1,330) plus lauric acid (600) | 54 | PrO (580). |
| 12-17 | 9a (943) plus lauric acid (600) | 54 | BuO (720). |

| Ex. No. | I | | II—Weight of alkylene oxides added to I in alphabetical order (grams) |
|---|---|---|---|
| | Reactants (grams) | $H_2O$ eliminated (grams) | |
| 12-18 | 28a (1,960) | | (A) PrO (54,520), (B) EtO (20,440). |
| 12-19 | 28a (1,960) | | (A) BuO (26,600), (B) EtO (19,120). |
| 12-20 | 28a (1,960) plus lauric acid (600) | 120 | (A) PrO (17,560), (B) EtO (13,630). |
| 12-21 | ----do---- | 120 | |
| 12-22 | 28aO (3,054) plus stearic acid (284) | 18 | |
| 12-23 | 28aAOA | | |
| 12-24 | 28b (1,400) | | (A) PrO (47,640), (B) EtO (5,950). |
| 12-25 | 28b (1,400) plus oleic acid (564) | 40 | (A) BuO (17,040), (B) EtO (5,680). |
| 12-26 | ----do---- | 40 | |
| 12-27 | 29b (1,635) | | (A) BuO (780) (B) PrO (1,264), (C) EtO (7,720). |
| 12-28 | 29bO (2,655) plus oleic acid (282) | 18 | |
| 12-29 | 29bAOA | | |
| 12-30 | 30b (1,580) | | (A) PrO (40,000), (B) EtO (15,000). |
| 12-31 | 30b (1,580) plus stearic acid (569) | 40 | |
| 12-32 | ----do---- | 40 | (A) EtO (1,995), (B) PrO (12,000). |

(13) USE IN TREATING WATER INTRODUCED INTO UNDERGROUND FORMATIONS

This phase of our invention relates to the use of the compositions of this invention in treating water introduced into underground formations, for example, in disposal wells and in the recovery of petroleum from subterranean formations in water flooding operations.

The technique of water flooding to recover oil from depleted oil fields is well known. In general, such process consists in introducing an aqueous medium into one or more injection wells, which penetrate a depleted oil-producing formation, and forcing said medium through the formation towards a production well, which likewise penetrates the formation. In the so-called "five-spot drive," the aqueous medium is forced down four injection wells which are more or less symmetrically located around a producing well. As the flooding medium passes through the formation it strips or flushes the residual oil therefrom and carries it into the producing well from which it is recovered by conventional means. The flooding medium usually comprises water or oil field brine to which has been added various conditioning materials, e.g., surface active agents or detergents which promote the desorption of the residual oil from the formation, sequestering agents which prevent the deposition of calcium and/or magnesium compounds in the interstices of the formation, bactericides which prevent the formation from becoming plugged by bacterial or algae growth, corrosion inhibitors which prevent corrosion of the metallic well equipment and the consequent deposition of corrosion products in the formation, etc. Thus, while the process is usually termed "water flooding" the flooding medium in fact constitutes a rather complex composition containing a variety of conditioning agents. It is not uncommon to include as many as 4 or 5 different agents of various types in the flooding medium. Such use of a plurality of agents, however, adds substantially to the cost of the process and in many instances it is found that such agents interfere with one another.

Many advantages are realized with the use of our compounds in a flooding process in which the flooding medium comprises an aqueous solution of the compounds of this invention. In addition to their surface active properties, these agents have anti-corrosive and strong bactericidal action and do not precipitate alkaline-earth metal salts. Furthermore, these agents display a minimum tendency to become adsorbed on solid surfaces so that when employed in aqueous flooding media, a minimum amount thereof is lost from the solution by adsorption on the matrix of the formation.

In carrying out the present process, the flooding operation is effected in the conventional manner except that the flooding medium comprises an aqueous solution of the compounds of this invention. The concentration of the latter in the flooding medium is usually about 500 parts per million or greater and in many cases may be as low as 2 parts per million, depending upon the particular compound employed, the nature of the formation being subjected to flooding, and the degree of bacteria control required. In a typical five-spot flooding operation, oil field brine containing 50 parts per million of the compound is introduced at a rate of about 450 bbls. per day into each of the four input wells under a pressure sufficient to force said solution into the formation and drive it therethrough towards the centrally local output well. The operation can be continued over long periods of time without requiring any substantial increase in the pressure to force the flooding medium through the formation, thus demonstrating that no substantial plugging of the formation occurs either by precipitation of alkaline-earth metal salts or by bacterial growth.

While the flooding media employed in accordance with the present invention comprise only water or oil field brine and one or more of the herein described agents, they may also comprise additional corrosion inhibitors, tracers, supplemental bactericides, and the like. Similarly, they may be employed in conjunction with any of the operating techniques commonly applied to water flooding processes and in conjunction with other secondary recovery methods.

Other modes of applying the principle of our invention may be employed instead of those explained, change being made as regards the methods or materials employed, provided the step or steps stated by any of the following claims, or the equivalent of such stated step or steps, be employed.

In addition the compositions of this invention can also be used in water disposal wells.

This phase of the invention provides a simple and economical method for solving some of the difficult problems heretofore encountered in disposing of unwanted water. In many oil fields large volumes of water are produced and must be disposed of where water flooding operations are not in use or where water flooding operations cannot handle the amount of produced water. Most states have laws restricting pollution of streams and/or land with produced waters and oil producers must then find some method of disposing of the waste produced salt water. In many instances therefore, the salt water is disposed of by injecting the water into permeable low-pressure strata below the fresh water level. The formation into which the water is injected is not the oil producing formation and this type of disposal is defined as salt water disposal or waste water disposal. The problems of plugging of the formation and corrosion of equipment are analogous to those encountered in the secondary recovery operation by water flooding.

The following examples are presented to illustrate the present invention.

Example

A brine solution of the compound of Example 13–1 in the table listed below is employed in a 5 spot flooding operation in the ratio of 50 p.p.m. in the brine. The compound is added to the brine by means of a proportioning pump so that this ratio is obtained. The solution is forced into each injection well at the rate of about 350–400 lbs. per day. The injected water is taken up by the formation at such a rate that little, if any, increase of pressure is required during the week of operation during which the compound is used, thus indicating that little, if any, plugging occurs. The oil pumped from the production well is separated and the water is returned to the storage reservoir where it is used again in a similar manner. This compound also exhibits corrosion protection. The other compounds shown in the table show similar results when employed in similar water flooding or in water disposal operations.

WATER TREATING COMPOUND

| Ex. No. | I | | Weight of oxides added to I (grams) |
|---|---|---|---|
| | Reactants (grams) | H₂O eliminated (grams) | |
| 13-1 | 1a (439) plus oleic acid (846) | 54 | EtO (660). |
| 13-2 | 2a (568) plus oleic acid (846) | 54 | EtO (880). |
| 13-3 | ----do---- | 72 | EtO (880). |
| 13-4 | 3a (679) plus stearic acid (852) | 54 | EtO (1,540). |
| 13-5 | 2b (662) plus lauric acid (400) | 36 | EtO (1,320). |
| 13-6 | 1c (645) plus lauric acid (400) | 36 | EtO (1,760). |
| 13-7 | 3c (907) plus lauric acid (600) | 54 | EtO (1,980). |
| 13-8 | 1d (660) plus oleic acid (1,128) | 72 | EtO (2,200). |
| 13-9 | 1d (660) plus lauric acid (800) | 72 | EtO (2,420). |
| 13-10 | 3d (1,004) plus lauric acid (800) | 72 | EtO (2,200). |
| 13-11 | 13d (688) plus lauric acid (800) | 72 | EtO (1,100). |
| 13-12 | ----do---- | 72 | EtO (1,320). |
| 13-13 | 16d (800) plus oleic acid (1,128) | 72 | EtO (1,100). |
| 13-14 | ----do---- | 72 | EtO (1,320). |
| 13-15 | ----do---- | 72 | EtO (2,200). |

| Ex. No. | I | | Weight of oxides added to I in alphabetical order (grams) |
|---|---|---|---|
| | Reactants (grams) | H₂O eliminated (grams) | |
| 13-16 | 28a (1,960) | | (A) PrO (580). |
| 13-17 | 28a (1,960) plus lauric acid (600) | 120 | (A) PrO (116), (B) EtO (1,320). |
| 13-18 | 28aO (3,054) plus stearic acid (284) | 18 | |
| 13-19 | 28aAOA | | |
| 13-20 | 28b (1,400) | | EtO (1,980). |
| 13-21 | 28b (1,400) plus oleic acid (564) | 40 | EtO (2,640). |
| 13-22 | 28bAOA | | |
| 13-23 | 29b (1,635) | | (A) PrO (522), (B) EtO (1,980). |
| 13-24 | 29b (1,635) plus oleic acid (282) | 18 | EtO (1,320). |
| 13-25 | 29bO (2,655) plus oleic acid (282) | 18 | |
| 13-26 | 29bAOA | | |
| 13-27 | 30b (1,580) | | EtO (2,200). |
| 13-28 | 30b (1,580) plus stearic acid (569) | 40 | |
| 13-29 | ----do---- | 40 | (A) PrO (464), (B) EtO (1,320). |
| 13-30 | 30bAOA | | |

(14) USE IN INCREASING PRODUCTION OF PETROLEUM OIL FROM SILICEOUS STRATA IN PRIMARY OIL OPERATIONS

This phase of our invention relates to the use of the compounds of our invention in treating sandy or siliceous geological formations or strata penetrated by the surrounding oil well bores or cavities to render such formations preferentially wettable by oil so as to increase the proportion of oil and decrease the proportion of water produced by a given well.

Such alteration in ratio of fluid volumes produced may accomplish any one of a number of specific results which vary with local conditions. In some instances wells can be converted from unproductive wells to productive wells; i.e., strata which would not otherwise justify commercial exploitation can be operated on a sound basis. In some cases treatment of the kind herein contemplated will cause a productive well to yield an even greater output of crude oil, i.e., increase its productivity. Furthermore, not only does such treatment involve a change in the rate at which oil may be produced but also it may yield a greater total output of oil from a particular well, cavity or formation volume, than would be otherwise possible. In other words, such treatment not only affects current rate of production but also the entire volume of oil produced during the life of the well.

Chemical treatment of an oil well of the kind herein described may not only accomplish one or more of the results or objects above mentioned; but also it will reduce current lifting charges due to the fact that a greater amount of water is left behind in the strata when the final depletion stage is reached. Additional objects are obvious; to wit, in many instances objectionable operating conditions, such as corrosion, emulsion formation, etc., may be decreased or eliminated, due to the lesser amount of water produced per barrel of oil.

This phase of our invention relates to the use of the compounds of our invention to impart oil wettability to sandy or siliceous strata and produce the above advantages. In its broadest aspect, the present invention is concerned with the application of the described agents in any suitable or feasible manner.

It is generally recognized that sand is more readily wet by water than by oils. As a result, the encroachment of water into oil-bearing sand formations is greatly favored by the forces of capillary attraction. Such encroachment results finally in the "breaking through" or rising of water into the well bore. Water is then produced along with the oil. In addition, water decreases the production of oil, since its presence in capillary channels blocks the flow of oil which would otherwise occur through these channels. This effect is particularly objectionable when it occurs at the face of the bore hole and in its immediate vicinity as the rate and volume of oil production appears to be highly dependent upon the area of oil permeable formation exposed to the open hole.

In a preferentially water-wettable capillary system, such as is formed by ordinary sand formations, water is strongly held and its displacement by oil is opposed by the force of the interfacial tension at the oil-water interface. The treating process of the present invention changes the sand formation to one preferentially wet by oil with the result that the force of interfacial tension at the oil-water interface then favors the displacement of water by oil in the capillary system, or conversely, opposes the displacement of oil by water.

In practicing our process, the sand formation is treated by pumping a solution of the reagent into the formation and allowing it to remain sufficiently long for adsorption on the sand grains to occur. The reagent may be put into solution as such or in the form of salt such as the chloride, phosphate, acetate, sulfate, or other salt which is sufficiently soluble in the solvent used. Some compounds of this invention are rather insoluble in water, and, therefore, their salts are used when water is chosen as the solvent. However, in non-aqueous or oil solvents such as alcohols, kerosene, and crude oil, they are often sufficiently soluble to be employed directly.

The reagents used in the present process are effective in very dilute solutions, such as 0.01% by weight or even less and may be employed in such dilution. In many instances, the effectiveness of a solution containing a few hundredths of a percent of a selected agent can be demonstrated readily by immersing an absolutely clean water-wettable silica plate about the size of a microscopic slide in such very dilute solution of the selected compound and agitating gently for a short period of time, for instance, a few minutes to a few hours, and then noting that the silica plate surfaces have been converted from a hydrophile state to a definitely hydrophobe state. However, we prefer to use stronger solutions in order that appreciable amounts of treating reagent may be introduced into the formation without the handling of inconveniently large volumes of solution and without added cost due to labor, shutdown time, etc. The usual concentrations of reagent employed in solution are from 1% to about 25% by weight. In certain instances even more concentrated solutions may be employed.

In the most desirable solutions, we prefer to use, roughly speaking, 10–20% by weight of these compounds. Such solutions also have solvent and emulsifying power for both water and oil, and thus are effective in removing water or oil sheaths surrounding the sand grains of the formation being treated, thereby putting the grains into immediate contact with the treating solution. The solutions which we prefer to employ are characterized by the fact that, in addition to the treating reagent, they contain water, an oil, and an alcohol. It is a remarkable fact that mixtures of this kind can be found which, in the proper proportions, are perfectly clear and homogeneous. The stability of these solutions appears to arise partly from the presence of the actual treating reagents, which, because of their structure, probably act in a manner analogous to ordinary soaps insofar as their solubilizing power is concerned.

The alcohols which can be used in preparing our preferred treating solutions are those containing three or more carbon atoms and less than 30 carbon atoms, and may be either primary, secondary, or tertiary. Those most widely applicable are the primary and secondary aliphatic, alicyclic, mixed aliphatic-alicyclic, and aliphatic ether alcohols containing from four to 10 carbon atoms and including such alcohols as n-butanol, 2-butanol, 2-ethyl hexanol, n-hexanol, cyclohexanol, ethylene glycol monobutyl ether, diethylene glycol monoamyl ether, a terpineol, furfuryl alcohol, oxidized pine oil, rosin oil, and the like. The choice of proper alcohol and its proportion in the mixture depends somewhat upon the treating reagent used, the amount and kind of oil employed, and the proportion of water used and is best determined by preparing experimental mixtures on a small scale. Various representative formulae will subsequently be given.

The oils which can be used in preparing our preferred treating solutions are the liquid, water-insoluble hydrocarbons and chlorinated hydrocarbons, and preferably those which have high solvent power for crude oils. Examples of suitable oils are: kerosene, gasoline, benzol, carbon tetrachloride, dichlorethane, xylene, turpentine, pressure distillate, amylene dichloride, and the like. Crude oil itself may be used in some instances.

As examples of the preferred types of treating solutions to be used in the present process, the following formulae are presented wherein proportions are by weight:

TREATING SOLUTION #1

| | Percent |
|---|---|
| Active compound | 10 to 14 |
| n-Butanol | 18 to 14 |
| Water | 38 to 42 |
| Kerosene | 34 to 30 |

The sand surfaces treated by the present process show a strong affinity for non-polar materials such as oil, asphalt, bitumen, and the like. In some instances, it is advantageous to follow our treating process with a treatment with an asphalt or bitumen solution. When this is done, the sand becomes covered with a uniform adsorbed layer of the asphalt or bitumen which tends to protect the under layer of adsorbed compounds and renders the surface even more water-repellent. However, this after-treatment can often be eliminated and the same effect be obtained by incorporating asphalt or bitumen in the original treating solution. If the original treating solution consists of an oil solution, the asphalt or bitumen is simply dissolved in the oil with the treating reagent. With homogeneous solutions of the kind described in the above examples, the asphalt or bitumen is dissolved in the oil used in preparing the solution, and this is then mixed with the other ingredients. By proper choice of proportions of ingredients, clear, homogeneous mixtures are obtainable. Below is an example of a treating solution incorporating asphalt as one of the constituents:

TREATING SOLUTION #2

| | Percent |
|---|---|
| Active compound | 12 to 13 |
| n-Butanol | 17 to 18 |
| Kerosene | 28 to 22 |
| High melting asphalt | 1 |
| Water | 42 to 46 |

The compounds used in our process are apparently capable of forming association complexes with long chain aliphatic alcohols, which complexes are more soluble in hydrocarbon oils than the original compounds. Solutions containing such long chain alcohols are suitable for treating sand to make it preferentially oil-wettable and in some instances appear to improve the water repellent properties of the adsorbed film. Long chain alcohols can be incorporated in an oil solution of the treating reagent or into solutions of the type previously described, in which case the final treating solution may contain two different alcohols, one of high molecular weight, and one of lower molecular weight, as illustrated by the following:

TREATING SOLUTION #3

| | Percent |
|---|---|
| Active compound | 11 to 10 |
| n-Butanol | 17 to 16 |
| Cetyl alcohol | 9 to 5 |
| Kerosene | 21 to 28 |
| Water | 42 to 41 |

As previously stated, the treating reagents can be employed in the form of simple aqueous or oil solutions. Such solutions lack some of the good features of our preferred solutions such as high solvent and emulsifying power for the well fluids, but because of their cheapness and simplicity of preparation will often be used. Examples of these solutions are as follows:

TREATING SOLUTION #4

| | Percent |
|---|---|
| Active compound | 1 |
| Water | 99 |

TREATING SOLUTION #5

| | Percent |
|---|---|
| Active compound | 1 |
| Benzene | 9 |
| Kerosene | 90 |

TREATING SOLUTION #6

| | Percent |
|---|---|
| Active compound | 1 |
| Denatured alcohol | 9 |
| Water | 90 |

Example

This example illustrates a procedure for carrying out the process of this phase of the present invention on a typical oil well producing from a sand formation and equipped with the usual casing and tubing. If the well is producing water, it is well to determine from what portion of the formation it is coming, as treatment may then be localized to this section with consequent savings in cost of reagent. The main source of water, if any, can often be located by pumping the well from various parts of the open hole which have been separated from the remainder by means of formation packers. After deciding from such tests which portion of the formation is to be treated, the tubing is packed so as to communicate with this section. The treating fluid, Treating Solution #1 above, wherein the active compound is 14-1 of the following table and which contains 14% of 14-1, 14% of n-butanol, 42% water and 30% kerosene, is then run into the tubing and finally into the formation, pump pressure being applied if necessary to displace it into the sand. In this case pump pressure is required. The amount of solution required will depend upon the amount of open formation being treated but usually will vary from about 4 to about 100 barrels. In this case 25 barrels are employed. When all of the solution has been introduced into the tubing, crude oil is then pumped in after it to act as a piston to drive the solution back into the formation. The oil is pumped in slowly so that the treating solution will be in contact with the formation particles for at least a few seconds. Adsorption from the solution occurs very rapidly, however. As more oil is introduced, the treating solution is gradually pushed farther and farther into the formation. Finally all of the solution will have entered the sand and the crude oil will begin to penetrate the treated portions, thus immediately saturating the capillaries with oil which now adheres strongly to the sand surfaces. On being pushed further into the formation, the treating solution eventually becomes spent due to adsorption of the active ingredients and dilution with the formation fluids. The amount of crude oil pumped into the formation behind the treating solution preferably is at least equal the volume of treating solution used and the use of even larger volumes is desirable, since it insures deep penetration of the treating fluid and thorough oil saturation of treated capillaries immediately surrounding the bore hole.

Following treatment, the well is kept shut in for a few hours, after which it is put back on production.

In carrying out our process, it is not necessary to take precautions against the treating solution entering the oil producing portions of the formation, as no plugging precipitates are formed. If desired, the use of a formation packer may be eliminated and the entire formation, both oil and water producing, may be treated. In some instances wells producing no water at all are treated in order to prevent water encroachment.

The following examples are presented to illustrate how the composition of this invention can impart hydrophobic properties to sand normally found in oil areas and thus act in the manner described in the above example.

Example

Sand found in various oil drilling is contacted with various solutions prepared according to Treating Solution #1 wherein the active compound is one or more of those shown in the following table. By such treatment the sand is rendered hydrophobic as contrasted with its previous hydrophilic condition.

SAND TREATING COMPOUND

| Ex. No. | I | | Weight of oxides added to I (grams) |
|---|---|---|---|
| | Reactants (grams) | $H_2O$ eliminated (grams) | |
| 14-1 | 1a (439) plus oleic acid (846) | 54 | None. |
| 14-2 | do | 72 | Do. |
| 14-3 | 1a (439) plus lauric acid (600) | 54 | Do. |
| 14-4 | do | 72 | Do. |
| 14-5 | 1a (439) plus stearic acid (852) | 54 | Do. |
| 14-6 | do | 72 | Do. |
| 14-7 | 2a (568) plus stearic acid (852) | 54 | Do. |
| 14-8 | do | 72 | Do. |
| 14-9 | 3a (679) plus oleic acid (846) | 54 | Do. |
| 14-10 | do | 72 | Do. |
| 14-11 | 3b (552) plus oleic acid (564) | 36 | Do. |
| 14-12 | do | 54 | Do. |
| 14-13 | 1c (645) plus lauric acid (600) | 54 | Do. |
| 14-14 | 1d (660) plus oleic acid (1,128) | 72 | Do. |
| 14-15 | 6a (1,330) plus oleic acid (1,128) | 72 | PrO (174). |
| 14-16 | 10a (1,075) plus oleic acid (1,128) | 72 | BuO (216). |
| 14-17 | 1a (439) plus oleic acid (846) | 54 | PrO (348). |
| 14-18 | do | 54 | Octylene oxide (384). |
| 14-19 | 1d (660) plus oleic acid (1,128) | 72 | Strene oxide (260). |
| 14-20 | do | 72 | BuO (288). |

| Ex. No. | I | | Weight of oxides added to I in alphabetical order (grams) |
|---|---|---|---|
| | Reactants (grams) | $H_2O$ eliminated (grams) | |
| 14-21 | 28a (1,960) | | (A) PrO (580). |
| 14-22 | 28a (1,960) plus lauric acid (600) | 120 | (A) Pro (116), (B) EtO (1,320). |
| 14-23 | 28aO (3,054) plus stearic acid (284) | 18 | |
| 14-24 | 28aAOA | | |
| 14-25 | 28b (1,400) | | EtO (1,980). |
| 14-26 | 28b (1,400) plus oleic acid (564) | 40 | EtO (2,640). |
| 14-27 | 28bAOA | | |
| 14-28 | 29b (1,635) | | (A) PrO (522), (B) EtO (1,980). |
| 14-29 | 29b (1,635) plus oleic acid (282) | 18 | EtO (1,320). |
| 14-30 | 29bO (2,655) plus oleic acid (282) | 18 | |
| 14-31 | 29bAOA | | |
| 14-32 | 30b (1,580) | | EtO (2,200). |
| 14-33 | 30b (1,580) plus stearic acid (569) | 40 | |
| 14-34 | do | 40 | (A) PrO (464), (B) EtO (1,320). |
| 14-35 | 30bAOA | | |

(15) EMULSIFYING AGENTS

This phase of our invention relates to the use of the compositions of this invention as emulsifying agents in preparing suspensions and colloidal dispersions, all such disperse systems being referred to hereinafter as emulsions. They can be used to prepare such emulsions in which organic materials having little or no solubility in water are caused to be uniformly distributed therein in a fine state of subdivision.

As is well known to those familiar with the art, two liquids which are mutually insoluble may be emulsified by prolonged mechanical agitation. However, if the resulting emulsion contains much more than about one percent of the disperse phase, it is unstable and the component liquids soon separate into two layers. Thus a small portion of oil in a large volume of water may be emulsified by shaking. However, on sanding, the minute droplets of oil soon coalesce and the liquids separate into two phases. In general, the larger the proportion of oil in the mixture, the more unstable the emulsion becomes.

Although stable emulsions of two pure immiscible liquids cannot ordinarily be prepared, they can readily be stabilized by the addition of a third substance, known as an emulsifying agent or an emulsifier, to one of the liquid phases. When the emulsifying agent is added to the oil phase, the resultant oil is known as an amulsifiable oil. With the aid of such materials, two main types of emulsions have heretofore been prepared; namely, emulsions in which oil is dispersed in water, generally referred to as the oil-in-water type, and emulsions in which water is dispersed in oil, known as the water-in-oil type. The emulsifying agent employed in each instance will be dependent upon the particular type of emulsion being produced. Materials which are excellent emulsifiers for the water-in-oil type emulsion are sometimes ineffective to stabilize an oil-in-water emulsion and, conversely, agents which are satisfactory for stabilizing oil-in-water type emulsions are quite often useless for imparting stability to a water-in-oil type emulsion. For example, it is known that the alkali metal soaps are excellent emulsifying agents for oil-in-water emulsions, whereas they are unsatisfactory for water-in-oil emulsions. On the other hand, although the soaps of the heavy metals are not good emulsifying agents for producing oil-in-water emulsions they are effective for stabilizing water-in-oil emulsions. Accordingly, it will be evident that in stabilizing emulsions of oil and water with an emulsifier, the particular type of emulsion being produced is a factor of considerable importance.

However, minor amounts of compounds of the present invention are useful in preparing both water-in-oil and oil-in-water type emulsions. In general, the O/W emulsifiers are more hydrophilic than oleophilic as compared to the W/O emulsifiers.

The term "oil" is used herein in the broad sense usually accorded that term in the emulsion art, i.e., to designate any liquid which is insoluble in water. Accordingly, the oil phase of the emulsions can be composed of mineral lubricating oils, or various fractions thereof; vegetable oils, such as cotton-seed oil, castor oil, linseed oil, tung oil, soy bean oil, oiticica oil, etc; animal oils, such as sperm oil, oleo oil, etc.; fish oils, such as codliver oil, porpoise oil, salmon oil, etc.; petroleum waxes, such as slack wax and paraffin wax; natural waxes, such as carnauba wax, beeswax, Japan wax, etc.; and, in general, any of those materials in the art capable of making up the oil phase of an emulsion.

In general, the emulsions are prepared by combining oil, water, and the emulsifying agent and agitating the mixture until a suitable emulsion is obtained. The size of the particles present in the emulsion is to a great extent dependent on the degree of shearing employed during the preparation. By employing an apparatus having a high stirring speed, particles having the desired fine size can more readily be obtained. The strength of the emulsions can be varied over wide limits but good results have been obtained in emulsions containing from 0.5 to 100 parts by weight of the oil component per 0.5 to 100 parts by weight of water. The emulsifier component of the system is present in the amount of 0.01 to 5% by weight or higher, but preferably 0.1 to 1.5%, based on the total weight of the system.

Our reagents are useful in undiluted form or diluted with any suitable solvent. Water is used whenever possible, because of its ready availability and negligible cost; but in some cases, non-aqueous solvents such as aromatic petroleum solvent may be found preferable. The products themselves may exhibit solubilities ranging from rather modest water-dispersibility to full and complete dispersibility in that solvent. Because of the small proportions in which our reagents are customarily employed in practicing our process, apparent solubility in bulk has little significance. In the extremely low concentrations of use they undoubtedly exhibit appreciable water-solubility or water-dispersibility as well as oil-solubility or oil-dispersibility.

Our reagents may be employed alone, or they may in some instances be employed to advantage admixed with other and compatible emulsifiers.

As is well known to those skilled in the art a great many factors must be considered in the preparation of such emulsions, such as the temperature throughout the production cycle, extent and duration of agitation and/or time of incorporation of the various ingredients, order of addition of the ingredients, and the type of product desired. For example, emulsions serving as carriers for insecticides are readily and easily prepared using two parts of a compound of this invention and 200 parts of water to form a homogeneous, clear solution which if stirred vigorously with an equal volume of kerosene, naphtha or other low boiling hydrocarbon will produce a stable emulsion which can be diluted to any desired extent with water. The hydrocarbon can be used as a solvent for insecticidal compositions and is therefore useful in the preparation of insecticidal sprays.

It would, of course, be possible to present numerous other examples in which products can be prepared for specific purposes. Emulsions, pastes and creams useful as scouring and wetting agents, disinfectants, lubricants, leather conditioners, leather polishes, furniture and auto polishes, waterproofing agents, cutting oils, soluble greases, insecticides, etc. can readily be produced by application of the principles herein presented. The advantages to be derived are manifold. Suffice it to say that compounds of this type are not only efficient as emulsifiers, but also, due to their antioxidant character, prevent deterioration by atmospheric agents and thereby exert a distinct protective action where the products contain an easily oxidizable group or where the product is used as a textile or leather conditioning or treating agent. This same tendency is furthermore to be recognized as an advantage where emulsions are used in contact with metals and the antioxidant, surface active constituent actually serves as an inhibitor.

The following examples are presented for purposes of illustration.

Mineral oils containing the emulsifiers listed below are prepared by adding a minor proportion (0.5% by weight based on weight of oil) of the emulsifier to a light mineral oil. One liter of water is then added to 25 grams of emulsifier containing oil with agitation until a thick stable emulsion is formed. The emulsions are useful for lubricating moving parts under conditions where emulsions are desirable, such as in steam cylinder lubrication and the like. These emulsifier containing oils can also be used to produce emulsions useful for treating textiles, in waterproofing materials, in coating paper, and the like.

EMULSIFYING AGENTS

| Ex. No. | I | | Weight of oxides added to I (grams) |
|---|---|---|---|
| | Reactants (grams) | H₂O eliminated (grams) | |
| 15-1 | 1a (439) plus oleic acid (846) | 54 | None. |
| 15-2 | ----do---- | 72 | Do. |
| 15-3 | 1a (439) plus lauric acid (600) | 54 | Do. |
| 15-4 | ----do---- | 72 | Do. |
| 15-5 | 2a (568) plus stearic acid (852) | 54 | Do. |
| 15-6 | ----do---- | 72 | Do. |
| 15-7 | 3a (679) plus stearic acid (852) | 54 | Do. |
| 15-8 | ----do---- | 72 | Do. |
| 15-9 | 1b (492) plus lauric acid (400) | 36 | Do. |
| 15-10 | ----do---- | 54 | Do. |
| 15-11 | 2c (774) plus lauric acid (600) | 54 | Do. |
| 15-12 | ----do---- | 72 | Do. |
| 15-13 | 1d (660) plus stearic acid (1136) | 72 | Do. |
| 15-14 | ----do---- | 90 | Do. |
| 15-15 | 1a (439) plus oleic acid (846) | 54 | EtO (660). |
| 15-16 | 1b (492) plus lauric acid (400) | 36 | PrO (580). |
| 15-17 | 2c (774) plus lauric acid (600) | 54 | EtO (880). |
| 15-18 | 1d (660) plus lauric acid (800) | 72 | EtO (1,320). |
| 15-19 | ----do---- | 72 | BuO (720). |
| 15-20 | ----do---- | 72 | Octylene oxide (512). |

| Ex. No. | I | | Weight of oxides added to I in alphabetical order (grams) |
|---|---|---|---|
| | Reactants (grams) | H₂O eliminated (grams) | |
| 15-21 | 28a (1,960) | | (A) PrO (580). |
| 15-22 | 28a (1,960) plus lauric acid (600) | 120 | (A) PrO (116), (B) EtO (1,320). |
| 15-23 | 28aO (3,054) plus stearic acid (284) | 18 | |
| 15-24 | 28aAOA | | |
| 15-25 | 28b (1,400) | | EtO (1,980). |
| 15-26 | 28b (1,400) plus oleic acid (564) | 40 | EtO (2,640). |
| 15-27 | 28bAOA | | |
| 15-28 | 29b (1,635) | | (A) PrO (522), (B) EtO (1,980). |
| 15-29 | 29b (1,635) plus oleic acid (282) | 18 | EtO (1,320). |
| 15-30 | 29bO (2,655) plus oleic acid (282) | 18 | |
| 15-31 | 29bAOA | | |
| 15-32 | 30b (1,580) | | EtO (2,200). |
| 15-33 | 30b (1,580) plus stearic acid (569) | 40 | |
| 15-34 | ----do---- | 40 | (A) PrO (464), (B) EtO (1,320). |
| 15-35 | 30bAOA | | |

(16) CUTTING OIL

This phase of the invention relates to the use of the compositions of this invention in cutting oils and in particular in emulsifiable cutting oils.

In the fabrication of metals into stock materials, articles, machine elements, etc., by methods involving cutting, grooving, turning, milling, broaching, boring, hobbing, gear cutting, grinding, stamping, drawing, etc., operations, frictional forces are created which cause overheating and accelerated dulling of the cutting tools, dies, etc., used in such operations. Moreover, the metals being subjected to the aforementioned operations become overheated, thereby deleteriously affecting the uniformity and quality of the finished products.

In an attempt to combat these difficulties, it is conventional to employ various oils and compositions containing oils for cooling and lubricating both the cutting tools, dies, etc., as well as the metal being worked upon. In general, there are four main types of cutting oils, to wit, (1) straight mineral oil, (2) mineral lard oil, (3) sulfurized mineral oil or mineral lard oil and (4) soluble oils (emulsifiable with water). This phase of the present invention is primarily directed to the so-called soluble cutting oils which readily emulsify with cold or warm water.

The two primary functions of a cutting oil in the metal working arts are cooling and lubricating which in turn serve to increase production and yield products having a better surface finish. An ideal cutting oil should be endowed with the following characteristics: (1) high specific heat, (2) good wetting and spreading power, (3) adherence to the essential elements in a good film strength, (4) a viscosity permitting adequate flow, (5) stability, (6) free of fire hazards, (7) non-corrosive and (8) non-injurious to health.

The compositions of this invention can be used in preparing cutting oils having these qualities to a high degree.

In the preparation of the cutting oils of the invention, any suitable oil, for example, a mineral oil may be employed, depending on the particular use to which the product is to be applied. The lighter mineral oils, such as white oil or paraffin oil, have been found to function very successfully and their use for the purposes of this invention is preferred. Oils of this type render the degree of lubrication desired especially in combination or cooperation with the remaining components of the novel composition.

The soluble cutting oil base of the invention may be emulsified with water in any desired proportion depending upon the machining operation to be carried out. Moreover, the proportion of the soluble oil with respect to the water controls the type of emulsion produced. It has been found that both the oil-in-water and water-in-oil type emulsions are obtained depending upon the specific compound employed and the amount of soluble oil used. When the amount of oil used is less than the transition point, the oil-in-water type emulsion is produced; whereas if the quantity of soluble oil is increased beyond the transition point, inversion takes place resulting in the water-in-oil type emulsion.

As hereinbefore mentioned, the type of emulsion selected will depend upon the nature of the machining operations to be carried out. In any event, both types of emulsions prossess the aforementioned characteristics which advance the product of the invention closer to the so-called ideal cutting oil. In view of its non-corrosive character, the cutting oil of the invention may be used in fabricating non-ferrous metals as well as the ferrous metals and alloys.

The expressions "soluble oil" and "soluble cutting oil base" are used herein to connote a composition which is emulsifiable with an aqueous medium to form an emulsified cutting oil of either a water-in-oil or oil-in-water type. In practice these cutting oils take up water to form 8:1 to 100:1 water-to-oil emulsions customarily formed for the cooling and lubrication of metal working operations.

The ratios of the compositions of this invention in the soluble cutting oil base can vary within wide limits. In general, we employ 0.1 to 1.5% or higher but preferably 0.3% to 0.8%, by weight, based on the weight of cutting oil, of these compounds in the cutting oil.

In addition, it will be understood that any conventional modifiers may be added to the product of this invention, such as soaps, antioxidants, anti-foamants, load-bearing agents (extreme pressure or oiliness additives) and the like.

Furthermore, the compositions of this invention can be employed in other types of cutting oils, for example, straight mineral oil, mineral lard oil, and sulfurized mineral or mineral lard oil.

The following examples are presented to illustrate the present invention.

A cutting oil is prepared by dissolving 0.5% by weight of the compounds shown in the following table in a mineral oil of 130 SSU viscosity at 100° F. and 35 viscosity index. These compositions when emulified with both 1:10 parts of water and 1:20 parts of water produce excellent cutting oils.

oil-base drilling fluids comprising, for example, a clay or calcium carbonate suspended in mineral oil.

A third type of drilling fluid, which has recently been developed, is one of oil-in-water or water-in-oil emulsions, for example, emulsions of mineral oil in water or water in mineral oil formed by means of emulsifiers such as: sulfuric acid; Turkey-red oil; soaps of fatty acids, for example, sodium oleate; emulsoid colloids, for example starch, sodium alginate, etc. Varying amounts of finely-divided clay, silica, calcium carbonate, blown asphalt, and other materials may be added to these emulsions to improve their properties and control their weight.

The use of drilling emulsions has several advantages over the use of either water-base or oil-base drilling fluids.

Drilling emulsions are generally superior to water-base drilling fluids in forming a very thin and substantially fluid-impervious mudsheath on the walls of a borehole, in eliminating fluid loss to the formation and contamination of producing formations by an aqueous liquid, etc.

Drilling emulsions are generally superior to oil-base drilling fluids from the point of view of cost, of ease of handling, of suitability for electrical logging, etc.

The disadvantage for general use of drilling emulsions is, however, their lack of stability in the presence of even moderately high concentrations of electrolytes such as brines entering the borehole from the formation and becoming admixed to the drilling fluid.

Thus, drilling emulsions, formed by means of the emulsifiers listed above break down immediately or after a few hours of use or storage upon contamination with

CUTTING OIL ADDITIVES

| Ex. No. | I | | Weight of oxides added to I (grams) |
|---|---|---|---|
| | Reactants (grams) | $H_2O$ eliminated (grams) | |
| 16-1 | 1a (439) plus oleic acid (846) | 54 | EtO (440). |
| 16-2 | ----do---- | 72 | EtO (660). |
| 16-3 | 2a (568) plus lauric acid (600) | 54 | EtO (528). |
| 16-4 | ----do---- | 72 | EtO (968). |
| 16-5 | 3a (697) plus lauric acid (600) | 72 | EtO (660). |
| 16-6 | 1b (492) plus stearic acid (568) | 36 | EtO (440). |
| 16-7 | ----do---- | 54 | EtO (880). |
| 16-8 | 1c (645) plus lauric acid (600) | 54 | EtO (660). |
| 16-9 | ----do---- | 72 | EtO (440). |
| 16-10 | 1d (660) plus oleic acid (1,128) | 72 | EtO (704). |
| 16-11 | 2d (832) plus stearic acid (1,136) | 72 | EtO (792). |
| 16-12 | 3d (1,004) plus lauric acid (800) | 72 | EtO (440). |
| 16-13 | ----do---- | 72 | EtO (880). |
| 16-14 | 13d (688) plus lauric acid (800) | 72 | EtO (660). |
| 16-15 | 16d (800) plus lauric acid (800) | 72 | EtO (660). |

| Ex. No. | I | | Weight of oxides added to I in alphabetical order (grams) |
|---|---|---|---|
| | Reactants (grams) | $H_2O$ eliminated (grams) | |
| 16-16 | 28a (1,960) | | |
| 16-17 | 28a (1,960) plus lauric acid (600) | 120 | (A) PrO (580). |
| 16-18 | 28aO (3,054) plus stearic acid (284) | 18 | (A) PrO (116), (B) EtO (1,320). |
| 16-19 | 28aAOA | | |
| 16-20 | 28b (1,400) | | EtO (1,980). |
| 16-21 | 28b (1,400) plus oleic acid (564) | 40 | EtO (2,640). |
| 16-22 | 28bAOA | | |
| 16-23 | 29b (1,635) | | (A) PrO (522), (B) EtO (1,980). |
| 16-24 | 29b (1,635) plus oleic acid (282) | 18 | EtO (1,320). |
| 16-25 | 29bO (2,655) plus oleic acid (282) | 18 | |
| 16-26 | 29bAOA | | |
| 16-27 | 30b (1,580) | | EtO (2,200). |
| 16-28 | 30b (1,580) plus stearic acid (569) | 40 | |
| 16-29 | ----do---- | 40 | |
| 16-30 | 30bAOA | | (A) PrO (464), (B) EtO (1,320). |

(17) USE IN EMULSION FLUIDS FOR DRILLING WELLS

This phase of the invention relates to the use of the compounds of our invention in producing an improved drilling fluid useful in drilling oil and gas wells.

Fluids commonly used for the drilling of oil and gas wells are of two general types: water-base drilling fluids comprising, for example, a clay suspended in water, and small concentrations of electrolytes, such as, for example, a 1% solution of sodium chloride. However, the present compounds provide an improved oil and water drilling emulsion or fluid which is substantially stable in the presence of contaminating formation salts or brines.

This phase of the present invention relates to drilling fluids of improved characteristics prepared by forming emulsions comprising oil, water, the compounds of this invention and, if desired various amounts of finely-divided clay, silica, calcium carbonate, and other materials to control the properties or weight of the drilling fluid.

Of the two general types of oil and water emulsion, i.e., oil-in-water and water-in-oil emulsions, the present invention is primarily concerned with oil-in-water emulsions where the oil is present in the dispersed phase while the water forms the continuous phase.

Various methods may be selectively used in forming well drilling emulsions by means of the agents of the present invention.

If it is desired to prepare a very light or low specific gravity drilling emulsion, a mineral oil, such as crude oil, gas oil, diesel oil, etc., is emulsified directly in water by means of a high speed hopper or a jet device, such as a so-called mud-gun, in the presence of a relatively small quantity, such as from 0.5 to 5% by weight or higher but preferably 2 to 3% by weight, based on the weight of oil plus water, of the compounds of this invention. Depending on the specific gravity of the mineral oil, which should preferably be of a range from 10 to 40° A.P.I., and on the particular specific gravity of the drilling emulsion which it is thus desired to obtain for a particular purpose, for example, for drilling through low pressure formations, the proportion in which oil is emulsified in water can be varied within fairly wide limits, although a ratio of about 25 to 50% by volume of the mineral oil to about 75 to 50% of water has been found to give especially favorable results.

Although in the above instances the present emulsions include only the three components described, that is, water, mineral oil and the emulsifying agent, various other components may be added thereto, if desired, for the purpose of controlling specific properties of the emulsions.

Thus, if it is desired to improve their plastering properties and thus to minimize the so-called filtering losses of the fluid to the formation, a blown asphalt can be added to the emulsion, and preferably to the mineral oil prior to emulsification, in relatively small quantities such as from 5 to 15% on the weight of the mineral oil, as described in Patent No. 2,223,027.

If it is desired to give a greater consistency to the present emulsions and to increase their capacity for carrying drill cuttings, a finely-divided solid and preferably a colloidal material can be admixed with the emulsions, preferably during the emulsification process, to form a stable three-phase emulsion. Thus bentonite may be added in amounts of from 1 to 5% by weight, or ordinary drilling clay in amounts from 1 to 40% by weight on the total weight of the emulsion.

Furthermore, the weight or specific gravity of the present emulsions can be accurately controlled by adding thereto, in a suitably comminuted form, any desired weighting material such as calcium carbonate, barytes, iron oxide, galena, etc. These materials have been found to remain stably suspended in the present emulsions while maintaining the specific gravity thereof within any desired range, such as from 67 to 120 lbs. per cubic foot.

Since the present emulsions are used on drilling installations wherein a drilling fluid of either the water-base or the oil-base type is usually already available, it has been found advantageous to apply the emulsifying agents of the present invention in forming drilling emulsions with these drilling fluids as starting material.

Thus, a water-base drilling fluid comprising water and clay and having a weight such, for example, as 86 lbs. per cubic foot, can be mixed with approximately 25 to 50% by volume of a heavy crude oil with the addition of 2.0 to 3.0% (calculated on the weight of the total mixture) of the instant compounds to give a stable emulsion having a weight of approximately 82 to 72 lbs. per cubic foot.

Likewise, an oil-base drilling fluid comprising, for example, crude oil or a diesel oil and calcium carbonate suspended therein by means of agents such as tall oil and sodium silicate or hydroxide, as described in Patent No. 2,350,154 and having a weight such, for example, as 78 lbs. per cubic foot, may be mixed with approximately from one to three times its volume of water and emulsified therewith with the addition of the instant compounds to give a stable emulsion having a weight of approximately 70 to 66 lbs. per cubic foot.

In this connection, it is especially important to note that the emulsifying action of the present compounds is not in any way impaired by the chemical compounds which are ordinarily used in controlling the viscosity, stability or other properties of such water-base or oil-base drilling fluids.

The drilling emulsions formed in the ways described hereinabove have the following advantages over water-base and oil base drilling fluids; (1) they are considerably less expensive than oil-base drilling fluids so that drilling costs are greatly decreased; (2) their plastering properties are much superior to those of water-base drilling fluids and compare favorably with those of oil-base drilling fluids so that filtering losses to the formation are greatly minimized; (3) they are better adapted than oil-base drilling fluids for surveying wells by electrical logging methods; (4) greater drilling speeds can in general be realized with the drilling emulsions of the present type than with either water-base or oil-base drilling fluids.

The following examples are presented to illustrate the present invention.

*Example*

Drilling emulsions are prepared by emulsifying a Ventura clay water base drilling fluid, treated with 0.3% by weight of sodium hexametaphosphate and weighing about 75 lbs. per cubic foot, with stove oil in the weight ratio of 75% Ventura drilling fluid, 22% stove oil and 3% emulsifier. The emulsifiers employed in producing these emulsions are shown in the following table. These emulsions are useful as drilling fluids.

DRILLING FLUID ADDITIVES

| Ex. No. | I | | Weight of oxides added to I (grams) |
|---|---|---|---|
| | Reactants (grams) | $H_2O$ eliminated (grams) | |
| 17-1 | 1a (439) plus lauric acid (600) | 54 | None. |
| 17-2 | ----do---- | 72 | Do. |
| 17-3 | 2a (568) plus lauric acid (600) | 54 | Do. |
| 17-4 | ----do---- | 72 | Do. |
| 17-5 | 2a (568) plus oleic acid (846) | 54 | EtO (264). |
| 17-6 | ----do---- | 72 | None. |
| 17-7 | 1b (492) plus stearic acid (568) | 36 | Do. |
| 17-8 | ----do---- | 36 | EtO (132). |
| 17-9 | 1c (645) plus lauric acid (600) | 54 | EtO (440). |
| 17-10 | ----do---- | 72 | None. |
| 17-11 | 2d (832) plus oleic acid (1,182) | 72 | Do. |
| 17-12 | ----do---- | 72 | EtO (440). |
| 17-13 | 4d (772) plus oleic acid (1,128) | 72 | None. |
| 17-14 | 13d (688) plus lauric acid (800) | 72 | Do. |
| 17-15 | 16d (800) plus lauric acid (800) | 72 | Do. |

| Ex. No. | I | | Weight of oxides added to I in alphabetical order (grams) |
|---|---|---|---|
| | Reactants (grams) | H₂O eliminated (grams) | |
| 17-16 | 28a (1,960) | | (A) PrO (580). |
| 17-17 | 28a (1,960) plus lauric acid (600) | | (A) PrO (116), (B) EtO (1,320). |
| 17-18 | 28aO (3,054) plus stearic acid (284) | 120 | |
| 17-19 | 28aAOA | 18 | |
| 17-20 | 28b (1,400) | | EtO (1,980). |
| 17-21 | 28b (1,400) plus oleic acid (564) | | EtO (2,640). |
| 17-22 | 28bAOA | 40 | |
| 17-23 | 29b (1,635) | | (A) PrO (522), (B) EtO (1,980). |
| 17-24 | 29b (1,635) plus oleic acid (282) | | EtO (1,320). |
| 17-25 | 29bO (2,655) plus oleic acid (282) | 18 | |
| 17-26 | 29bAOA | 18 | |
| 17-27 | 30b (1,580) | | EtO (2,200). |
| 17-28 | 30b (1,580) plus stearic acid (569) | | |
| 17-29 | ----do---- | 40 | (A) PrO (464), (B) EtO (1,320). |
| 17-30 | 30bAOA | 40 | |

(18) REMOVING MUD SHEATHS FROM OIL WELLS

This phase of our invention relates to the use of the compositions of our invention to remove from a well or from an oil- or gas-bearing formation penetrated by a well, a substantially impervious, mud-like sheathing or coating, resulting from the use of drilling fluids in the drilling operation or resulting from the presence in the hole, at some other time, of fluids capable of producing such sheaths. Such use increases the productivity of a well by providing a novel procedure for removing from the face of the producing formation various solids, such as natural clays, deposited thereon during drilling or subsequently. It makes possible the recovery of oil or other fluids from relatively shallow formations which were penetrated during the drilling to greater depths and which were "mudded-off" by deposition of solids from the drilling fluid.

By the term "mudded-off formation" we mean a formation or stratum, the walls of which have been more or less effectively sealed by an impervious sheath of solids derived from the drilling fluid. Naturally-occurring clays are commonly used to prepare drilling fluids. In some cases, wells "make their own mud," the formations encountered containing clay of such properties that it is unnecessary to import the ingredients for preparing the drilling fluids. Where natural clays are found deficient in one or more properties, they may be conditioned to improve their specific gravity characteristics, their viscosity, or their gelforming propensities by the addition of other materials. For example, weighting materials, such as barite or hematite may be added; or bentonite may be used to improve the viscosity and gel-forming characteristics. In rarer cases, the drilling fluid may be prepared entirely from a weighting material such as barite, and a stabilizer, such as bentonite, in the total absence of naturally-occurring clays or "muds." In this description we shall use the term "mud" to include drilling fluids of any and all of the foregoing types and the term is to be construed to apply to all of them with equal force.

The deleterious effects of drilling muds are of several kinds, the principal one being the deposition of mud sheaths on the face of the formation penetrated. While this deposition of a mud sheath is desirable in the upper portions of the hole, it is extremely undesirable when the producing horizon has been reached. It is also undesirable in the upper strata or portions of the hole when and if it later becomes necessary or desirable to test the productivity of such upper strata.

The problem thereby presented exists in wells drilled into high-pressure formations, as well as in wells penetrating low-pressure areas, and in partially or entirely depleted formations. In semi-depleted fields, where formation pressures have declined to small values, the problem is most serious. There are numerous instances on record where, although wells have been drilled into proven producing horizons, no oil can be commercially produced at present; and where, unless some means is found to remove the sheaths, large reserves of oil will be lost.

Various mechanical means have been employed to remove the sheaths, with only partial success. Washing with water has been attempted, in many cases unsuccessfully. In the case of some oil wells previously washed unsuccessfully with water, application of our process has resulted in the removal of a large amount of mud, usually with very gratifying consequences as to increased productivity.

The process which constitutes this phase of the present invention may be practiced in various ways, and may be applied at various times in the life of a well. It may be applied immediately upon completion of the well, or even prior to completion. It may be used on wells during or upon depletion. It may be used on wells which, upon depletion of a lower formation, or upon the discovery that such deeper formation is unproductive, have been plugged back to higher formations previously disregarded in drilling and which may now be required to be explored. It may be used on wells which, because of the presence of such mud sheaths, have never been productive. Our process is also applicable to those case where the sheaths result from mud introduced into a well subsequent to drilling, e.g., for the purpose of killing the well. It is also applicable to those comparatively rare cases where mud sheaths are deposited during cable-tool drilling.

In some instances, the mud used in drilling or reworking a well infiltrates to a greater or lesser depth into the natural formation where it sets up a barrier to productivity. The present process is applicable to the removal of mud solids occurring as such infiltrated mud sheaths or barriers.

The process constituting this phase of the present invention is not to be confused with any process designed to remove clogging deposits of wax, asphaltic materials, paraffin or the like from wells, or to prevent their deposition. Such deposits of organic materials constitute a recurring problem. On the contrary, once a mud sheath has been removed by means of the present process, it can seldom again constitute a problem in that well.

Our process includes the application of a compound of the kind described to a mud sheath, however produced, which exists in a well, e.g., on the walls of an oil-bearing formation, in such a manner that the relatively impervious sheath is removed and the well is rendered productive or the existing productivity thereof is increased.

In practice, the compounds of the present invention are dissolved in a suitable solvent, for example, water or a water-insoluble organic liquid which is capable of acting as an oil solvent. Depending on the choice of compound, the solubility may be expected to range from ready water-solubility in the free state to water-dispersibility. The salts, and specifically the acetates, generally show improved water-solubility; and we have obtained good results by using salt forms which possess appreciable water-solubility. One of the most common of the oil solvents is the aromatic fraction of petroleum distillates, which is quite generally found to disperse these compounds. Another is the fraction removed from distillates by application of the Edeleanu liquid sulfur dioxide extraction process, and which comprises aromatic and unsaturated compounds. In some cases, stove oil or similar petroleum distillate is usable. Oil solvents like carbon tetrachloride or carbon disulfide are usable, although their comparatively high cost militates against their use. Amylene dichloride is sometimes a desirable material for the present purpose, as are tetrachloromethane, tetralin, trichloroethylene, benzol and its homologues, cyclohexane, etc. This component of our reagent must be water-insoluble and must be an oil solvent. Otherwise, its selection is not limited, although it should be compatible with the other ingredient of our reagent. Naturally, its cost and availability will influence the selection. We prefer to use aromatic petroleum solvent since it is a widely available reagent of low cost and has good properties for the present use.

We do not desire to be limited to any specific water-insoluble organic liquid. All that is required is that it shall be capable of acting as an oil solvent. The choice of liquid employed, however, can be influenced in part by the bottom-hole temperatures expected to be encountered. The character of the oil being produced can also affect the choice, and the character of the mud used in drilling the well can also be important. The choice will frequently depend upon relative cost of solvents.

A mixture of organic liquids having the specific property of dissolving petroleum oil is very effective. One such mixture which we have employed contains benzol, toluol, carbon tetrachloride, tetralin and kerosene. These solvents are exactly those disclosed in Patent No. 2,153,589. The proportions of these solvents recited in said earlier patent are equally satisfactory for use in preparing the present reagents. Such proportions recited in said patent are: benzol, 35 lbs.; toluol, 15 lbs.; carbon tetrachloride, 16 lbs.; tetraline, 40 lbs.; and kerosene, 8 lbs.

To prepare our reagents, one simply mixes the two components (i.e., compounds of the present invention plus a suitable solvent) together in suitable proportions. The optimum proportion of each will vary depending upon its properties; but in general, the resulting mixture should be homogeneous.

Where an organic solvent is employed, the finished solution should produce a relatively stable aqueous dispersion in water. In cases where the two ingredients form thoroughly homogeneous mixtures, which, however, are not water-dispersible, transformation of the compounds of this invention into the salt form will sometimes render the solution water-dispersible. In such cases we have preferably employed acetic acid to effect the neutralization.

The reagents are preferably employed in the form of an aqueous dispersion or solution, although sometimes favorable results are obtained merely by introducing the undiluted compound or the compound dissolved in an organic solvent into the well whose productivity is to be improved. In some of such cases, undoubtedly, there is produced in the well bore, or in the formation, an aqueous dispersion of the reagent in water present in such bore or such formation. Production of an aqueous dispersion from the organic solution and water is accomplished almost spontaneously on mixing the two, in most cases. We greatly prefer to employ the reagents in the form of an aqueous dispersion because in that manner the two components are prevented from separating from each other before the reagent can become effective to remove the mud sheaths.

It is also noteworthy that our present reagents are useful in the presence of acids. They can therefore be applied satisfactorily to wells that have been acidized by the use of hydrochloric or hydrofluoric or other acid. The reagents of Patent 2,153,589, above-mentioned, would react with such acidizing acids to liberate free sulfonated fatty acids which would either be water-insoluble per se or else would readily become water-insoluble on hydrolysis and loss of their acid sulfate radical. The present reagents would be quite stable in the presence of such acidizing acids.

We prefer to employ a considerable excess of our compounds over the amount required to effect dispersion of the water-insoluble organic liquid in water. Such excess further prevents any separation of the phases, thereby enhancing the stability of the dispersion to such an extent that it will remain stable for at least several hours. The excess also acts to lower the surface tension of the whole reagent so that the reagent exhibits a marked penetrating effect and is carried into the crevices and irregularities of the deposit, weakening the bond between the mud sheath and the supporting wall. Also it penetrates the formation to a considerable distance and facilitates the return of drilling water to the hole.

The proportions of oil solvent and active compounds of this invention can be varied within wide limits. For example, we have prepared our reagents in a form in which they contain 4 parts of active compound to 1 part of oil solvent. We have likewise prepared them in a form in which they contain 4 parts of oil solvent to 1 part of active compound. Both forms were relatively stable and did not separate appreciably into their components on standing for protracted periods of time. We have likewise prepared our reagents in a form in which they contain 9 parts of active compound and 1 part of oil solvent; and in a form in which they contain 1 part of active compound per 9 parts of oil solvent. We have determined that the proportion of active compound and oil solvent can advantageously vary within the range of 9:1 and 1:9.

As a preferred example of reagent we employ a 20 weight percent dispersion of active compound in an aromatic petroleum solvent and include 2% of concentrated acetic acid in the finished reagent where the salt formed is desired. We prefer to employ this reagent in the form of a dilute aqueous dispersion of about 5 weight percent concentration. Sometimes aqueous dispersions containing as little as 1% of the reagent are fully effective. Sometimes it is desirable to introduce the reagent in the form of a more concentrated aqueous dispersion as when additional water is expected to be encountered in the well bore or the surrounding formation. The reagent can even be introduced in undiluted form although, as stated above, we prefer not to use it in this form. Thus the amount of active compound present in the treating reagent can range from 1 to 100%, but preferably 5 to 25% by weight based on the weight of treating reagent.

From the foregoing, it will be understood that this phase of our invention includes subjecting a mud sheath of the kind mentioned to the action of a reagent of the kind described. Merely injecting such reagent into a well which has been mudded-off sometimes results in the more or less complete removal of the sheath. Agitating the reagent in the well after it has been injected therein usually produces more favorable results, however. Any of the various methods available for agitating a fluid in the hole, such as swabbing or use of perforation washers, can be applied during the injection of the reagent or before or after the period during which the reagent is allowed to stand quiescent in the well. Agitating the fluid after allowing the reagent to stand in the well for a period of time in order to penetrate and soften the sheaths produces very favorable results. If a perforation washer is employed to agitate the fluid, it may be desirable to "spot" therewith, i.e., inject at various levels, additional quantities of the reagent before agitating.

Our preferred method of cleaning an oil well of mud sheaths is as follows: Remove any debris present in the bottom of the hole, for example, by bailing. Then replace the head of oil standing in the well as completely as possible with a 5 weight percent aqueous solution or dispersion of the reagent. Allow the solution or dispersion to stand in the hole for a suitable period of time. (We have found that a period of standing ranging from 8 to 24 hours produces acceptable results.) Then introduce an additional quantity of solution or dispersion into the well and immediately thereafter agitate the fluid in the well by swabbing or operating a perforation washer therein. After agitating the dispersion in the hole by any desired means, and so scrubbing or washing the sheath from the formation walls (swabbing or other means may be employed if required or desired) to bring additional quantities of mud into the hole, the debris dislodged by the use of our reagent is removed with a bailer or in any other desired manner. The well is preferably not put on the pump until no further amounts, or only small amounts, of mud are being recovered.

The above-recited procedure for operating this process is examplary only. The procedure may be varied as conditions may require. In all cases, however, it consists broadly in the application of our reagent to the mud sheaths; and, of course, subsequently removing from the well the debris accumulated in the well as the result of such application.

It will be obvious that our process is applicable to the removal of any mud sheath present on the perforated pipe in the well in addition to that present on the walls of the formation. However, we consider the removal of the sheath from the formation wall the more important function of our process.

The following is presented to illustrate our invention:

*Example*

A freshly drilled well whose oil flow is slow by the preferred method described above due to the formation of a mud sheath is treated by the preferred method described above with a 5 weight percent aqueous solution of compound 18-1 of the following table for a period of 10 hours. Agitation of the solution is effected by the operation of a perforated washer. The debris dislodged is removed by means of a bailer. After all debris is removed, the well is put on the pump again.

To show the effect of these compounds on mud sheaths, large sections of hardened mud sheaths are removed from actual oil wells and treated with a 5 weight percent aqueous solution or dispersion of the compounds shown in the following table. After standing overnight, the mud sheaths are easily broken into a fine dispersion.

MUD SHEATH REMOVAL AGENT

| Ex. No. | I | | Weight of oxides added to I (grams) |
|---|---|---|---|
| | Reactants (grams) | $H_2O$ eliminated (grams) | |
| 18-1 | 1a (439) plus oleic acid (846) | 54 | EtO (1,320). |
| 18-2 | ___do___ | 72 | EtO (1,540). |
| 18-3 | 6a (1,330) plus oleic acid (846) | 72 | EtO (1,760). |
| 18-4 | 9a (943) plus oleic acid (846) | 72 | EtO (1,980). |
| 18-5 | 1b (492) plus oleic acid (564) | 30 | EtO (1,540). |
| 18-6 | 2b (662) plus lauric acid (400) | 36 | EtO (1,760). |
| 18-7 | ___do___ | 36 | EtO (2,200). |
| 18-8 | 3b (552) plus stearic acid (568) | 36 | EtO (1,320). |
| 18-9 | 1d (660) plus lauric acid (800) | 72 | EtO (1,760). |
| 18-10 | ___do___ | 72 | EtO (2,200). |
| 18-11 | 2d (832) plus oleic acid (1,128) | 72 | EtO (1,848). |
| 18-12 | ___do___ | 72 | EtO (2,550). |
| 18-13 | 4d (772) plus lauric acid (800) | 72 | EtO (1,760). |
| 18-14 | 13d (688) plus Lauric acid (800) | 72 | EtO (2,290). |
| 18-15 | 16d (800) plus lauric acid (800) | 72 | EtO (2,640). |

| Ex. No. | I | | Weight of oxides added to I in alphabetical order (grams) |
|---|---|---|---|
| | Reactants (grams) | $H_2O$ eliminated (grams) | |
| 18-16 | 28a (1,960) | | (A) PrO (580). |
| 18-17 | 28a (1,960) plus lauric acid (600) | 120 | (A) PrO (116), (B) EtO (1,320). |
| 18-18 | 28aO (3,054) plus stearic acid (284) | 18 | |
| 18-19 | 28aAOA | | |
| 18-20 | 28b (1,400) | | EtO (1,980). |
| 18-21 | 28b (1,400) plus oleic acid (564) | 40 | EtO (2,640). |
| 18-22 | 28bAOA | | |
| 18-23 | 29b (1,635) | | (A) PrO (522), (B) EtO (1,980). |
| 18-24 | 29b (1,635) plus oleic acid (282) | 18 | EtO (1,320). |
| 18-25 | 29bO (2,655) plus oleic acid (282) | 18 | |
| 18-26 | 29bAOA | | |
| 18-27 | 30b (1,580) | | EtO (2,200). |
| 18-28 | 30b (1,580) plus stearic acid (569) | 40 | |
| 18-29 | ___do___ | 40 | (A) PrO (464), (B) EtO (1,320). |
| 18-30 | 30bAOA | | |

(19) USE IN THE FOG INHIBITION OF HYDROCARBONS

This phase of our invention relates to the use of the compositions of our invention to produce a fog-inhibited hydrocarbon product when added to a hydrocarbon prduct.

The term "fog," as herein used, does not refer to the aerosol type of fog but, rather, to the cloudiness caused by the presence of minute droplets of an aqueous medium suspended in a hydrocarbon product. In the present application the term "hydrocarbon product" is used with reference to transparent or semi-transparent hydrocarbon products, usually but not invariably overhead fractions such as gasoline, kerosene, diesel fuel, stove oil, gas oil, cleaners' solvent, benzene, toluene, xylene, etc.

Many hydrocarbon products found in commerce contain dissolved water which is precipitable when subjected to reduction in temperature, or other changes in equilibrium, resulting in the precipitation of droplets which are visible as a fog. In other instances, hydrocarbon products are encountered which contain such fogs. Such precipitates are detrimental to the value of such products. This is particularly true in the transparent or semi-transparent hydrocarbon oils where such fogs make the oil less desirable and affect the merchantability of the oil. Particular examples of such products include kerosene, gasoline, stove oil, and the like, which are frequently manufactured in the warmer climate of the Gulf Coast States and then shipped and stored in the Northern States with the result that the oils become fogged or cloudy even though originally clear and bright.

This phase of the invention in its principal aspects is concerned with the prevention, eliminaton or suppression of fog due to precpitation of water particles in hydrocarbon products arising from various causes, particularly temperature drop, instability resulting from super-saturation, etc. This objective is accomplished by the use of minute quantities of additives herein described. This phase of the invention is also concerned with fogs caused by any precpitated aqueous phase or dilute aqueous solution, e.g., a dilute solution of an acid, salt, base or organic compound, as well as pure water. For sake of convenience, any such aqueous media are hereinafter referred to merely as water in view of the fact that it is the aqueous content which gives rise to the problems here solved.

Another important aspect, from the practical standpoint, is the prevention of the precipitation of water from hydrocarbon distillates and other products of conventional refining processes where there has been prior contact with water. Precipitation may then occur during passage through the colder portions of pipe lines. Such precipitated water is frequently highly corrosive and sometimes separates from the hydrocarbon product to produce pockets in the pipe lines.

All hydrocarbon products do not necessarily produce fogs upon reduction in temperature as often met in commerce for various reasons. The present invention is concerned with those hydrocarbon products which are susceptible to fogging.

The prevention or elimination of fogging in hydrocarbon products is a long-recognized problem of commercial importance as is set forth in the issue of National Petroleum News for January 3, 1945, R-63. It has been previously proposed to remove the dissolved moisture from these hydrocarbon products by means of solid desiccating agents such as activated alumina, silica gel, etc. These processes are functional but costly in material, operation and maintenance. In many instances the dissolved water has been removed by blowing the hydrocarbon product with dry air. This method is highly objectionable because of loss of valuable volatile components of the hydrocarbon product and because of the introduction of oxygen into the system, leading to oxidative degradation of the product as manifested by damage to color. Other solutions to the problem are characterized by a mechanical approach.

This phase of our invention represents a practical solution to this problem of inhibiting fog formation, permitting this to be accomplished at a very low cost in materials, equipment and labor, and without any deleterious effect upon the hydrocarbon product. In the present process of prevention of fog formation, the additives are employed in such small amounts as to make the procesed hydrocarbon product identical in all other respects with the untreated product.

This phase of our invention is concerned with the presence or potential presence of only those fogs which are visible, these being detectable by visual or light-transmission methods. Suspended water droplets in a hydrocarbon product produce visible fogs only if the droplets are of minute size. Water droplets of large size do not necessarily produce visible fogs and will often settle out on standing. However, upon cooling of a hydrocarbon product containing dissolved water to saturation, at least a portion of the dissolved water will precipitate as a visible fog, the water droplets being of such small size as to remain in suspension for long periods of time, often indefinitely. Droplets of this size give rise to the fogs with which this invention is concerned.

A perfectly clear hydrocarbon product may contain water to saturation at its existing temperature, in which event a cooling of only a few degrees will usually produce an objectionable fog. If such a clear hydrocarbon product does not contain dissolved water to saturation, cooling to the temperature at which it will be saturated will not produce such a fog, but cooling several degrees lower will. If a hydrocarbon product contains such a fog at an existing temperature it is usually evidence that the dissolved water is present to saturation and that more water will precipitate to increase the fog density if the product is cooled below such existing temperature through a given temperature range. The process contemplates incorporation of a minute quantity of a compound of this invention into the hydrocarbon product to clear such an existing fog and inhibit the hydrocarbon product against fog formation when cooled through such range.

The amount of water which can be dissolved in a hydrocarbon product depends upon the particular product and the ambient temperature. The solubility of water in the lighter petroleum fractions such as gasoline is about 0.01% at ordinary temperatures. That for the heavier fractions may be considerably less, whereas aromatic hydrocarbons such as benzene may dissolve water to the extent of approximately 0.1%. As to temperature, there is approximately a tenfold increase in solubility for a 100° F. temperature difference. A fog may result from the solubility decrease due to a small temperature drop and may be visible when the precipitated water is only a few thousandths of a percent. An objectionable fog may appear with a temperature drop of approximately 10° F. or less.

Hydrocarbon products can be protected against fogging upon temperature reduction by subjecting the product to the action of extremely minute amounts of our compounds. Also, by employing somewhat larger, though still minute, amounts of such agents, existing fogs can be eliminated and the hydrocarbon product protected to the same extent against later fogging upon reduction in temperature. These agents can be added directly to the hydrocarbon product. However, it is preferable and more convenient to dissolve our compounds in an oil miscible with the hydrocarbon product to form a reagent solution which is then mixed with the hydrocarbon product. The oil is usually a hydrocarbon and its quantity, while not critical, should be minimized. Inclusion of water in the reagent solution should be minimized, it being desirable to use an essentially anhydrous solvent for these agents.

As to the optimum amount of the additive used, this will depend on the amount of the particular agent in terms of absolute concentration, the amount, if any, of fog already present and which is to be cleared, and the temperature range over which protection against fog formation is desired. As to this last factor, protection over a temperature differential of about 40° F. is usually sufficient commercially, e.g., over a temperature range of about 75° F. to 35° F.

Using this temperature range as a criterion and assuming that no substantial fog is initially present, the addition of our compounds in minute amounts varying from as little as one part in 50,000 or even less, to as much as one part in about 2500 is sufficient, ratios or percentages herein being expressed on a volume basis. Such amounts, for example, are amply sufficient on California diesel fuels and Gulf Coast furnace oils. If there is initially present in the hydrocarbon product a fog resulting from the precipitation of water due to prior cooling to the existing temperature, this fog can be cleared and some protection given against later fog formation, if cooled below the existing temperature, by use of the exemplified amounts. In effect, if addition of one part in 6000 to a saturated but essentially fog free hydrocarbon product at 75° F. will protect against fogs with reduction in temperature to 35° F., addition of the same amount to a fogged hydrocarbon product at, say, 60° F. will clear the fog and protect against fogs to a temperature of about 35° F. In this latter instance, if full protection against a 40° F. temperature drop below 60° F. is required, slightly more than one part in 6000 should be used.

Protection to a temperature of about 35° F. is usually sufficient in commerce as the hydrocarbon product at that temperature contains so little dissolved water that further cooling will not produce a significant additional quantity of fog. However, if protection from 100° F. or above down to 35° is desired, the ratios of reagent to oil, given above, should be increased substantially in proportion to the increased solubilitities at the higher temperatures.

The agent can be added to the hydrocarbon product at any existing temperature. However, in treating high-temperature products, e.g., products issuing from distillation equipment at temperatures of 100° F. or higher, it is often preferable to cool the product to some temperature intermediate the highest and the lowest temperatures between which protection against fog is desired and to add the agent at such intermediate temperature in amount sufficient to clear any fog formed during the cooling and sufficient to protect against fog formation during later cooling to such lowest temperature at which protection is desired.

In the commercial application of the process it is desirable to add the fog suppressant at the lowest convenient temperature. On cooling to this temperature, some of the water precipitated from solution may, in some instances, separate. In this event the fog suppressant need be added only in the amount determined by the fog and dissolved water remaining and not by the entire original water content.

The agent should be soluble, in the ratios used, in the hydrocarbon product or in the aqueous medium therein. In view of the minute amounts employed in the process, substantially all of the compounds of our invention fulfill this requirement.

The process is not to be confused with dehydration processes where emulsions, usually of crude oil and dispersed brine, are mixed with de-emulsifiying agents to destabilize the oil-water interfaces so that coalescense of the dispersed droplets occurs when a controlled agitation brings two droplets into contact. In such processes the coalescence is continued until the coalesced masses are of such size as to gravitate from the oil. In the present process there is no coalescence and separation of the aqueous droplets and the over-all aqueous content of the hydrocarbon product remains the same albeit any existing fog is caused to disappear. The amount of aqueous medium present must not substantially exceed that which the hydrocarbon product can take up after our compounds have been added and at the lowest temperature at which protection is desired. If the hydrocarbon product contains more than such small amount of aqueous medium it should be dehydrated by other methods before applying the process of the present invention. The present process is best suited to hydrocarbon products supersaturated with less than 0.01% of the aqueous medium or to hydrocarbon products containing dissolved water not substantially in excess of the amount required to saturate the hydrocarbon product at about 150° F. when the agent is not present.

A visual determination of the necessary amount of reagent to be employed is often satisfactory. In such a determination, a sample of the hydrocarbon product, which has been carefully excluded from agitation with air, is introduced into a 4-oz. screw-cap glass bottle so as to fill it within a few tenths of a milliliter of its total capacity. The reagent, usually, a dilute solution in oil, is then added in a predetermnied amount and the tightly closed bottle immersed in a cooling bath. The bottle is observed periodically until the desired cooling has been attained and the degree of fog formation is then visually observed in diffused daylight. For detection of extremely slight fog formation, the direct rays of the sun are used for the examination. The comparative degree of fog formation can be determined by comparison with a control bottle containing the same hydrocarbon product and which has been subjected to the same treatment except for the addition of the reagent.

The following examples are presented by way of illustration.

*Examples*

A California light diesel fuel is saturated with water at 75° F. The addition of 0.5 part, by volume, of the compositions shown in the following table per 1000 parts of the saturated fuel prevents the formation of fog when the temperature is reduced to 35° F. Without the addition of such additives a fog forms when the diesel fuel is cooled to 35° F.

Similar reductions in cloud point are noted employing these compositions with other fuels, namely gasoline, kerosene, stove oil and Stoddard solvent.

HYDROCARBON FOG INHIBITORS

| Ex. No. | I | | Weight of oxides added to I (grams) |
|---|---|---|---|
| | Reactants (grams) | $H_2O$ eliminated (grams) | |
| 19-1 | 1a (439) plus oleic acid (846) | 54 | EtO (660). |
| 19-2 | ----do---- | 72 | EtO (528). |
| 19-3 | 1a (439) plus lauric acid (600) | 54 | EtO (440). |
| 19-4 | ----do---- | 72 | EtO (352). |
| 19-5 | 2a (568) plus lauric acid (600) | 54 | EtO (440). |
| 19-6 | ----do---- | 72 | EtO (396). |
| 19-7 | 3a (697) plus oleic acid (846) | 54 | EtO (660). |
| 19-8 | 1b (492) plus oleic acid (564) | 36 | EtO (528). |
| 19-9 | 2b (662) plus lauric acid (400) | 36 | EtO (660). |
| 19-10 | 1c (645) plus lauric acid (600) | 54 | EtO (792). |
| 19-11 | 3c (907) plus lauric acid (600) | 54 | EtO (880). |
| 19-12 | 1d (660) plus oleic acid (1,128) | 72 | EtO (880). |
| 19-13 | 2d (832) plus stearic acid (1,136) | 72 | EtO (1,100). |
| 19-14 | 4d (772) plus stearic acid (1,136) | 72 | EtO (880). |
| 19-15 | 16d (800) plus stearic acid (1,136) | 72 | EtO (1,100). |

| Ex. No. | I | | Weight of oxides added to I in alphabetical order (grams) |
|---|---|---|---|
| | Reactants (gram) | $H_2O$ eliminated (grams) | |
| 19-16 | 28a (1,960) | | (A) PrO (580). |
| 19-17 | 28a (1,960) plus lauric acid (600) | 120 | (A) PrO (116), (B) EtO (1,320). |
| 19-18 | 28aO (3,054) plus stearic acid (284) | 18 | |
| 19-19 | 28aAOA | | |
| 19-20 | 28b (1,400) | | EtO (1,980). |
| 19-21 | 28b (1,400) plus oleic acid (564) | 40 | EtO (2,640). |
| 19-22 | 28bAOA | | |
| 19-23 | 29b (1,635) | | (A) PrO (522), (B) EtO (1,980). |
| 19-24 | 29b (1,635) plus oleic acid (282) | 18 | EtO (1,320). |
| 19-25 | 29bO (2,655) plus oleic acid (282) | 18 | |
| 19-26 | 29bAOA | | |
| 19-27 | 30b (1,580) | | EtO (2,200). |
| 19-28 | 30b (1,580) plus stearic acid (569) | 40 | |
| 19-29 | do | 40 | (A) PrO (464), (B) EtO (1,320). |
| 19-30 | 30bAOA | | |

(20) USE IN FRACTURING OIL WELLS

This phase of the invention relates to the use of the composition of our invention in wells, especially those drilled for oil or gas, to facilitate the flow of fluids in an earth formation penetrated by the bore of a well by the injection into the formation through the well bore of liquids carrying in suspension particulated solids.

Among the methods in current use for facilitating flow of fluid either into or out of earth formations penetrated by the bore of a well are those involving liquid injection into the earth through the well bore at hydrostatic pressures great enough to form channels or passageways by fracturing or parting the earth formations into which the liquid is injected. In such injections, the pressures used are oftentimes greater than those required to lift the overburden of earth and at least great enough to exceed the bonding strength of the formations encountered. While it is apparent that fractures or cracks may be formed in oil- or gas-bearing formations by the hydraulic action described, as a result of which the facility with which oil or gas flows to the well may be increased, the difficulty may arise that on releasing the pressure on the injected liquid used to create the fractures or cracks these tend to close due to the weight of the overburden. As a consequence, it is generally the practice during fracturing to convey into the earth a particulated hard solid material, such as sand in suspension in the fracturing medium. The particulated solids on being carried into the fractures or cracks formed by the high pressure hydraulic action described, act as props and hold open the fractures and cracks after the injection pressure is released. But certain disadvantages inure to this practice which limits its usefulness. Among these are that the particulated solids comprising the propping agent do not remain suspended in the liquid media conventionally used to convey the solids into the earth formation. These media are hydrocarbon liquids, such as gasoline, kerosene, crude oil, and the like, generally rendered more viscous by dissolving therein a thickening agent, such as soap. As a consequence of the tendency for the particulated solids to settle in all such conveying media, special mixing facilities must be provided at the well site to mix, and maintain in suspension, the particulated solids in the conveying medium while making the injection into the well. The thickened or viscous oils oftentimes conventionally used have the added disadvantage that they are difficult to pump through the well tubing and do not return from the earth formation after their injection so that an especial treatment of the earth formation is required to purge it of the injected liquid. Still another disadvantage is that if, during an injection into the well of the conventional mixture of conveying liquid and particulated solid, it should become necessary to stop the injection, settling out of the propping agent occurs in the injection pump and piping connecting the pump with the well and in the well bore or well tubing, if such be used, making it difficult, if not impossible, to restart the injection operation.

The compositions of our invention are excellent emulsifiers in these systems and so provide an improved method of treating earth formation penetrated by the bore of a well, so as to facilitate flow of fluid into or out of the earth formation, involving the conveying of particulated solids, e.g., sand, through the well into the earth formation, whereby the foregoing disadvantages are overcome.

This phase of the invention is predicated upon forming a pumpable fluid emulsion, comprising immiscible liquids, mixing therewith a suitable particulated solid material, and then injecting the resulting mixture into the earth formation through the well. The particles of the solid material or propping agent are entrained in the emulsion at the interface between the particles of the liquid phases of the emulsion and thereby are held in substantially permanent suspension without the need for continuous agitation during injection. The emulsion mixture is easily pumped and either readily penetrates permeable earth formation or can be forced into the earth by the application of sufficient pressure. On passing into the earth formation, the emulsion spontaneously breaks thereby releasing the particles of propping agent which become lodged in the fractures or cracks of the formation into which the injection is made. The solid particles so deposited form permeable masses which hold apart the walls of the fractures, permit the return to the well hole of the emulsion liquids without returning the solid particles when the injection pressure is released, and facilitate oil flow either out of or into the formation.

In carrying out the invention at least two immiscible liquids are emulsified together in the presence of a suitable emulsifying agent, that is, one such that the emulsion obtained is capable of being injected into the interstices of an earth formation under moderate pressure and of spontaneously therein breaking. In this way, relatively low pumping pressures suffice to make the injection, and, deposition in the earth formation of the particulated solids carried into the formation by the emulsion is assured when the emulsion breaks. Suitable emulsions are obtained when one of the immiscible liquids involved constitutes the major portion of the emulsion. Proportions of near equal parts of each immiscible liquid are generally to be avoided. In other words, one of the liquids, exclusive of the emulsifying agent, should constitute substantially more than half of the emulsion, e.g., from about 55 to 98.5 percent by volume or preferably from about 66 to 97 percent of the emulsion.

For reasons of cheapness and availability, one of the liquids is preferably aqueous and may be any ground water either potable, saline, alkaline or acid, the purity of the water used apparently not being critical. A wide variety of liquids which are immiscible with the aqueous liquids are available. For example, there may be used petroleum oil, such as crude oil, petroleum fractions, such as refined oil, kerosene, gasoline, diesel oil, fuel oil, and the like, or other water immiscible hydrocarbon liquid, such as benzene, xylene, toluene, and the like.

If, in employing an aqueous liquid, it be acidified, the further advantage is realized of dissolving acid-soluble material in the earth formation and producing pore enlargement as a result. In addition, there is obtained a quick demulsification of the emulsion as its acid component becomes neutralized in the earth formation, thereby allowing the well to be put into production as soon after the injection as the necessary changes in piping at the well head can be arranged. For example, in an emulsion of dilute hydrochloric acid in oil containing an admixture of 1.5 pounds of 20 to 40 mesh Ottawa sand per gallon, the sand does not noticeably settle in an hour but by contacting the mixture of the emulsion and sand with either earth formation material containing acid-soluble matter or fine sand the emulsion loses its ability to keep the Ottawa sand in suspension and the Ottawa sand settles at the rate of at least 2000 inches per hour. In formulating emulsions using an acidified aqueous solution as one of the immiscible liquids, ordinary aqueous hydrochloric acid may be used such as that containing from about 2 to 25 percent of HCl by weight, although other concentrations may be used. A preferred concentration of the HCl is about 15 percent.

In making the emulsion, the emulsifier is preferably first mixed with the liquid in which it most readily disperses or dissolves, this liquid being the one which usually constitutes less than half of the volume of the emulsion. Emulsification of the liquids is effected in any of the ways known in the art of making emulsions. A generally satisfactory method is to stir together vigorously the liquids to be emulsified in the presence of an emulsifying agent, and, at the same time recirculate the resulting mixture. Recirculation may be accomplished by withdrawing the stirred mixture from the mixing zone and pumping it back by means of a force pump through a small orifice, e.g., one having an opening $3/16$ inch in diameter.

The emulsion produced in our process possesses sufficient stability to remain unbroken for considerable periods of time and in some instances at moderately elevated temperatures, such as those encountered in deep wells. It is desirable for the emulsion to remain unbroken for as long as 30 minutes more or less, for example, and preferably longer in some cases to allow adequate time both for mixing the particulated solid material with the emulsion and for making the injection of the resulting slurry into the earth formation. The emulsion is also capable of being injected into the earth formation and spontaneously breaking on passing into the interstices of the earth formation as aforesaid. The amount of emulsifying agent required may be ascertained by trial and usually ranges from about 0.5 to 12 percent of the combined weight of the liquids to be emulsified.

Preferably as soon as the emulsion is made and the well is ready for treatment, the desired particulated solid material to be conveyed into the earth formation through the well is mixed with the emulsion in suitable proportions in any convenient manner to form a pumpable slurry. The proportions do not appear to be sharply critical and may range, for example, from about 0.5 to 6 pounds per gallon of emulsion. Various solid materials in particulate form may be used which are insoluble in the emulsion as for example, ceramic materials, metals, and rocks. Sand, because of its hardness, cheapness and general availability, is preferred. The particle sizes may vary over a considerable range. The particles should be small enough to pass into the cracks or fractures existing in the formation or produced during the injection treatment but not so small as to exhibit a low fluid permeability when deposited within the earth formation. In general, particle sizes between these extremes are to be used. Generally useful sizes of particles are those which will pass through a No. 20 standard sieve while being retained upon a No. 40 standard sieve. Other sizes may be used such as those between a No. 4 and a No. 120 standard sieve.

In order to assist in delivering the slurry to the particular formation to be treated, a packer may be placed in the well hole or casing, as the case may be, at a suitable depth. The packing means may be either the single or dual variety and set in the well by means of a string of tubing, as understood in the art. In this way, the treating materials to be injected are confined in the well hole adjacent to the formation to be treated and there may be put under sufficient pressure to cause them to enter the formation.

Passage of the slurry, that is, the mixture of particulated solid material and the emulsion, into the earth may be preceded by an injection of a breakdown liquid such as crude oil or other available liquid or by an injection of the emulsion without the particulated soild. The injection of the breakdown liquid is made at rates comparable to those to be employed in injecting the slurry such as ½ to 5 barrels per minute or more depending upon the capacity of the pumping equipment and the pressures encountered which should not be allowed to exceed the safe working pressures of the well equipment.

During the breakdown injection, the pressure in the well rises, reaches a maximum, and then declines, thereby indicating that rupturing or fracturing of the earth formation or removal of fluid blocks in the interstices of the earth formation has occurred. In any event, irrespective of the explanation of the causes of the pressure changes during such an injection, the injection of breakdown liquid serves to insure passage into the formation of the slurry subsequently injected. In some instances the breakdown of the formation before injecting the slurry may be omitted. In such instances, it is usual for the injection pressure to pass through a maximum as in the case of the injection of a breakdown liquid. Omission of the injection of the breakdown liquid ahead of the slurry is not advisable where there is the possibility of the particulated solid becoming separated from the emulsion at the face of the formation as by filtration. It has been found that by preceding the slurry injection with an injection of oil or other breakdown liquid, as aforesaid, at rates producing a breakdown of the formation as evidenced by a change from a rising to a declining pressure occurring during the injection (without substantially changing the injection rate) the risk of the particulated solid material filtering out of the slurry at the face of the formation is reduced, if not eliminated.

The volume of breakdown liquid and of slurry to use varies widely with different earth formations and is best determined by experience using as a guide at least the amount required to produce a breakdown pressure at nominal injection rates. For example, it is a common experience in making such injections, say at about 2.5 barrels per minute, to observe a rise in the injection pressure during the initial stages of the injection and to observe a leveling off in pressure after 3 to 20 barrels of liquid has been injected. The leveling off in pressure is usually followed by a more or less sudden decline in pressure as though a break-through of the passage of liquid into the formation has taken place which permits a higher injection rate without a pressure increase.

After a breakdown of the formation is obtained, the slurry may be injected readily in an amount which is preferably at least as large as, if not larger than, the volume of liquid required to reach a breakdown pressure. For example, volumes of slurry of from 1000 to 30,000 gallons have been used effectively. It is to be understood however that the injection of the slurry sometimes can be made without attaining a breakdown pressure either before or during the slurry injection. Nevertheless injection is facilitated by introducing slurry-free liquid into the well ahead of the slurry as aforesaid.

Where it is desirable to avoid freezing of the emulsion formed with water as one of the immiscible liquids, there may be added to the water a water-soluble alcohol, e.g., ethyl alcohol, in amount sufficient to lower the freezing point of the water to the desired extent. Temperatures as low as −40° F. may be withstood when sufficient alcohol is used.

Among the advantages of the process are that particulated solid materials, e.g., sand, are readily conveyed in an emulsion as pumpable slurry through either the well casing, tubing string, or open well bore into the desired formation; the injection of the slurry is not seriously impeded by the emulsions as these readily enter fluid permeable earth, particularly when preceded by an injection of oil or other breakdown liquid; the particulated solids are rapidly released from suspension in the conveying media as these lose their emulsified condition in the interstices of the earth formation; because the particulated solids are released from the conveying medium as the slurry permeates the earth formation no further treatment of the earth formation is required following the injection of the slurry and time is saved in putting the well back into production and obtaining pipe line oil.

The following examples are presented as illustrative of the practice of this invention:

*Example*

About 100 pounds of compound 20-1 (shown in the following table) are dissolved in about 140 gallons of kerosene, thereby making a solution which is to become the external phase of a water-in-oil type of emulsion. To the mixture so-obtained is added about 350 gallons of 5 percent aqueous hydrochloric acid solution and the resulting mixture is stirred until a thick creamy emulsion is obtained. 400 pounds of sand is then stirred into the emulsion, thereby producing an emulsion-sand slurry which is then ready for injection into an oil well as in treating producing formations. The injection of the slurry is preceded by an injection of oil to break-down the formation. A chaser of oil is used to displace the slurry from the well into the well's productive formation. After the injection of the slurry into the well's productive formation, the emulsion breaks thereby depositing the sand from the emulsion in passages in the producing formation. Following the injection, the well is swabbed. The sand remains behind while oil flows freely from the formation into the well.

Suitable fracturing emulsions are also prepared in this manner from the compounds listed below.

COMPOUNDS USED IN FRACTURING WELLS

| Ex. No. | I Reactants (grams) | H₂O eliminated (grams) | Weight of oxides added to I (grams) |
|---|---|---|---|
| 20-1 | 1a (439) plus oleic acid (846) | 54 | None. |
| 20-2 | ----do---- | 72 | Do. |
| 20-3 | 1a (439) plus lauric acid (600) | 54 | Do. |
| 20-4 | ----do---- | 72 | Do. |
| 20-5 | 2a (568) plus stearic acid (852) | 54 | Do. |
| 20-6 | 3a (697) plus stearic acid (852) | 54 | Do. |
| 20-7 | ----do---- | 72 | Do. |
| 20-8 | 1b (492) plus stearic acid (568) | 36 | Do. |
| 20-9 | 2c (774) plus lauric acid (600) | 54 | Do. |
| 20-10 | 1d (660) plus lauric acid (800) | 72 | Do. |
| 20-11 | ----do---- | 108 | Do. |
| 20-12 | 3d (1004) plus oleic acid (1128) | 72 | Do. |
| 20-13 | 16d (800) plus oleic acid (1128) | 72 | Do. |
| 20-14 | 1a (439) plus oleic acid (846) | 54 | PrO (174). |
| 20-15 | ----do---- | 54 | BuO (144). |
| 20-16 | ----do---- | 54 | Octylene oxide (256). |
| 20-17 | ----do---- | 54 | Styrene oxide (260). |

| Ex. No. | I Reactants (grams) | H₂O eliminated (grams) | Weight of oxides added to I in alphabetical order (grams) |
|---|---|---|---|
| 20-18 | 28a (1,960) | | (A) PrO (580). |
| 20-19 | 28a (1,960) plus lauric acid (600) | 120 | (A) PrO (116), (B) EtO (1,320). |
| 20-20 | 28aO (3,054) plus stearic acid (284) | 18 | |
| 20-21 | 28aAOA | | |
| 20-22 | 28b (1,400) | | EtO (1,980). |
| 20-23 | 28b (1,400) plus oleic acid (564) | 40 | EtO (2,640). |
| 20-24 | 28bAOA | | |
| 20-25 | 29b (1,635) | | (A) PrO (522), (B) EtO (1,980). |
| 20-26 | 29b (1,635) plus oleic acid (282) | 18 | EtO (1,320). |
| 20-27 | 29bO (2,655) plus oleic acid (282) | 18 | |
| 20-28 | 29bAOA | | |
| 20-29 | 30b (1,580) | | EtO (2,200). |
| 20-30 | 30b (1,580) plus stearic acid (569) | 40 | |
| 20-31 | ----do---- | 40 | (A) PrO (464), (B) EtO (1,320). |
| 20-32 | 30bAOA | | |

(21) USE FOR GASOLINE ANTI-OXIDANTS

This phase of our invention relates to the use of the compounds of our invention as antioxidants in gasoline.

With the advent of antiknock gasoline, the problems of gasoline stability as to color, gum content and knock rating have become of great importance. Some cracked and straight run gasolines of high quality which are satisfactory for use at the time they are blended deteriorate in storage so that they become darker in color, higher in gum content and of lessened knock rating. Loss of antiknock rating seriously lessens the market value of the gasoline, while gum is likely to deposit in engine induction systems.

Induction system deposits may be the cause of serious operational difficulties, for the accumulation of deposits in the fuel-air induction passageway diminishes its size and therefore diminishes the maximum air flow which the passage is capable of delivering to the engine. The effect of such deposits on engine performance are manifested whenever the engine is operated at or near full throttle as a reduction in power output due directly to the reduction in air flow. In addition, if the engine is equipped with a gear-driven supercharger, deposits may form on the diffuser plate and impeller, overloading the impeller space and possibly resulting in mechanical failure of the supercharger.

Drastic chemical treatment will stabilize cracked gasoline but it is costly because of the losses it entails, particularly in gasoline of high knock rating, and because it is accompanied by destruction or degrading of components having valuable antiknock properties. Chemical treatment is, therefore, undesirable and has in the past been minimized or avoided altogether.

When the compounds of our invention are incorporated in gasoline, they are effective therein, not only to inhibit the formation of gum, but also to prevent formation of deposits in the induction system of internal combustion engines. Fuels comprising the compounds of the invention are, therefore, characterized by improved stability and a lower apparent gum content due to a reduction in the amount of gum deposited during use.

In practice one or a mixture of two or more compounds prepared in accordance with the invention are blended into the fuel at the refinery. Since the compounds are liquids and quite soluble in hydrocarbon fuels derived from petroleum, incorporation is easily accomplished by simply adding the compound, usually in an amount between 0.001% and 0.10% by weight, based on the fuel, and preferably 0.001 to 0.01% by weight, into the fuel blend. In general, depending upon the grade of gasoline, it is desirable to employ proportions within the following ranges:

PREMIUM GRADE GASOLINE BLENDS

| | |
|---|---|
| Catalytic reformate gasoline | 50 to 60% by volume. |
| Catalytically cracked gasoline | 15 to 25% by volume. |
| Catalytically cracked rerun gasoline | 10 to 20% by volume. |
| Tetraethyl lead | 0.5 to 3.0 cc. per gallon. |
| Inhibitor | 0.001 to 0.1% by weight. |

Butane in sufficient amount to obtain a Reid vapor pressure of 8 to 15 pounds per square inch, depending on the season of the year.

REGULAR GRADE GASOLINE BLENDS

| | |
|---|---|
| Mixed catalytically and thermally cracked petroleum distillate | 75 to 90% by volume. |
| Straight run gasoline | 5 to 20% by volume. |
| Catalytic polymer gasoline | 3 to 10% by volume. |
| Tetraethyl lead | 0.5 to 3.0 cc. per gallon. |
| Inhibitor | 0.001 to 0.1% by weight. |

Butane in sufficient amount to obtain a Reid vapor pressure of 8 to 15 pounds per square inch, depending on the season of the year.

Fuels in accordance with the invention are characterized by improved oxidation stability, remaining practically unchanged even after four weeks' storage in air at fairly high summer temperatures. Because of their improved stability, gum formation is minimized.

The gum present in gasoline may be thought of as consisting of two types "preformed" or actual gum, composed of nonvolatile organic materials, and "potential" gum, composed of oxidizable unsaturated hydrocarbons initially volatile but which, during storage, change in character and become non-volatile, i.e., preformed gum. It is generally agreed that only the preformed gum will deposit in the induction system of an engine. The potential gum is of little significance with respect to engine deposits, although its rate of conversion to preformed gum indicates to some degree the stability of the gasoline in storage. Thus the term "gum" is used throughout this specification and claims to refer to preformed gum. It will be evident from the above discussion that, in terms of this definition, the inhibitors of the invention tend to prevent conversion of potential gum into preformed gum, and also to prevent deposition of preformed gum in the induction system and power section of the engine.

The following examples are presented to illustrate the present invention:

*Examples*

A gasoline blend is prepared containing 61% catalytic reformate, 20% catalytically cracked gasoline, 15% catalytically cracked rerun gasoline, 4% butane, and 3.0 cc./gal. of tetraethyl lead. The octane number is 99.6. To separate 4 gallon portions of this blend is added 0.002 weight percent, based on the weight of gasoline blend, of each of the compounds of the following table. One portion, taken as a control, contains no inhibitor.

As a measure of the effectiveness of these compounds as oxidation inhibitors, each four gallon portion is stored in 5 gallon tightly closed cans and samples taken at intervals of one and 4 weeks for testing. Storage temperatures are in the range of 80-90° F. Tests are made to determine the amount of preformed gum by deposition in accordance with ASTM test, Designation D381–46. This test shows the inhibitors of the present invention to be extremely effective in preventing gum formation.

The effectiveness of these inhibitors is also demonstrated by running similar tests using the above compounds with fuels containing 69% by volume of mixed catalytically and thermally cracked gasoline, 31.3% straight run gasoline, and 0.005% by weight of inhibitor. Similar improvements are noted.

GASOLINE ANTIOXIDANTS

| Ex. No. | I | | Weight of oxides added to I (grams) |
|---|---|---|---|
| | Reactants (grams) | $H_2O$ eliminated (grams) | |
| 21-1 | 1a (439) plus oleic acid (846) | 54 | None. |
| 21-2 | ----do---- | 72 | Do. |
| 21-3 | 2a (568) plus palmitic acid (769) | 54 | Do. |
| 21-4 | ----do---- | 72 | Do. |
| 21-5 | 3a (679) plus myristic acid (685) | 54 | Do. |
| 21-6 | ----do---- | 72 | Do. |
| 21-7 | 1b (492) plus lauric acid (400) | 36 | Do. |
| 21-8 | 2b (662) plus lauric acid (400) | 36 | Do. |
| 21-9 | 1c (645) plus lauric acid (600) | 54 | Do. |
| 21-10 | 1d (660) plus oleic acid (1,128) | 72 | Do. |
| 21-11 | 3d (1,004) plus lauric acid (800) | 72 | Do. |
| 21-12 | 1a (439) plus oleic acid (846) | 54 | PrO (144). |
| 21-13 | ----do---- | 54 | BuO (216). |
| 21-14 | ----do---- | 54 | Octylene oxide (256). |
| 21-15 | ----do---- | 54 | Styrene oxide (260). |

| Ex. No. | I | | Weight of oxides added to I in alphabetical order (grams) |
|---|---|---|---|
| | Reactants (grams) | H₂O eliminated (grams) | |
| 21-16 | 28a (1,960) | | (A) PrO (54,520), (B) EtO (1,750). |
| 21-17 | 28a (1,960) plus lauric acid (600) | 120 | |
| 21-18 | ----do---- | 120 | PrO (12,000). |
| 21-19 | 28aO (3,054) plus stearic acid (284) | 18 | |
| 21-20 | 28aAOA | | |
| 21-21 | 28b (1,400) | | (A) PrO (8,240), (B) EtO (1,200). |
| 21-22 | 28b (1,400) plus oleic acid (564) | 40 | |
| 21-23 | ----do---- | 40 | BuO (1,230). |
| 21-24 | 28bAOA | | |
| 21-25 | 29b (1,635) | | (A) PrO (7,470), (B) EtO (730). |
| 21-26 | 29b (1,635) plus oleic acid (282) | 18 | (A) BuO (870), (B) PrO (360). |
| 21-27 | 29bAOA | | |
| 21-28 | 30b (1,580) | | (A) PrO (12,150). |
| 21-29 | 30b (1,580) plus stearic acid (569) | 40 | |
| 21-30 | ----do---- | 40 | BuO (360). |
| 21-31 | 30bAOA | | |

(22) USE IN A PARAFFIN SOLVENT

This phase of our invention relates to the use of the compositions of this invention in a process for preventing and/or removing accumulations of solid matter from oil wells and pipe lines, and thereby improving their productivity and capacity.

In many oil wells, deposits of paraffin, wax, asphaltic and bituminous organic solids, and similar materials accumulate in objectionable quantities on the face of the producing formation, on the screen or liner, or in the pump, the casing or the tubing of the well. Such deposits operate to decrease materially the productivity of the wells in which they occur. Similarly, deposits of the same character are found in some oil flow lines and oil pipe lines where they effectively reduce the capacity of the pipes, sometimes to the point where little or no fluid can be passed through such conduits in the normal manner of operation.

The accumulations with which this phase of the invention is concerned are to be distinguished at the outset from accumulations of mud solids in the form of mud sheaths. The present deposits quite naturally and frequently contain minor proportions of inorganic materials like sand or shale fragments from the productive formation, or minor proportions of residual drilling mud solids of the character of clay or weighting materials. They are, however, essentially organic in character; whereas, drilling mud solids are essentially inorganic in nature.

Further to distinguish the two types of deposits and the character of the respective problems they present, it should be noted that mud solids are ordinarily deposited in a well, or in or on a geological formation penetrated by a well, as a result of the drilling operation or some subsequent servicing operation, like "killing" the well with mud. Such man-produced mud deposits or mud sheaths constitute non-recurring deposits. Once such a deposit or sheath has been removed, it seldom again appears or occurs in that well.

On the contrary, the organic deposits, with the removal of which this present process is concerned, are essentially progressive deposits produced naturally during the operation of the well and its accessories. Whereas the mud sheaths occur only at the geological formations penetrated during drilling of the well, the present organic deposits may occur at or in the formation, at various levels in the well itself, or at various points in the transportation lines reaching from the well to the refinery, including tanks. Their deposition is progressive, or, if they are removed periodically, they may be said to be recurring. Such removal is usually only intentionally achieved; but in some instances, such organic deposits "slough off" their supporting metallic structure. In such instances they give the appearance of being recurring because continuing deposition soon produces a new accumulation of appreciable and detectable proportions.

Although such organic deposits may at times contain minor proportions of inorganic materials like sand, such inorganic components are not material to the deposition of the organic accumulations, their essential characteristics, or their removal by the process constituting this phase of our invention. In a sense, the minor inorganic constituents are the result of entrapments by the waxy, sticky, or gummy organic material constituting the bulk of the ultimate deposit.

The purpose of removing such deposits is obvious. In some areas wells decline in productivity, at a more or less rapid rate, because of deposition of such deposits on the face of the producing formation. In some cases, the decline is sufficiently rapid that the wells must be serviced in some manner or other at a frequency ranging from several days to several weeks. In some instances, the deposition is so slow that servicing at long intervals is sufficient to maintain the well at a satisfactory level of productivity. The same is true of the various conduits through which the oil travels from the well to the refinery; and periodic servicing of such elements is also required. The capacity of a conduit of circular cross-section is reduced greatly by such deposits, usually well beyond the reduction expected from the ratio of effective cross-sectional areas of the clean conduit and the fouled conduit. Where organic deposits of the present type occur on formation walls, well productivity may fall substantially to zero, especially in low-pressure fields. Pipe capacities are frequently reduced to a small fraction of their capacities when clean. Ultimately, of course, such pipes may be found completely clogged by such deposits. In the case of pipe lines, the operator may find himself burdened with the cost of a 6″ or 8″ line, yet benefiting from a capacity equal to that of a 3″ or 4″ line.

The process which constitutes this phase of the present invention consists in subjecting such clogging organic deposits of wax, paraffin, asphaltic or bituminous substances and the like, to the action of the compounds of this invention, to the end that such deposits are removed from the surfaces to which they were originally adherent. By means of the process, the productivity of wells is restored as is the capacity of flow lines, pipe lines, traps, tanks, pumps, and other equipment, through which such oil travels from formation to refinery.

It will be obvious that if the first minute deposit of such organic materials is subjected to our reagent, and if such application of reagent is practiced continuously or periodically with sufficient frequency, the operation has the appearance of a preventive process rather than a corrective process. In addition, it should be noted that our reagent has a more real claim to acting as a preventive, in that surfaces effectively cleaned by its application tend to resist renewed deposition of such materials, and to remain clean and operative for longer periods than if the reagent had not been applied. Therefore, we have characterized our process as being both a preventive and a corrective one. It may obviously be applied in either sense and achieve the same ultimate goal, the improvement of efficiency of operation of wells and equipment. In the appended claims, we have used the word "removing." It should be clearly understood that we thereby include the prevention of organic deposits of the present kind.

The reagent which we employ in practicing our process consists of the compounds of our invention generally used in combination with one or more water-insoluble organic liquids capable of acting as an oil solvent.

We prefer to employ our reagent in the form of a relatively stable aqueous dispersion. By "relatively stable aqueous dispersion" we mean one that is not resolved into its components spontaneously, on standing for protracted periods of time, e.g., for more than one hour. However, it may be employed in undiluted form or dispersed in oil. In general we have found the aqueous dispersions to be somewhat more effective. Sometimes such aqueous dispersions will be effective, whereas the undiluted reagent or its non-aqueous dispersion or solution will be substantially ineffective.

Depending upon the choice of compound and its molecular weight, the solubility may be expected to range from ready water-solubility in the free state substantially to water-insolubility. The salts, and specifically the acetates, generally show improved water-solubility over the simple compound; and we have obtained the best results by using salt forms which possess appreciable water-solubility.

The other component of our reagent is a water-insoluble organic liquid which is capable of acting as an oil solvent. Many materials lend themselves to this use. One of the most common is the aromatic fraction of petroleum distillates. Another is the fraction removed from distillates by application of the Edeleanu liquid sulfur dioxide extraction process, and which comprises aromatic and unsaturated compounds. In some cases, stove oil or similar petroleum distillate is usable. Solvents like carbon tetrachloride or carbon disulfide are usable, although their comparatively high cost militates against their use. Amylene dichloride is sometimes a desirable material for the present purpose, as are tetrachloroethane, tetralin, trichloroethylene, benzol and its homologues, cyclohexane, etc. This component of our reagent must be water-insoluble and must be an oil solvent. Otherwise, its selection is not limited although it should be compatible with the other ingredient of our reagent. Naturally, its cost and availability will influence the selection. We prefer to use an aromatic petroleum solvent since it is a widely available reagent of low cost and has good properties for the present use.

We do not desire to be limited to any specific water-insoluble organic liquid. All that is required is that it shall be capable of acting as an oil solvent. The choice of liquid employed, however, can be influenced in part by the bottom-hole temperatures expected to be encountered. The character of the oil being produced can also affect the choice. The choice will frequently depend on relative cost of solvents. We have found that a mixture of organic liquids having the specific property of dissolving petroleum oil is very effective. One such mixture which we have employed contains benzol, toluol, carbon tetrachloride, carbon disulfide, tetralin and kerosene.

To prepare our reagents, one simply mixes the two components together in suitable proportions. The optimum proportion of each will vary, depending upon its properties; but in general, the resulting mixture should be homogeneous.

We also prefer that the finished reagent produce a relatively stable aqueous dispersion in water. In cases where the two ingredients form thoroughly homogeneous mixtures, which, however, are not water-dispersible, transformation of the compounds of this invention into their salt form will sometimes render the solution water-dispersible. In such cases we have preferably employed acetic acid to effect the neutralization.

The reagents are preferably employed in the form of an aqueous dispersion, although sometimes favorable results are obtained merely by introducing the undiluted reagent into the well whose productivity is to be improved. In some of such cases, undoubtedly, there is produced in the bell bore or in the formation, an aqueous dispersion of the reagent in water present in such bore or such formation. Production of an aqueous dispersion from our reagent and water is accomplished almost spontaneously on mixing the two, in most cases. We greatly prefer to employ the reagents in the form of an aqueous dispersion because in that manner the two components are prevented from separating from each other before the reagent can become effective to remove the deposit of organic materials.

The present reagents have certain advantages over other reagents which have been suggested for the same purpose. For example, the present reagents have been found to be quite stable in the presence of fairly saline water and in the presence of fairly hard water over a period ranging from at least several hours to at least several days. Reagents like those of U.S. Patent No. 1,892,205, to De Groote, dated December 27, 1932, which include sulfonated saponifiable oil, react with hard water to produce insoluble precipitates of such sulfonated saponifiable oil; and such constituents of such reagents are "salted out" by saline waters. The present reagents, in contrast, are unaffected by waters of appreciable salinity and/or hardness. In fact, as stated above, we have made them into aqueous dispersions of good stability using such waters.

It is also noteworthy that our present reagents are useful in the presence of acids. They can therefore be applied satisfactorily to wells that have been acidized by the use of hydrochloric or hydrofluoric or other acids. The regents of the above-mentioned Patent No. 1,892,205 would react with such acidizing acids to liberate free sulfonated fatty acids which would either be water-insoluble per se or else would readily become water-insoluble on hydrolysis and loss of their acid sulfate radical. The present reagents would be quite stable in the presence of such acidizing acids.

We prefer to employ a considerable excess of our compounds over the amount required to effect dispersion of the water-insoluble organic liquid in water. Such excess further prevents any separation of the phases, thereby enhancing the stability of the dispersion to such an extent that it will remain stable for at least several hours. The excess also acts to lower the surface tension of the whole reagent so that the reagent exhibits a marked penetrating effect and is carried into the crevices and irregularities of the deposit, weakening the bond between the deposit of organic materials and the supporting wall.

The proportions of oil solvent and active compounds of this invention can be varied within wide limits. For example, we have prepared our reagents in a form in which they contain 4 parts of active compound to 1 part of oil solvent. We have likewise prepared them in a form in which they contain 4 parts of oil solvent to 1 part of active compound. Both forms were relatively stable and did not separate appreciably into their components on standing for protracted periods of time. We have likewise prepared our reagents in a form in which they contain 9 parts of active compound and 1 part of oil solvent; and in a form in which they contain 1 part of active compound and 9 parts of oil solvent. We have determined that the proportion of active compound and oil solvent can advantageously vary within the range of 9:1 and 1:9.

As a preferred example of reagent we employ a 20 weight percent dispersion of active compound in an aromatic petroleum solvent and include 2% of concentrated acetic acid in the finished reagent where the salt form is desired. We prefer to employ this reagent in the form of a dilute aqueous dispersion of about 5 weight percent concentration. Sometimes aqueous dispersions containing as little as 1% of the reagent are fully effective. Sometimes it is desirable to introduce the reagent in the form of a more concentrated aqueous dispersion as when additional water is expected to be encountered in the well bore or the surrounding formation. The reagent can even be introduced in undiluted form although, as stated above, we prefer not to use it in this form.

From the foregoing, it will be understood that this phase of our invention includes subjecting a deposit of organic materials of the kind mentioned to the action of a reagent of the kind described. It should be understood that while our reagent includes, as an indispensible ingredient, a constituent which might constitute a wax solvent, it does not commonly operate completely to dissolve or completely to disperse any waxy organic deposit to which it may be applied in the practice of our invention. Of course, a minor portion of such deposit may be truly dissolved or dispersed by the reagent; but the usual fact is that the deposit is dislodged and brought to a trap or tank that can be more readily cleaned of the organic materials. The same statement applies to other types of organic matter which are found in such deposits. The reagent is usually applied in such small and economical amounts that it could not dissolve completely, or even satisfactorily, the organic deposit to which its action is directed. Its manner of operation is uncertain; but its effects are frequently striking. Well productivity usually increases promptly. Line pressures which have increased with deposition of the organic matter drop to normal within a short time; and sometimes sizeable chunks of the dislodged deposit are observed in open flows from wells or lines, or on screens inserted into such flows for purposes of observation.

Our reagents can be applied in a large number of different ways depending upon the character of the organic deposit it is desired to remove and on the location of such deposit. If the productivity of a well has declined to undesirably low levels, and the clogging deposit is found at the formation, it may be preferable to introduce the reagent, either in undiluted form, or as an aqueous dispersion, into the fluids being produced from the well, and then tie the tubing back into the casing of the well and circulate the fluids being produced. In this manner chemicalized well fluids are passed over the deposit for a period of from several hours to several days, usually with a striking improvement in well productivity when circulation is stopped and normal production of the well is resumed.

Sometimes the deposit is located at some higher or lower level in the tubing. For example, passage of the well fluids past a point in the well which lies opposite a water sand may produce a deposit at that point, because such a water sand commonly represents a point of cooling. In treating tubing deposits, the circulation method above may be practiced. However, in some instances, it is possible to introduce the reagent in undiluted or diluted form into the tubing at the well head by unscrewing the stuffing box. (Usually the tubing does not stand entirely full of fluid because of slight leakage past the pump.) If the reagent is introduced as an aqueous dispersion, it will settle relatively slowly down through the oil in the tubing until it reaches the deposit. After introducing the reagent in any desired manner, it may be allowed to stand in the tubing for any desired period of time before the well is replaced on production. In some instances it is preferred to pump the well intermittently for very short periods of time so as to pick up the reagent and lift it above the deposit and let it settle down past the deposit again during the next idle period.

Where the organic deposits in question occur in flow lines, the reagent may be introduced and allowed to "soak" the deposit. Thereafter, normal production may be resumed; and the dislodged deposit flushed from the line by the flow of well fluids. In other instances, gas pressure is put on the soaked line and the deposit flushed out in that manner. Sometimes introduction of a dilute aqueous dispersion of the reagent is effected intermittently and the deposit progressively removed. Or the reagent may be introduced in a continuous fashion, if desired.

In the case of pipe lines, the diameter of the pipe and the length of the line make it necessary to apply the reagent in the most economical fashion possible. In such cases we have found that very dilute aqueous dispersions are useful, e.g., of 1 weight percent concentration or sometimes even less. Soaking of the line, i.e., merely introducing the reagent dispersion into it and allowing the line to lie idle for a period of time, is practicable. Sometimes we prefer to prepare a relatively large volume of dilute aqueous dispersion in a tank at some convenient location at one end of the pipe line and interrupt the pumping of oil only long enough to switch to the solution tank and pump the volume of reagent dispersion into the line. Then the pumping of oil is resumed and the liquid cylinder of reagent dispersion is thereby moved across the face of the deposit in the line over the whole length of line. If desired, the direction of pumping may be reversed when such liquid cylinder of reagent dispersion reaches the opposite end of the line; and a second, or even a third pass, or more, may be made of reagent dispersion over the deposit in the line.

Where deposits have been allowed to accumulate over a considerable period of time, they may be of such proportions that application of a normal amount of our reagent would produce sloughing off of sufficient of the deposit to plug the conduit further downstream by forming a bridge with undislodged deposit at that point. In such instances, we prefer to proceed more cautiously, introducing successive small portions of reagent and successively dislodging portions of the deposit sufficiently small to pass freely through the limited freeway in the conduit.

Merely introducing our reagent into an area containing a deposit so the reagent contacts the deposit is sometimes sufficient to cause the removal of the latter. Sometimes agitation of the reagent at the face of the deposit greatly accelerates removal of the latter. Any suitable agitation means may be employed in such instances.

Because there are so many conditions under which such organic deposits may occur, it is difficult to give any preferred procedure for applying our reagent. The foregoing descriptions have covered instances where such deposits were to be removed from the face of the formation, the well tubing or casing, flow lines, and pipe lines. They may be taken as preferred methods of operating the process for the respective conditions outlined. All of them are exemplary only. The process may be varied as conditions may require. In all cases, the process consists broadly in the application of our reagent to the organic deposits described above.

Application of our reagent upstream in any system, as, for example, into a well, results in an attack on any such organic deposits further downstream. For example, wax or similar deposits, in traps and tanks, are freed and usually flowed out of such vessels in subsequent operation of the system. In the case of tanks we have found that waxy tank bottoms may sometimes be removed by introducing our reagent into the tank containing such deposits and allowing the whole to soak for a period of time. The deposit is thereby made more free and more readily removable. Removal of deposits of organic matter from oil production equipment, such as traps and tanks and the like, is obviously contemplated by our process.

The following examples are presented for purposes of illustration:

*Example 22–1*

An oil well producing crude oil at the average rate of about 6 barrels per day is taken out of production.

About 160 gallons of a 5 weight percent aqueous dispersion of a reagent consisting of 20 weight percent of compound 22-1 of the following table in an aromatic petroleum solvent is forced into the well annulus until a back pressure of about 350 p.s.i. is obtained, in contrast to the natural formation pressure of about 250 p.s.i., so that the solution is forced into the formation under a differential pressure of about 100 p.s.i. The well is maintained under this back pressure for about 25–30 hours. Then the pressure is released and the well placed in production.

*Example 22–2*

An oil well producing at the average rate of about 6 barrels a day is treated in the manner of Example 22-1 except that compound 22-2 of the following table is employed.

The compounds shown in the following table are effective in paraffin solvents.

acylation then an oxyalkylation and then an acylation agent the preformed methylol phenol having only functional groups selected from the class consisting of methylol groups and phenolic hydroxyl groups, the polyamine having only functional groups selected from the class consisting of primary amino groups, secondary amino groups and hydroxyl groups, the acylation agent having up to 40 carbon atoms and being selected from the class consisting of unsubstituted carboxylic acids, unsubstituted hydroxy carboxylic acids, unsubstituted acylated hydroxy carboxylic acids, lower alkanol esters of unsubstituted carboxylic acids, glycerides of unsubstituted carboxylic acids, unsubstituted carboxylic acid chlorides and unsubstituted carboxylic acid anhydrides, and the oxyalkylation agent being selected from the class consisting of alpha-beta alkylene oxides and styrene oxide.

ADDITIVE FOR PARAFFIN SOLVENT

| Ex. No. | I | | Weight of oxides added to I (grams) |
|---|---|---|---|
| | Reactants (grams) | $H_2O$ eliminated (grams) | |
| 22-1 | 1a (439) plus lauric acid (600) | 54 | EtO (352). |
| 22-2 | ....do.... | 72 | EtO (440). |
| 22-3 | 1a (439) plus oleic acid (846) | 54 | EtO (440). |
| 22-4 | ....do.... | 72 | EtO (528). |
| 22-5 | 2a (568) plus stearic acid (852) | 54 | EtO (440). |
| 22-6 | ....do.... | 72 | EtO (440). |
| 22-7 | 3a (697) plus stearic acid (852) | 54 | EtO (396). |
| 22-8 | ....do.... | 72 | EtO (616). |
| 22-9 | 1b (492) plus lauric acid (400) | 36 | EtO (440). |
| 22-10 | 2b (662) plus oleic acid (564) | 36 | EtO (572). |
| 22-11 | 1c (645) plus lauric acid (600) | 54 | EtO (440). |
| 22-12 | ....do.... | 72 | EtO (352). |
| 22-13 | 1d (660) plus oleic acid (1,128) | 72 | EtO (660). |
| 22-14 | 2d (832) plus lauric acid (800) | 72 | EtO (440). |
| 22-15 | 16d (800) plus lauric acid (800) | 72 | EtO (660). |

| Ex. No. | I | | Weight of oxides added to I in alphabetical order (grams) |
|---|---|---|---|
| | Reactants (grams) | $H_2O$ eliminated (grams) | |
| 22-16 | 28a (1,960) | | (A) PrO (580). |
| 22-17 | 28a (1,960) plus lauric acid (600) | 120 | (A) PrO (116), (B) EtO (1,320). |
| 22-18 | 28aO (3,054) plus stearic acid (284) | 18 | |
| 22-19 | 28aAOA | | |
| 22-20 | 28b (1,400) | | EtO (1,980). |
| 22-21 | 28b (1,400) plus oleic acid (564) | 40 | EtO (2,640). |
| 22-22 | 28bAOA | | |
| 22-23 | 29b (1,635) | | (A) PrO (522), (B) EtO (1,980). |
| 22-24 | 29b (1,635) plus oleic acid (282) | 18 | EtO (1,320). |
| 22-25 | 29bO (2,655) plus oleic acid (282) | 18 | |
| 22-26 | 29bAOA | | |
| 22-27 | 30b (1,580) | | EtO (2,200). |
| 22-28 | 30b (1,580) plus stearic acid (569) | 40 | |
| 22-29 | ....do.... | 40 | (A) PrO (464), (B) EtO (1,320). |
| 22-30 | 30bAOA | | |

We claim:
1. A process of preparing a member selected from the group consisting of:
(1) acylated, (2) oxyalkylated, (3) acylated then oxyalkylated, (4) oxyalkylated then acylated, (5) acylated, then oxyalkylated and then acylated, monomeric polyaminomethyl phenols characterized by reacting a preformed methylol phenol having one to four methylol groups in the 2, 4, 6 position with a polyamine containing at least one secondary amine group in amounts of at least one mole of secondary polyamine per equivalent of methylol group on the phenol until one mole of water per equivalent of methylol group is removed, in the absence of an extraneous catalyst; and then reacting the thus formed monomeric polyaminomethyl phenol with a member selected from the group consisting of (1) an acylation agent, (2) an oxyalkylation agent, (3) an acylation then an oxyalkylation agent, (4) an oxyalkylation then an acylation agent, and (5) an

2. Products produced by the process of claim 1.
3. The process of claim 1 where the preformed methylol phenol is a monophenol.
4. The process of claim 3 where the preformed methylol phenol is an o-methylol phenol.
5. The process of claim 1 where the preformed methylol phenol has all available ortho and para positions substituted with methylol groups.
6. The process of claim 1 where the preformed methylol phenol is 2, 4, 6-trimethylol phenol.
7. The process of claim 1 where the preformed methylol phenol is a diphenol.
8. The process of claim 1 where the polyamine is an aliphatic polyamine.
9. The process of claim 1 where the polyamine is a polyalkylene polyamine.
10. The process of claim 1 where the phenol is 2,4,6-trimethylol phenol, the polyamine is diethylene triamine, the acylating agent is oleic acid, and the oxyalkylation agent is at least one member selected from the group consisting of ethylene oxide and propylene oxide.

11. A chelate of a chelating metal and a product of claim 2.

12. The process of claim 1 where the polyamine is diethylene triamine.

13. The process of claim 1 where the acylation agent is a monocarboxy acid having 7 to 39 carbon atoms.

14. The process of claim 1 where the oxyalkylation agent is a 1,2-alkylene oxide having 2 to 4 carbon atoms.

15. The process of claim 1 where the preformed methylol phenol is 2,4,6-trimethylol phenol, the polyamine is a polyalkylene polyamine, the acylation agent is a monocarboxy acid having 7 to 39 carbon atoms, and the oxyalkylation agent is a 1,2-alkylene oxide having 2 to 4 carbon atoms.

16. The process of claim 1 where the member prepared is (1) an acylated monomeric polyaminomethyl phenol, the preformed methylol phenol is 2,4,6-trimethylol phenol, the polyamine is a polyalkylene polyamine, and the acylation agent is a monocarboxy acid having 7 to 39 carbon atoms.

17. The process of claim 1 where the member prepared is (2) an oxyalkylated monomeric polyaminomethyl phenol, the preformed methylol phenol is 2,4,6-trimethylol phenol, the polyamine is a polyalkylene polyamine, and the oxyalkylation agent is a 1,2-alkylene oxide having 2 to 4 carbon atoms.

18. The process of claim 1 where the member prepared is (3) an acylated then oxyalkylated monomeric polyaminomethyl phenol, the preformed methylol phenol is 2,4,6-trimethylol phenol, the polyamine is a polyalkylene polyamine, the acylation agent is a monocarboxy acid having 7 to 39 carbon atoms, and the oxyalkylation agent is a 1,2-alkylene oxide having 2 to 4 carbon atoms.

19. The process of claim 17 where the polyalkylene polyamine is diethylene triamine and the 1,2-alkylene oxide is propylene oxide.

20. The process of claim 18 where the polyalkylene polyamine is diethylene triamine, the monocarboxy acid is oleic acid, and the 1,2-alkylene oxide is propylene oxide.

References Cited in the file of this patent

UNITED STATES PATENTS

| | | |
|---|---|---|
| 2,792,359 | De Groote | May 14, 1957 |
| 2,907,778 | Greenlee | Oct. 6, 1959 |
| 2,907,791 | Schmidt et al. | Oct. 6, 1959 |

OTHER REFERENCES

Groggins: Unit Processes in Organic Synthesis, 4th edition, 1952, page 708.